US012166285B2

(12) United States Patent
Gianinni et al.

(10) Patent No.: US 12,166,285 B2
(45) Date of Patent: Dec. 10, 2024

(54) ANTENNA DEVICE, ANTENNA SYSTEM, AND METHODS TO CREATE, AND INSTALL OR MODIFY, AN ANTENNA PROFILE FOR AN ANTENNA DEVICE SO AS TO DIRECT THE PROPAGATION OF RADIO FREQUENCY SIGNALS FROM THE ANTENNA DEVICE TO TARGETED GEOGRAPHIC COVERAGE AREAS

(71) Applicants: Mark Jerome Gianinni, Tierra Verde, FL (US); Steven Lloyd Myers, Parkland, FL (US)

(72) Inventors: Mark Jerome Gianinni, Tierra Verde, FL (US); Steven Lloyd Myers, Parkland, FL (US)

( * ) Notice: Subject to any disclaimer, the term of this patent is extended or adjusted under 35 U.S.C. 154(b) by 656 days.

(21) Appl. No.: 17/443,457

(22) Filed: Jul. 27, 2021

(65) Prior Publication Data

US 2023/0031214 A1 Feb. 2, 2023

Related U.S. Application Data

(60) Provisional application No. 63/225,503, filed on Jul. 25, 2021.

(51) Int. Cl.
| | |
|---|---|
| *H04B 1/16* | (2006.01) |
| *H01Q 21/20* | (2006.01) |
| *H01Q 21/24* | (2006.01) |
| *H04B 1/04* | (2006.01) |
| *H04B 1/3805* | (2015.01) |

(52) U.S. Cl.
CPC ......... *H01Q 21/205* (2013.01); *H01Q 21/245* (2013.01); *H04B 1/04* (2013.01); *H04B 1/1607* (2013.01); *H04B 1/3805* (2013.01)

(58) Field of Classification Search
CPC .. H01Q 21/205; H01Q 21/245; H01Q 1/1228; H01Q 1/42; H01Q 21/10; H04B 1/04; H04B 1/1607; H04B 1/3805
USPC ................................ 375/220, 222, 256, 308
See application file for complete search history.

(56) References Cited

U.S. PATENT DOCUMENTS

| | | | |
|---|---|---|---|
| 2010/0103065 A1* | 4/2010 | Shtrom ................. | H01Q 3/446 343/893 |
| 2017/0179589 A1* | 6/2017 | So ......................... | H01Q 1/246 |
| 2023/0006367 A1* | 1/2023 | Varnoosfaderani .... | H01Q 21/24 |
| 2023/0124787 A1* | 4/2023 | Li ......................... | H01Q 21/26 343/797 |

* cited by examiner

*Primary Examiner* — Emmanuel Bayard
(74) *Attorney, Agent, or Firm* — Morris, Manning & Martin, LLP; Daniel E. Sineway, Esq.; Adam J. Thompson, Esq.

(57) ABSTRACT

Disclosed is an antenna device, antenna system, and methods to create, and install or modify, an antenna profile for an antenna device so as to direct remotely the propagation of radio frequency signal from the antenna device to targeted radio frequency geographic coverage areas. Ports may be selected to activate spatial segments created by the configuration of the reflectors, joined about a cylindrical core, which may be quadrants when the reflectors are configured into a cross-like shape. The system provides aid in orienting an antenna, upon installation, to a pre-designated geographic heading. Optionally, the tilt of each quadrant of an antenna device may be determined so as to ensure proper radio frequency coverage.

31 Claims, 47 Drawing Sheets

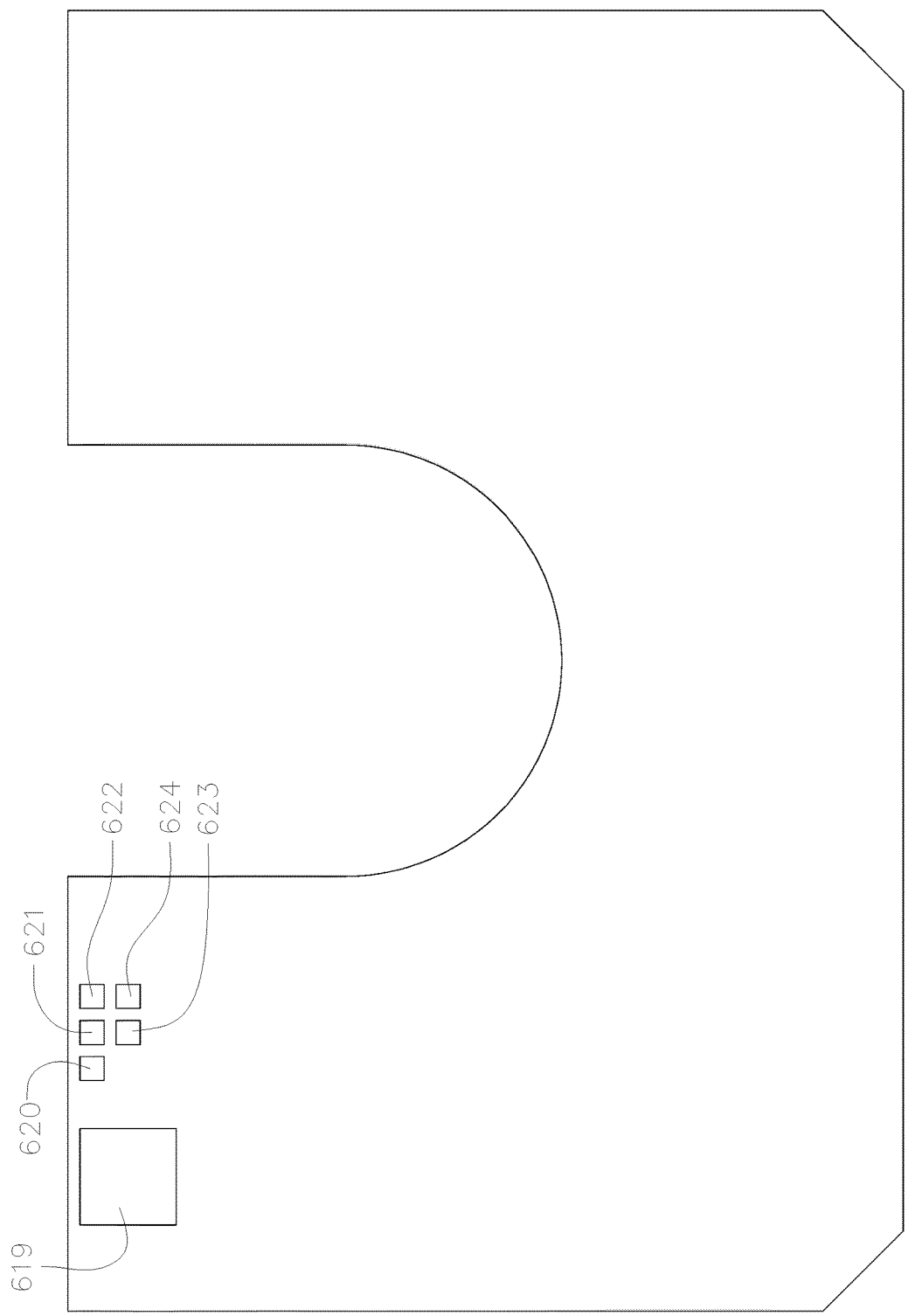

QUADRANT C

OPERATING MODE
◉ NORMAL  ○ FOLIAGE

| PORT | POLARIZATION | BAND | |
|---|---|---|---|
| ☑ PORT 1 | ◉ VERTICAL  ○ HORIZONTAL | ○ 2GHz  ○ 5GHz | ◉ Dual Band |
| ☐ PORT 2 | | | ○ Dual Band |
| ☑ PORT 3 | | | ◉ Dual Band |
| ☐ PORT 4 | | | ○ Dual Band |

FINALIZE CONFIGURATIONS?

[ CANCEL ]  [ CONTINUE ]

QUADRANT D

OPERATING MODE
◉ NORMAL  ○ FOLIAGE

| PORT | POLARIZATION | BAND | |
|---|---|---|---|
| ☐ PORT 1 | ○ VERTICAL  ○ HORIZONTAL | ○ 2GHz  ○ 5GHz | ○ Dual Band |
| ☑ PORT 2 | ◉ VERTICAL  ○ HORIZONTAL | ○ 2GHz  ○ 5GHz | ◉ Dual Band |
| ☐ PORT 3 | ○ VERTICAL  ○ HORIZONTAL | ○ 2GHz  ○ 5GHz | ○ Dual Band |
| ☑ PORT 4 | ◉ VERTICAL  ○ HORIZONTAL | ○ 2GHz  ○ 5GHz | ◉ Dual Band |

[ BACK ]
[ NEXT ]

[ RECONFIGURE ALL ]

[ SEND TO DEVICE ]

FIG.30

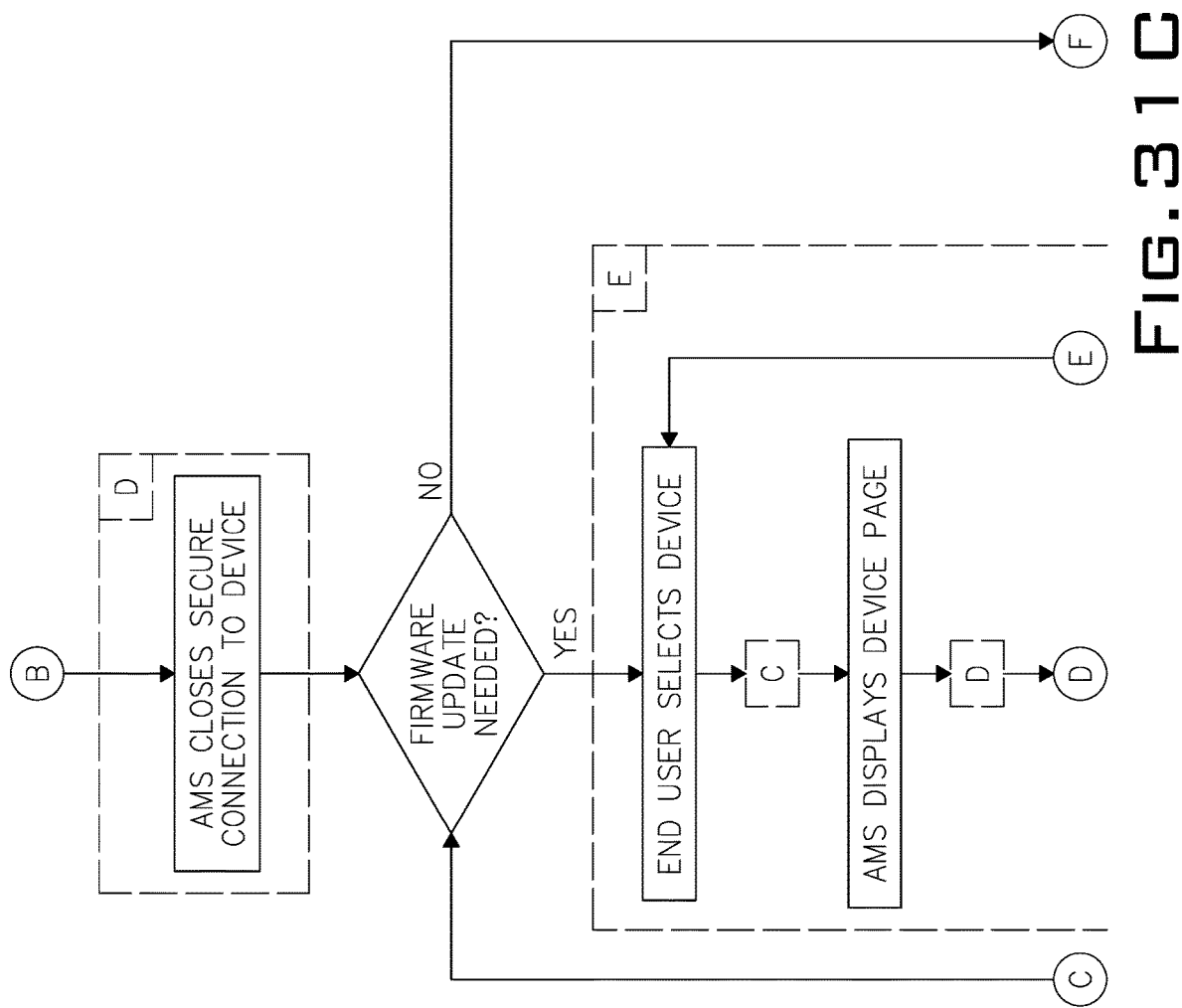

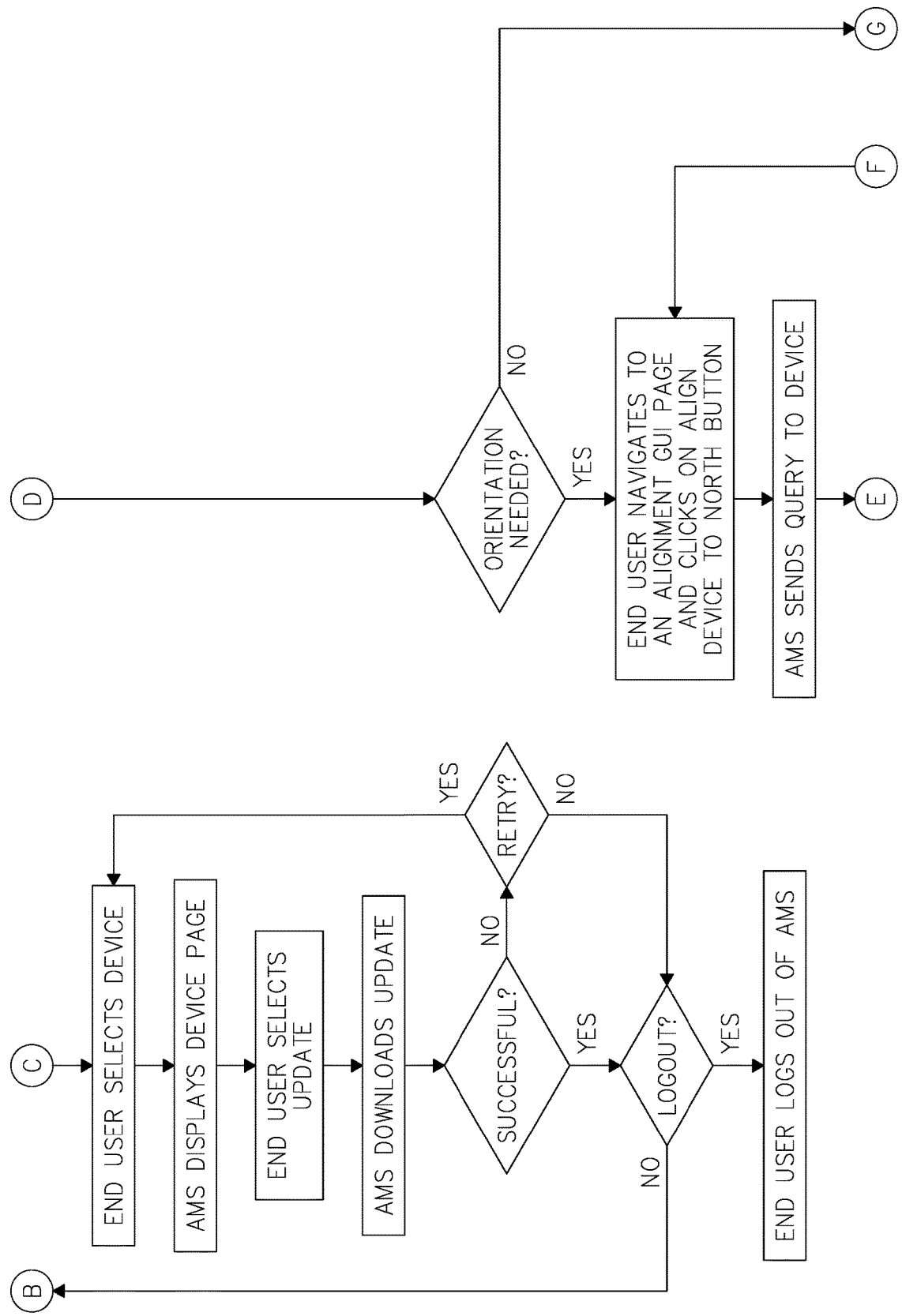

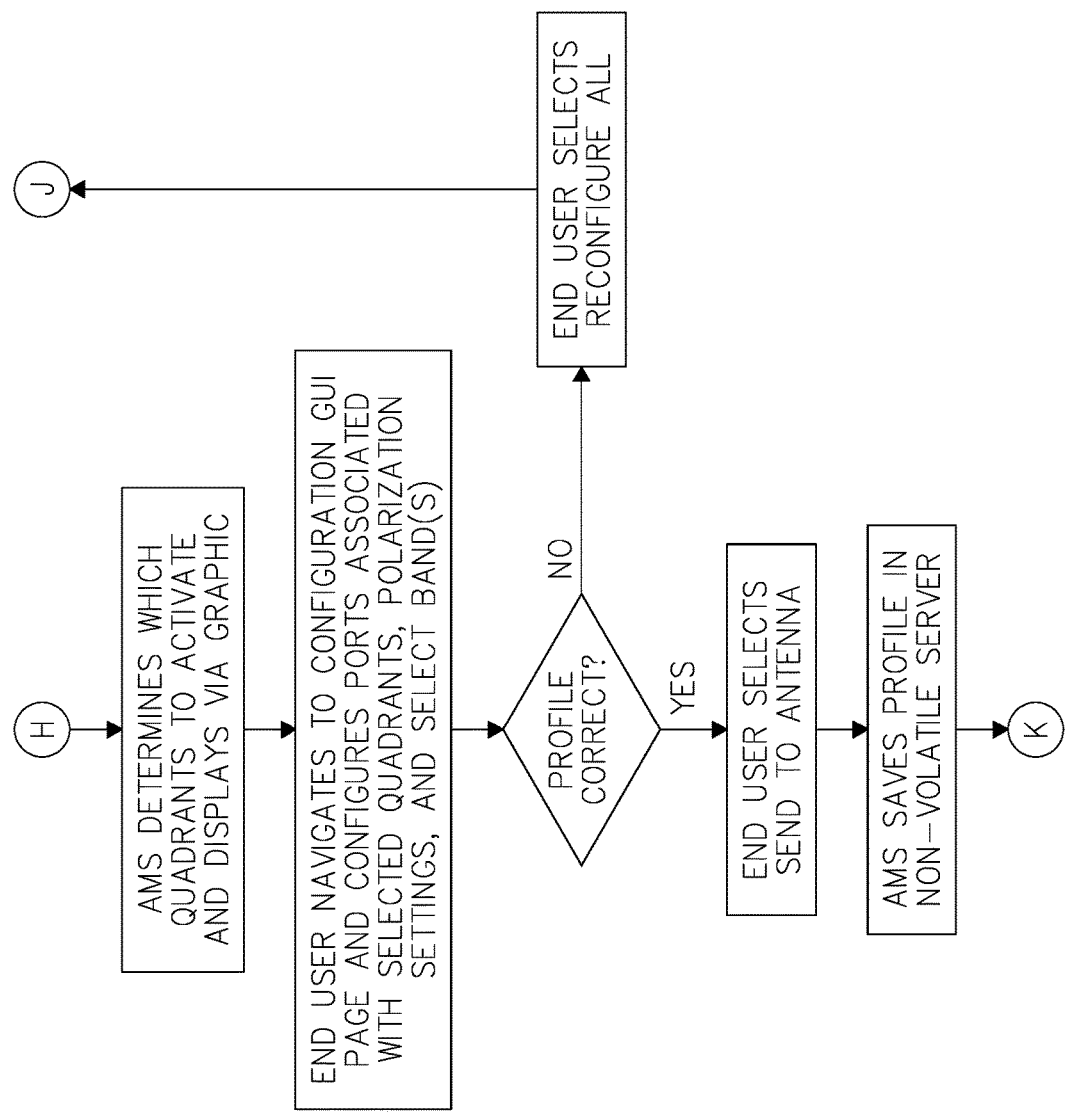

ANTENNA DEVICE, ANTENNA SYSTEM, AND METHODS TO CREATE, AND INSTALL OR MODIFY, AN ANTENNA PROFILE FOR AN ANTENNA DEVICE SO AS TO DIRECT THE PROPAGATION OF RADIO FREQUENCY SIGNALS FROM THE ANTENNA DEVICE TO TARGETED GEOGRAPHIC COVERAGE AREAS

CROSS-REFERENCES TO RELATED APPLICATIONS

This application claims the benefit of U.S. Provisional Application No. 63/225,503 filed on 25 Jul. 2021.

STATEMENT REGARDING FEDERALLY SPONSORED RESEARCH OR DEVELOPMENT

Not applicable.

MICROFICHE APPENDIX

Not applicable.

SUBSTITUTE SPECIFICATION

The instant specification is a substitute specification filed in response to the Notice To File Corrected Application Papers with a mailing date of 9 Aug. 2021, and contains no new matter.

BACKGROUND OF THE INVENTION

1. Field of the Invention

This invention relates to the field of antennae, including those utilized in heterogenous networks.

2. Background

The wireless communication industry, in its many forms, has begun aggressively embracing the use of unlicensed bands in its designs and deployments. Until recently, the WiFi (Institute of Electrical and Electronic Engineers 802.11 technology) industry has been predicated entirely upon Federal Communications Commission (FCC) Part 15 bands in the 2.4 GHz and 5 GHz frequencies. Now, however, wireless carriers that traditionally acquired and deployed only licensed bands have begun incorporating unlicensed equipment and bands in what are known as heterogenous networks to augment their capacities in order to meet the challenge of a first order of magnitude increase in Internet Protocol (IP) traffic generated by smartphones, the evolution of 5G (the fifth generation technology standard for broadband cellular networks) and the IoT (Internet of Things, or the network of physical objects embedded with sensors, software, and other technologies that allow them to connect and exchange data with other apparatus and systems over the Internet). In support of the wireless industry's adoption of unlicensed bands, the FCC has expanded the number of available unlicensed channels by adding frequencies in the 3.5 GHz band and most recently announced the addition of the 6 GHz band.

Regardless of specific frequencies of operation, all unlicensed bands must comply with strict FCC regulations that impose a one-watt limitation on transmit power, unlike licensed transmitters which can operate up to 25 watts. The imposition of a one-watt limitation of transmit power creates a number of challenges unique to operation in the unlicensed bands, which include defining and serving an intended coverage area, much shorter ranges, asymmetrical gain, and higher noise floors.

BRIEF SUMMARY OF THE INVENTION

One or more embodiments disclosed herein comprises a software-defined antenna (SDA) system, permitting an operator to create, install, and modify an antenna profile that may include particular operator-selectable features of an Antenna Device 109 (Antenna or Device), such as signal propagation characteristics, a radio frequency geographic coverage area, assigned ports, frequency bands and polarity. In an embodiment, a unique antenna profile may be installed on an Antenna Device 109 by an operator via Antenna Management Software (AMS) running on a server 102, which may be located in a proprietary cloud 101. An Antenna Device 109 may be remotely located relative to a server 102.

Each such Antenna Device 109 may be an addressable, reconfigurable, segmented antenna with a plurality of separate, reflective panels (reflectors) antenna, capable of multiple-input and multiple-output (MIMO) and beam-forming when used in conjunction with an Access Point (AP), a WiFi router, or a modem. Reflective panels may be arranged to create a plurality of segments of space (segments) for an Antenna Device 109, which segments may be quadrants. An operator may select one or more of the plurality of segments of said Antenna Device through which to direct a Radio Frequency (RF) signal, thereby effectively allowing one such Antenna Device 109 to act as a single panel antenna, a multiple panel antenna, or an omni-directional antenna.

An embodiment of such an SDA system may incorporate one or more components capable of determining the orientation of an Antenna Device 109 by reference to Magnetic North (NM) or Geographic North (NG). In an embodiment, one or more magnetometers in an Antenna Device 109 may be employed to determine an initial orientation of the Antenna Device 109 with respect to Magnetic North, and thereby provide a reference for Antenna Management Software (AMS) running on a server 102 to create and display instructions by which the Antenna Device 109 may be reoriented with respect to Geographic North, or another predetermined bearing, so as to permit an operator to direct accurately RF propagation to one or more desired geographic coverage areas. Alternately, or in addition to one or more magnetometers, an embodiment may include one or more Global Positioning System/Global Navigation Satellite System (GPS/GNSS) Receivers which may be capable of ascertaining a geographic location of Antenna Device 109 and its heading with respect to True North or Magnetic North, or both. Moreover, in an embodiment, an Antenna Device 109 may comprise an electronic tilt angle (tilt) measurement system employing one or more accelerometers 519-521 to determine and display the tilt angle (tilt) of an Antenna Device 109, and thereby permit assessment of the adequacy of coverage for a targeted RF geographic coverage area 1502.

An embodiment may permit multiple band selection for each segment (e.g., quadrant) by an operator, including, but not limited to, dual band, by individual ports. These bands may be licensed or unlicensed. Further, an embodiment may allow an operator to select vertical, horizontal, or hybrid (e.g., dual) polarization for each segment (e.g., quadrant) defined by the location of a plurality of reflectors about a central cylindrical core.

An operator may assign a plurality of RF ports of one or more wired modems, one or more wireless modems, one or more radio modems, or a combination thereof, which may be coordinated and operated simultaneously with respect to various combinations of segmented space defined by the reflectors in an embodiment. This may permit a single Antenna Device 109 to act as a plurality of separate antennas concurrently.

BRIEF DESCRIPTION OF THE SEVERAL VIEWS OF THE DRAWINGS

FIG. 6A Top View Of A Main Printed Circuit Board And Various Components In An Embodiment FIG. 6B To View Of A Main Printed Circuit Board Illustrating One Possible Placement For A GPS/GNSS Receiver, Switch, and RF Connectors For Each GPS/GNSS-Dedicated Antenna FIG. 7A Top Perspective View Of An Embodiment With Four Quadrants And Eight Flat Reflector Panel Arrays of Elements, Facing The Center Of A Quadrant FIG. 7B Top Perspective View Of An Embodiment Illustrating One Possible Arrangement Of GPS/GNSS-Dedicated Antennae FIG. 8 Top Perspective View Of An Embodiment With Four Quadrants And Eight Flat Reflector Panel Arrays of Elements, Facing The Edge Of Two Adjacent Quadrants And Reflecting A Location Of An Amplifier Printed Circuit Board Between Adjacent Reflector Panels Of Adjacent Quadrants FIG. 9 Top View Of An Embodiment With Four Quadrants And Eight Flat Reflector Panel Arrays of Elements FIG. 10 Top Perspective View Of An Embodiment Of An Antenna Housing FIG. 11 Side View Of A Mast Passing Through An Antenna Housing In An Embodiment FIG. 12 Bottom View Of A Bottom Plate Of An Antenna Housing In An Embodiment FIG. 13 One Possible Original Antenna Orientation With Respect To Magnetic North FIG. 14 Differential Between Magnetic North And Geospatial North FIG. 15 One Possible Desired Geospatial RF Coverage Area FIG. 16 Geospatial North As Calculated Based On Antenna Orientation and Declination FIG. 17 Conceptual Illustration Of Panel and Accelerator Geometry In An Embodiment FIG. 18A A Device List Page/GUI Window In An Embodiment FIG. 18B A Device Page/GUI Window In An Embodiment FIG. 19 An Add Device Page/GUI Window In An Embodiment FIG. 20 An Edit Device Page/GUI Window In An Embodiment FIG. 21A Device Details Page/GUI Window In An Embodiment FIG. 22 Graphics For Display In A Device Orientation Page/GUI Window In An Embodiment Reflecting The Geospatial Orientation Of An Antenna And An Align Device To North Command Button Causing Instructions For Aligning An Antenna To Geospatial North To Be Displayed To An Operator (N.B.—The Center Of Quadrant A Should Be 3° N-NW Of A True North Heading)

FIG. 32C Flow Chart For A Method Of Implementing A Profile For An Antenna In An Embodiment-Antenna Device Initiates Connection (3/6)

FIG. 32E Flow Chart For A Method Of Implementing A Profile For An Antenna In An Embodiment-Antenna Device Initiates Connection (5/6)

REFERENCE NUMERALS IN THE DRAWINGS

Figure 1:
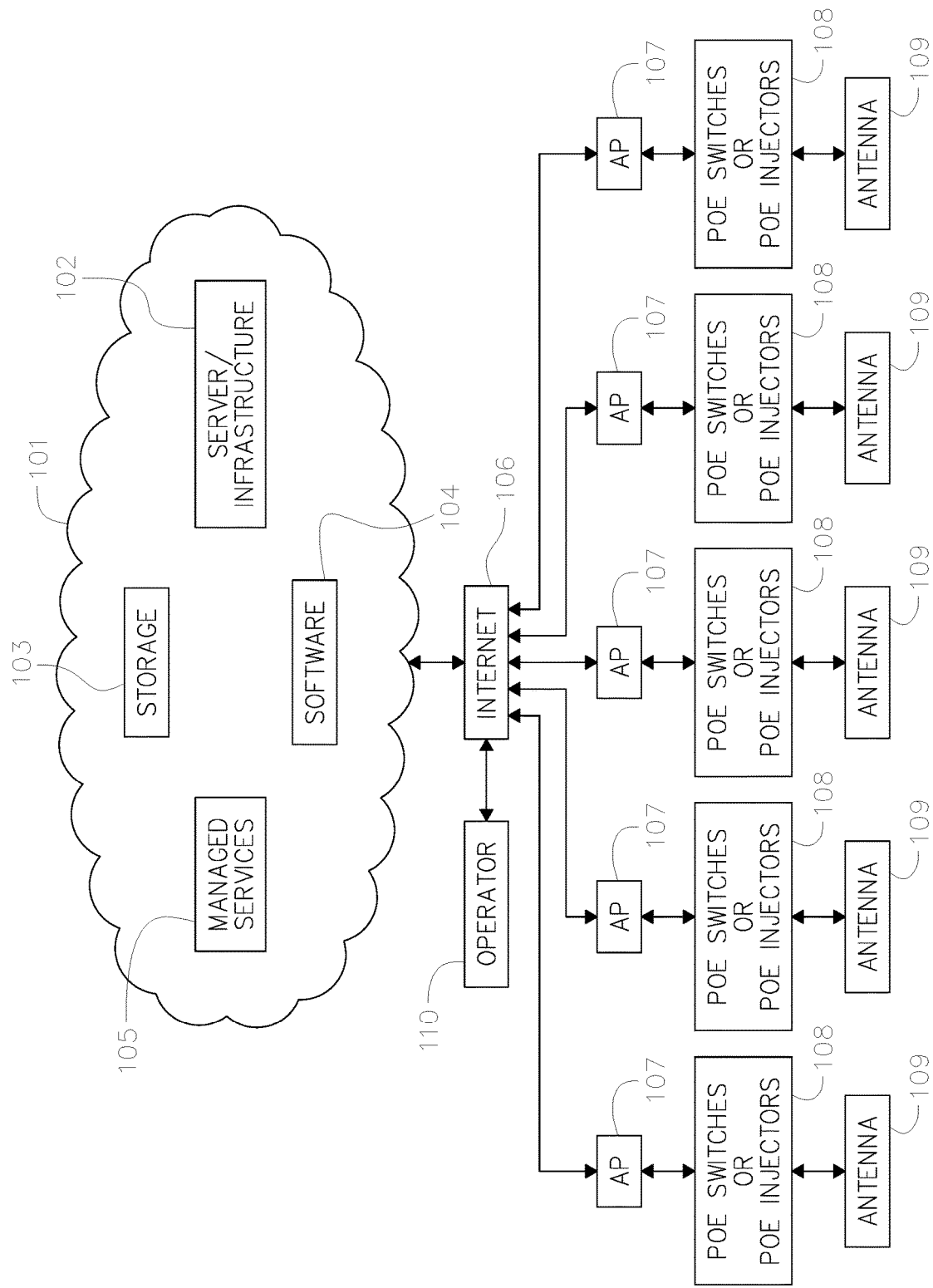
FIG. 1 One Possible Embodiment Of A Proprietary Cloud With SDA System Resources Configured To Connect To Internet Access Points For One Or More Antenna Devices FIG. 2 One Possible Set Of Physical Resources For An Operator To Access A Server Via The Internet In An Embodiment FIG. 3 Block Diagram Of An Embodiment Of An Antenna (Begin)

101 Proprietary Cloud
102 Server and Infrastructure (including networking hardware)
103 Storage (for data)
104 Software (including Antenna Management Software (AMS))
105 Managed Services
106 Internet
107 Access Point (AP)
108 POE Switch or Poe Injector
109 Antenna Device (may be referenced as Antenna or Device)
201 Computer
202 Keyboard
203 Mouse
204 Monitor
205 Modem to Internet or other WAN
301 A First Vertical Radiating Element ($E_1V$)
302 An N Vertical Radiating Element ($E_NV$)
303 A First Horizontal Radiating Element ($E_1H$)
304 An N Horizontal Radiating Element ($E_NH$)
305 A First Polarization Switch ($S_1$)
306 An N Polarization Switch ($S_N$)
307 A First Control Line For A Primary Amplifier ($CLA_1$)
308 An N Control Line For A Primary Amplifier ($CLA_N$)
309 A First Primary Amplifier ($A_1$)
310 An N Primary Amplifier ($A_N$)
311 Receive Path ($R_xN$)
312 Transmit Path ($T_xN$)
313 Low-Noise Amplifier (LNA)
314 Power Amplifier (PA)
315 MXN Radio Frequency Switch Matrix (RFSM)
316 Transmit/Receive (Transceiver) Path From A First Radiating Element ($TP/RP_{N=1}$)
317 Transmit/Receive (Transceiver) Path From A Second Radiating Element ($TP/RP_{N=2}$)
318 Transmit/Receive (Transceiver) Path From An Antepenultimate Radiating Element ($TP/RP_{N-2}$)
319 Transmit/Receive (Transceiver) Path From A Penultimate Radiating Element ($TX_{N-1}/RX_{N-1}$)
320 Transmit/Receive (Transceiver) Path From An Ultimate ($N^{th}$) Radiating Element ($TP_N/RP_N$)
321 A First Transmit/Receive (Transceiver) Path For A Radiofrequency Port Of A Modem ($TP/RP_{M=1}$)
322 A Second Transmit/Receive (Transceiver) Path For A Second Radiofrequency Port Of A Modem ($TP/RP_{M=2}$)
323 A Penultimate (M−1) Transmit/Receive (Transceiver) Path For Radiofrequency Port Of A Modem (TP/RPM-1)
324 An Ultimate ($M^{th}$) Transmit/Receive (Transceiver) Path For A Radiofrequency Port Of A Modem (TP/RPM)
325 Matrix Control Line
401 A First Secondary Amplifier ($B_1$)—(Optional)
402 An M Secondary Amplifier ($B_M$)—(Optional)
403 A First Radiofrequency Port Of A Modem ($P_1$)
404 An M Radiofrequency Port Of A Modem ($P_M$)
405 A First Control Line For A Secondary Amplifier ($CLB_1$)
406 An M Control Line For A Secondary Amplifier ($CLB_M$)
407 A First Envelope Detector ($D_1$)
408 An M Envelope Detector ($D_M$)
409 A First Radiofrequency Power Sensor Line ($PSL_1$)
410 An M Radiofrequency Power Sensor Line ($PSL_M$)
411 Connector
501 Signal And Control Processor With Firmware
502 Secondary Processor—(Optional)
503 Surrogate Control Line
504 Surrogate Sensor Line
505 Non-Volatile Memory
506 Red Light System Status Indicator
507 Green Light System Status Indicator
508 Audible Apparatus System Status Indicator
509 LAN Ethernet Interface
510 UART Interface
511 PoE Circuitry
512 Jack
513 A First Voltage Regulator $V_1$
514 A Second Voltage Regulator $V_2$
515 An N Voltage Regulator ($V_N$)
516 A First Magnetometer ($MAG_1$)
517 A Penultimate Secondary Magnetometer ($MAG_{N-1}$)—(Optional)
518 An Ultimate (N) Secondary Magnetometer ($MAG_N$)—(Optional)
519 A First Accelerometer ($ACC_1$)
520 A Penultimate Secondary Accelerometer ($ACC_{N-1}$)—(Optional)
521 An Ultimate (N) Secondary Accelerometer ($ACC_N$)—(Optional)
522 Control Line (CL)
523 Data Line (DL)
524 Power Line (PL)
601 Main Printed Circuit Board
602 NVRAM Chip to provide Non-Volatile Memory
603 FLASH Chip to provide Non-Volatile Memory
604 Backup Power Source 605 NVRAM Chip Pins To Accept Power From POE and Backup Power
606 Diode(s)
607 Power Chamber
608 POE Transformer
609 POE Controller
610 Data Connector
611 Embedded Server Module
612 Ethernet cable
613 UART Chip
614 Digital Temperature Sensor
615 Oscillator(s)
616 Multiplexer
617 Data Switch
618 Electronic Gates
619 GPS/GNSS Receiver
620 GPS/GNSS Switch
621 An RF Connector To A First GPS/GNSS Antenna (GPSA$_1$)
622 An RF Connector To A Second GPS/GNSS Antenna (GPSA$_2$)
623 An RF Connector To A Third GPS/GNSS Antenna (GPSA$_3$)
624 An RF Connector To A Fourth GPS/GNSS Antenna (GPSA+)
701 Central Cylindrical Core (Core, Central Core)
702 Reflective Panel (Reflector)
703 Face Side Of Reflective Panel (Reflector)
704 Back Side Of Reflective Panel (Reflector)
705 N Quadrant (QN)
706 Array(s)
707 First Printed Circuit Board
707F Front Side of First Printed Circuit Board
707B Back Side of First Printed Circuit Board
708 Second Printed Circuit Board
708F Front Side of Second Printed Circuit Board
708B Back Side of Second Printed Circuit Board
709 Third Printed Circuit Board
709F Front Side of Third Printed Circuit Board
709F Back Side of Third Printed Circuit Board
710 Fourth Printed Circuit Board
710F Front Side of Fourth Printed Circuit Board
710B Back Side of Fourth Printed Circuit Board
711 A First GPS/GNSS Antenna (GPSA$_1$)
712 A Second GPS/GNSS Antenna (GPSA$_2$)
713 A Third GPS/GNSS Antenna (GPSA$_3$)
714 A Fourth GPS/GNSS Antenna (GPSA$_4$)
801 Amplifier Printed Circuit Board
1001 Antenna Housing
1002 Cylindrical Form Factor
1003 Top Plate
1004 Bottom Plate
1005 External Side Of Top Plate
1006 External Side Of Bottom Plate
1101 Mast
1201 Sticker (Label) For MAC Address And Other Identification Data For An Antenna Device
1202 SMA Female External RF Ports
1203 Power Receptacle (Power Port)
1204 Directional Symbol
1205 Programming Connector Cover
1206 External Data Ports
1501 Map
1502 RF Geographic Coverage Area
1503 First True Bearing
1504 Second True Bearing
1505 Point of Origin
1701 Antenna Elevation Pattern
1702 Up-tilt Angle
1703 Down-tilt Angle
1801 Device List Page
1802 Add Device Button
1803 Device Page(s)
1804 Device List Page Navigation Buttons
1805 Check Button
1806 Name (of Device) Field
1807 Serial Number of Device) Field
1808 IP Address (of Device) Field
1809 MAC (Address of Device) Field
1810 Device Street Address/Location Flied
1811 Self-Status Test Field
1812 Firmware Status Field
1813 Action Button (Kebob Menu) Button Which Brings Up Sub-Menu for Edit, Update Firmware, and Status Buttons
1814 Sub-Menu (Pop-Up Menu)
1901 Add Device Page
1902 Registration Fields
1903 Cancel Button
1904 Save Button
2001 Edit Device Page
2002 Cancel Button
2003 Update Button
2101 Device Details Page
2102 Status Indicator
2103 Back Button
2104 Next Button
2105 Device Details
2196 Update Location Button
2107 Check Status Button
2108 Configure Button
2201 Align Device To North Page
2202 Graphic Display Of Antenna Quadrants
2203 Current Heading Display
2204 Align Device To North Button
2205 Alignment Instructions and Align Status Display
2206 Back Button
2207 Next Button
2401 Define Coverage Area Page
2402 Beginning of Coverage Area Field
2403 End of Coverage Area Field
2404 Calculate Button
2405 Reset Configuration Button
2601 Coverage Display Page with Illuminated Quadrants Highlighted (here, in black)
2602 Device Tilt Button
2701 Coverage Display Page with Up and Down Tilt shown for each Quadrant
2801 Profile Settings Page
2802 Normal (Normal-Polarization) and Foliage (Hybrid-Polarization) Indicators
2803 Port Selection Boxes
2804 Polarization Selection Circles
2805 Band Selection Circles
2806 Reconfigure All Button
2807 Send To Device Button
3001 Finalize Configuration Pop-Up Window
3002 Cancel Button
3003 Send To Device Button

DETAILED DESCRIPTION OF THE INVENTION

The following description and accompanying drawings are illustrative and are not to be construed as limiting.

Numerous specific details are described to provide a thorough understanding. However, in certain instances, well-known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" or substantially similar phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

1. SDA System a. Proprietary Cloud

In an embodiment, one or more computer servers 102 may be employed to provide a range of services, processes and functionality to one or more remotely located Antenna Devices 109 via a wired or wireless communications medium. One effective way to provide services, processes and functionality to one or more remotely located Antenna Devices 109 in an embodiment may be through cloud-computing, which is the on-demand availability of computer system resources, such as data storage and computing power, without direct active management by an end-user, such as a business customer. In an embodiment, a proprietary cloud, i.e., a cloud owned and operated by a single company to provide distributed software services to its customers, may comprise one or more servers 102, capable of being accessed remotely by operators (administrators or end-users) 110 with credentials over a Wide Area Network such as the Internet, as well as any software, databases, networking hardware, and other resources that run on, are controlled by, or work in conjunction with said one or more servers.

Figure 5:
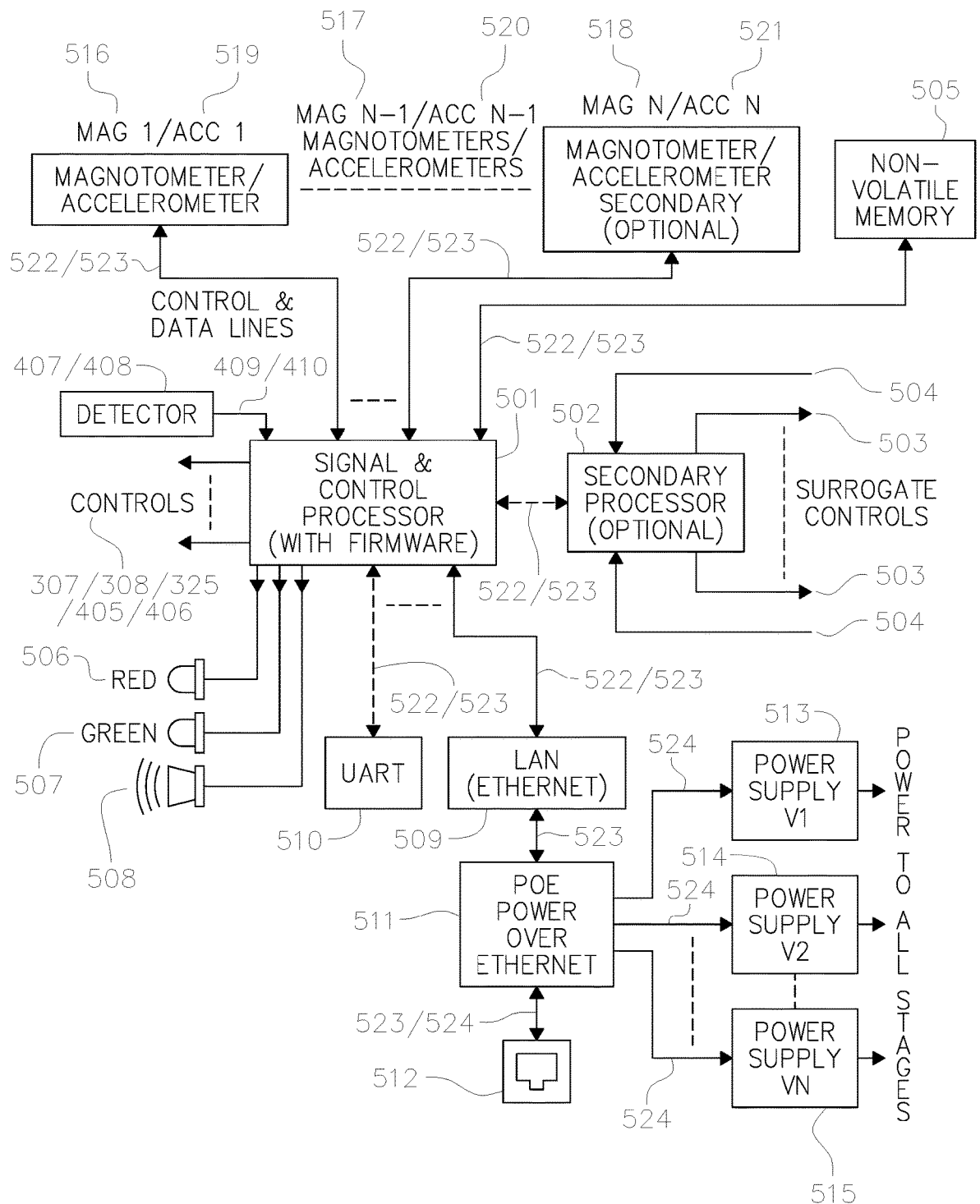
FIG. 5 Block Diagram Of An Embodiment Of An Antenna (End)

In an embodiment, as illustrated in FIG. 1, a proprietary cloud 101 comprising a server and infrastructure (including networking hardware) 102, storage 103 (for data, such as a database), software 104, and the capability of providing managed services 105 enables an operator to access remotely via the Internet 106 or another Wide Area Network (WAN) one or more Antenna Devices 109, each comprising an addressable, reconfigurable antenna with a plurality of separate, reflective panels (reflectors) configured to create a plurality of spatial segments, which may be quadrants, and capable of multiple-input, multiple-output (MIMO) as well as beam-forming when used in conjunction with an Access Point (APs) 107, a WiFi router, or a wired or radio modem. An Antenna Device 109 in an embodiment may be connected to the Internet 106 wirelessly or by any number of suitable wired means. An Antenna Device 109 must be configured to accept electrical current from at least one power source, which may be via a power receptacle 1203 (FIG. 12) which that could be a jack 511 (FIG. 5). An Antenna Device 109 that does not include a dedicated power receptacle may be connected to the Internet 106, in an embodiment, via a wired means that provides both data and power, such as an Ethernet cable coupled to a POE Switch or a POE Injector 108. In an embodiment, the latter may be attached to one or more Access Points (APs) 107, i.e., networking hardware allowing wireless electronic devices, such as a laptop computer, a smartphone, or a tablet to connect wirelessly to a wired network within a designated geographic location. An AP 107 may be a standalone device connecting to a Wide Area Network (WAN), such as the Internet 106, through a separate modem, through a modem integrated into an AP 107, or through devices such as modems, routers, and radios into which an AP 107 may be integrated. FIG. 1 contemplates an AP 107 integrated with a modem to enable connection to the Internet 106.

In an embodiment, software 104 includes Antenna Management Software (AMS)—which may utilize a Graphical User Interface (GUI)—running on a server 102, which may be located in a proprietary cloud. AMS may permit an operator to carry out one or more processes by which an Antenna Device 109 may be optimized dynamically to compensate for changes in radio protocol, propagation channel, or other variations in the operating environment. Furthermore, in an embodiment, via AMS, an operator may change the individual segments (e.g. quadrants) of an Antenna Device 109 are to be activated by port selection, permitting an Antenna Device 109 to act as a single panel antenna, a multiple panel antenna, or an omni-directional antenna. An embodiment may further allow an operator to select, by segment (e.g., quadrant), the polarization and band(s) to be used.

In an embodiment, AMS running on a server 102, which may be located in a proprietary cloud, may be employed to authenticate, configure, modify, optimize and re-optimize remotely one or more Antenna Devices 109. A server 102, in an embodiment, may also archive one or more firmware updates for one or more Antenna Devices 109, one or more locations of Antenna Devices 109, naming conventions for one or more Antenna Devices 109, one or more antenna profiles for one or more Antenna Devices 109, and display and interact with RF planning tools and satellite imagery of intended and existing coverage areas for one or more Antennae 109. One or more servers 102 in an embodiment may comprise physical components at a vendor's site, or could include virtual resources, e.g., remote servers allocated dynamically.

Figure 2:
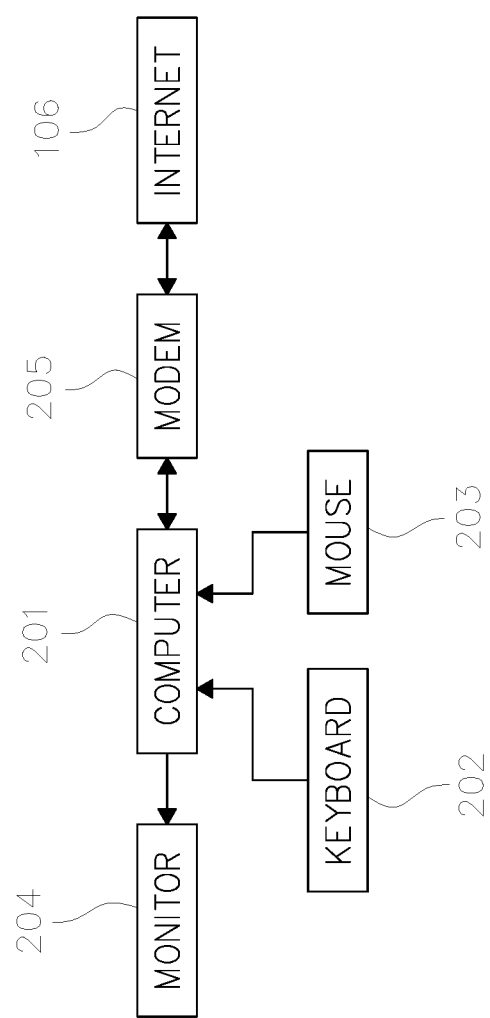

FIG. 2 illustrates some of the physical components that an operator, who may have full administrative privileges (an administrator) or more limited privileges (an end user), might employ in an embodiment to connect remotely via the Internet 106 to a server 102, which may be located in a proprietary cloud. An administrator might use similar physical components in an embodiment to access directly on-premises at a data center a server 102 and other resources within a private cloud 101.

In an embodiment, these physical components may include any suitable computing device 201, such as, by way of example and not limitation, a desktop computer, a laptop computer, or a cellular smart phone configured to accept input from an operator and display output to an operator. A computing device may be configured to accept input from any suitable digital device and output. By way of example and not limitation, as illustrated in FIG. 2, a computing device may be configured to accept input and output from various peripheral devices. Input peripheral devices may include a keyboard 202, a mouse 203, or both, or a touch screen, e.g., on a tablet, smartphone, or other device. Additionally, by way of example and not limitation, as illustrated in FIG. 2, a computing device may be configured to display output on a monitor (display) 204, such as a CRT (Cathode Ray Tube), LCD (Liquid Crystal Display), or LED (Light-Emitting Diodes) monitor, a touch screen, a printer, or other devices known now or developed later. In an embodiment, connection to the Internet 106 to access remotely a private cloud 101 may be achieved via networking hardware, such as a wired or wireless modem 205. Peripheral networking devices may permit data to be retrieved from or sent to an external source, and further enable the results of operations to be saved and retrieved.

b. Software-Defined Antenna Device

In radio engineering, an antenna is an interface between radio waves propagating through space and electric currents moving in one or more metal conductors called antenna radiating elements (radiating elements or elements), used with a transmitter or receiver, or both. In an embodiment, radiating elements may be comprised of copper, or any other suitable conductive material known or to be discovered.

An embodiment may comprise one or more Antenna Devices 109, corresponding firmware (which may be proprietary) and a matrix stored in memory in each Antenna Device 109, a private cloud 101, and AMS 104 which may be stored and running on a server 102 in said private cloud 101. In an embodiment, one or more Antenna Devices 109 may be access point agnostic antennae, i.e., antennae that, through firmware changes, can be made to work with any AP 107 equipped with external RF ports, and which may allow for simultaneous operation of one or more sectors, frequencies, polarizations, and RF geographic coverage areas. In an embodiment, an Antenna 109 may comprise a plurality of radiating elements divided evenly over each of four 90-degree quadrants.

Figure 3:
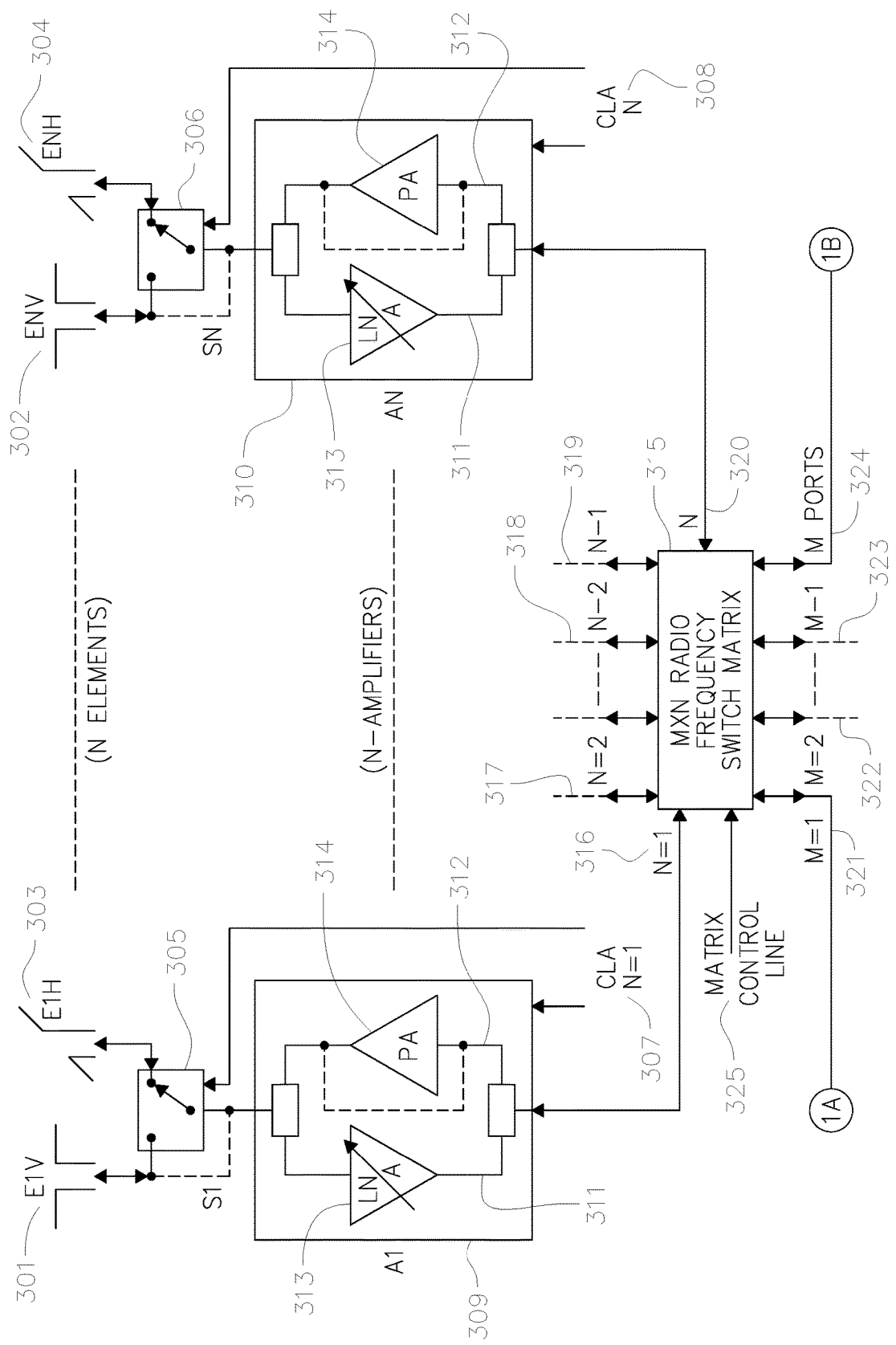
FIG. 3A A Two-Amplifier Circuit Design With An LNA In Each Receive Path To Support Dual-Band Operation FIG. 3B A Single Amplifier Circuit Design With An LNA In Each Receive Path And A Single Shared Transmit Path To Support Dual-Band Operation FIG. 4 Block Diagram Of An Embodiment Of An Antenna (Continue)
Figure 3A:
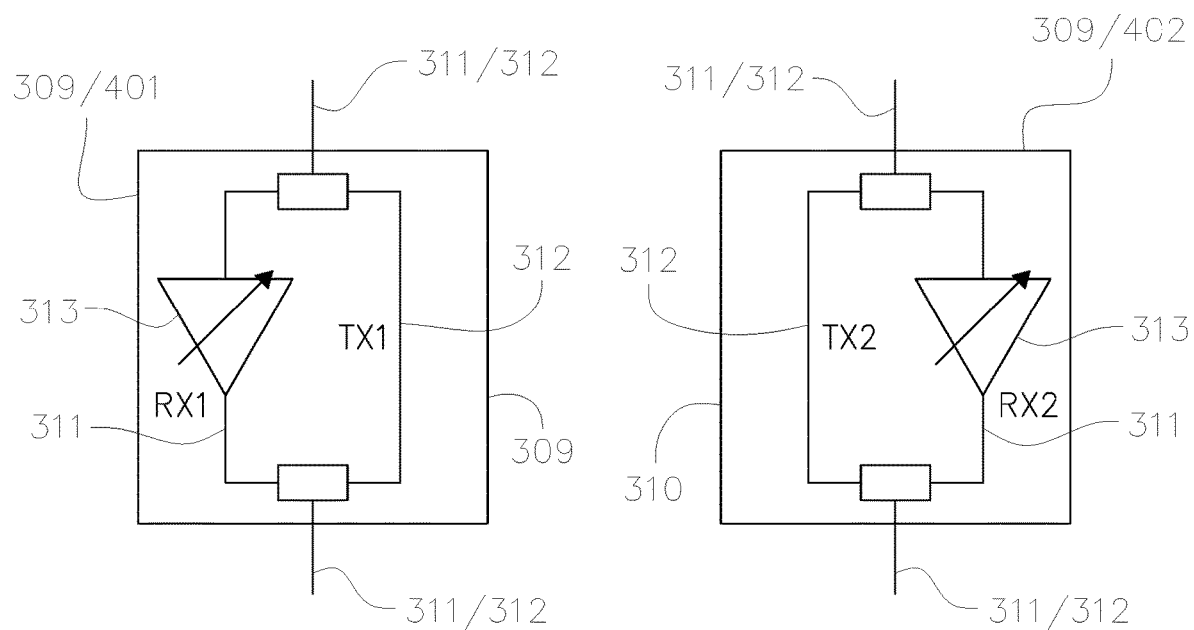
Figure 3B:
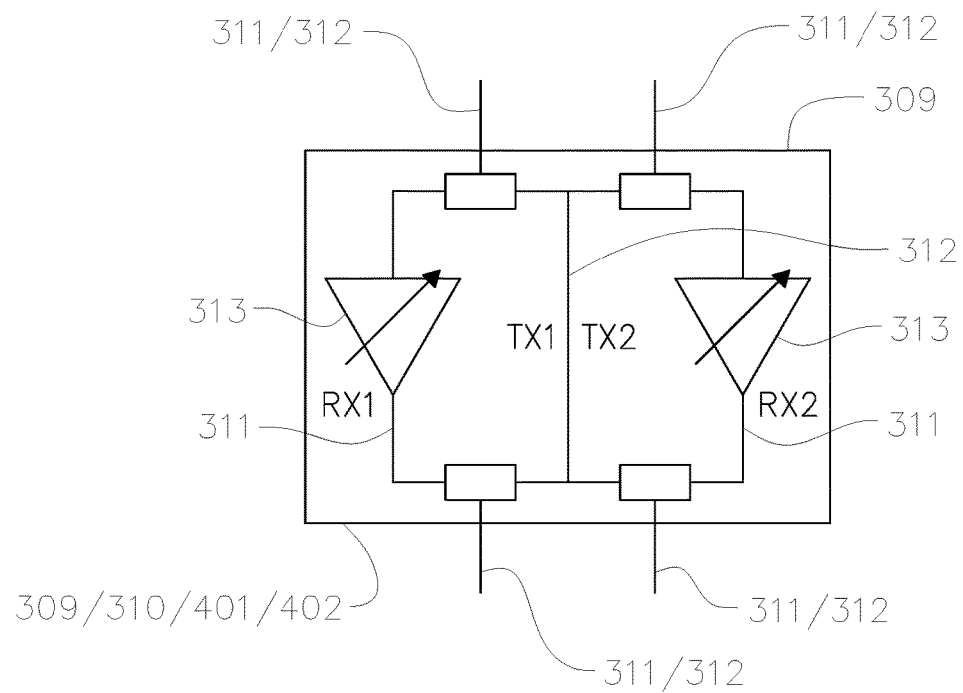
Figure 4:
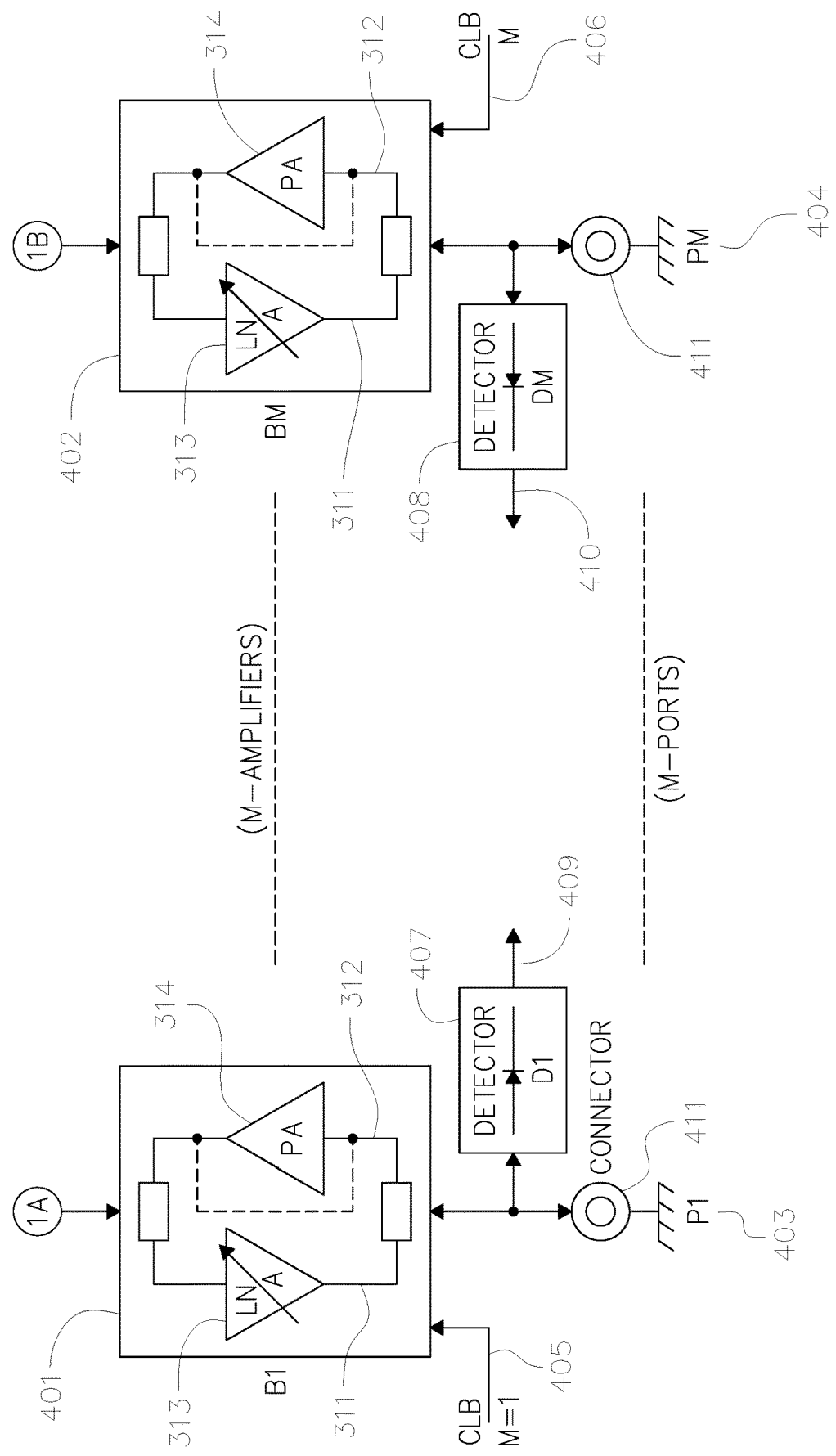

FIGS. 3, 4, and 5 together constitute a block diagram illustrating one possible embodiment of a general, cloud-configurable Antenna 109 with magnetometer and accelerometer feedback. FIG. 3 reflects that an embodiment may have one vertical element $E_1V$ 301 comprised of one or more radiating elements, or may have a plurality of such vertical radiating elements $E_1V$ 301, $E_NV$ 302. An embodiment may have one horizontal element $E_1H$ 303 comprised of one or more radiating elements, or may have a plurality of such horizontal radiating elements $E_NH$ 304. Each radiating element $E_1V$ 301, $E_NV$ 302 $E_1H$ 303, $E_NH$ 304 will have a receive (input) signal path 311 and a transmit (output) signal path 312. These paths may be joined into a single transceiver path. If desired or required, a transmit path and a receive path may be separated at one or more places along a transceiver path.

In an embodiment, by way of illustration but not limitation, the radiating elements—$E_1V$ 301, $E_NV$ 302 $E_1H$ 303, $E_NH$ 304—may be comprised of dipoles (radiating structures supporting a line current so energized that the current has only one node at each end) or collinear arrays (sets of multiple connected elements which work together as a single antenna) of dipoles. Each of the vertical elements $E_1V$ 301, $E_NV$ 302 may receive and radiate vertically polarized signals, i.e., electromagnetic waves with the electric field in the vertical plane, while each of the horizontal elements $E_1H$ 303, $E_NH$ 304 may receive and radiate horizontally polarized signals, i.e., electromagnetic waves with the electric field in the horizontal plane. In an embodiment, through the application of circuitry and firmware, a mode may be activated in an Antenna 109 via AMS running on a server 102 that causes one or more vertical elements and one or more horizontal elements of an Antenna 109 to interact, creating a hybrid polarization.

Optionally, as illustrated in FIG. 3, an embodiment may include one or more polarization switches $S_1$ 305, $S_N$ 306, each of which may be coupled to a transmit path, a receive path, or a transceiver path of an associated vertically polarized radiating element, and to the transmit path, receive path, or transceiver path of an associated horizontally polarized radiating element, each said polarization switch being configured to allow selection of either an associated vertical element $E_1V$ 301, $E_NV$ 302 or an associated horizontal element $E_1H$ 303, $E_NH$ 304. Polarization switches $S_1$ 305, $S_N$ 306 in an embodiment may be operated via one or more control (output) lines N=1 307, N 308 that originate at a signal and control processor with firmware 501 (as presented in FIG. 5).

In an embodiment, if one or more polarization switches $S_1$ 305, $S_N$ 306 are included, each such polarization switch may be interposed between vertical and horizontal radiating elements $E_1V$ 301, $E_NV$ 302 $E_1H$ 303 $E_NH$ 304, on the one hand, and a primary amplifier $A_1$ 309, $A_N$ 310 coupled to a polarization switch by a transceiver line, thereby accessing a vertical or a horizontal radiating element $E_1V$ 301, $E_NV$ 302 $E_1H$ 303 $E_NH$ 304 as selected by a polarization switch.

In an embodiment, an amplifier, e.g., $A_1$ 309, $B_1$ 401, may be a bidirectional amplifier (BDA) supporting a receive path 311 and a transmit path 312. Moreover, in an embodiment, an amplifier may comprise within its circuitry one or more embedded active filters for, inter alia, suppression of out-of-band noise. An amplifier, in an embodiment, may include within its circuitry one or more multiplexers (data selectors) to choose between a plurality of digital input signals and forward the chosen digital input signal to a single output line, or to take a single digital signal from a single line and combine it into a plurality of digital output signals.

Any amplifiers in an embodiment, e.g., $A_N$ 309, $B_N$ 401, could include in a receive path 311 one or more variable-gain, low-noise amplifiers (LNAs) 313 which vary gain depending on a control voltage or digital control, permitting amplification of a very low-power reception signal without significantly degrading its signal-to-noise ratio. Thus, transmit signals may pass between any of the one or more elements $E_1V$ 301, $E_NV$ 302 $E_1H$ 303, $E_NH$ 304 over their respective transmit paths and receive signals may pass between any of said one or more elements over their respective receive paths to their respective one or more amplifiers $A_N$ 310, $B_N$ 402, either directly or by way of any optional polarization switches $S_N$ 306.

As further illustrated in FIG. 3, in an embodiment, an amplifier, e.g., $A_1$ 309, $A_N$ 310, electively could include a power amplifier (PA) 314 in a transmit path 312 to enhance transmit signals. In an embodiment, switches within the circuitry of a bidirectional amplifier, e.g., $A_1$ 309, $A_N$ 310, which may cause the amplifier $A_1$ 309, $A_N$ 310 to shift between receive and transmit signal paths 311, 312, may be operated via one or more control lines N=1 307, N 308 that originate at a signal and control processor with firmware 501 (FIG. 5).

Multiple bands, whether or not licensed by the Federal Communications Commission (FCC) may be separated from a single transmit path, a single receive path, or a transceiver path, and separated lines may be joined into a single path by one or more multiplexers, i.e., passive apparatus that implement frequency-domain multiplexing Filters in the circuitry of an amplifier $A_1$ 309, $A_N$ 310, for example, may be employed in an embodiment to create a diplexer to separate RF bands, e.g., 2.4 MHz from 5 MHz. Such dual-band operation may employ two LNAs 312 in an embodiment, one for the receive path 311 of each RF band, and a single transmit path 312 to be utilized by all RF bands where no power amplifier is employed.

In an embodiment, transmit and receive signals may pass between the one or more amplifiers $A_1$ 309, $A_N$ 310 to a Radio Frequency Switch Matrix (RFSM) 315 as shown in FIG. 3. An RFSM 315, in an embodiment, may accommodate one or more transmit/receive paths N=1 316, N=2 317, N−2 318, N−1 319, N 320 from one or more elements $E_1V$ 301, $E_NV$ 302 $E_1H$ 303, $E_NH$ 304, and may support one or more transmit/receive paths M=1 321, M=2 322, M−1 323, M 324 for one or more modems or for one or more radio modems, or for a combination thereof. Thus, various combinations of elements may be connected to various combinations of modem RF ports or radio modem RF ports, or both. In an embodiment, both synchronous and asynchronous RF ports may be supported. Any suitable connection configuration to an RF Port, such as Sub-Miniature version A (SMA) coaxial connectors, may be employed in an embodiment.

The number of radiating elements N may be greater than the number of RF ports M, and in principle, each port can accept connection to only one element at a time. For example, in an embodiment with 32 radiating elements and four RF ports, radiating elements 8, 16, 24, and 32 could be connected, respectively to RF ports 1, 2, 3 and 4 of a single modem, or to each single RF port of four separate radio modems. An RFSM 315 may be operated by means of a matrix control line 325 to a matrix control embedded in a signal and control processor with firmware 501 (FIG. 5).

In an embodiment, one or more secondary amplifiers $B_1$ 401, $B_M$ 402, as illustrated in FIG. 4, may be interposed between an RFSM 314 and one or more RF ports M=1 403, M 404 to boost signal gain. If bidirectional, any such amplifier $B_1$ 401, $B_M$ 402 could include a variable-gain LNA 313 along a receive path 311, and optionally, a PA 314, which may be bi-passable, along a transmit path 312. Further, if bidirectional, one or more amplifiers $B_1$ 401, $B_M$ 402 in an embodiment may comprise one or more switches within their circuitry allowing the one or more amplifiers $B_1$ 401, $B_M$ 402 to shift between their respective signal paths 311, 312. The switches may be operated via one or more control lines M=1 405, M 406 that originate at a signal and control processor with firmware 501 (illustrated in FIG. 5).

As further shown in FIG. 4, in an embodiment, one or more RF envelope detectors (power sensors) $D_1$ 407, $D_M$ 408 may be connected to one or more transmit paths or transmit/receive paths (transceiver paths) M=1 321, M 324 between an RFSM 314 and one or more RF ports M=1 403, M 404. Each such envelope detector 407, 408 measures the electrical power passing through a transmit/receive path M=1 321, M 324, which measurements may be sent via an RF power sensor line 1 409, M 410 to a signal and control processor with firmware 501 (FIG. 5). Output from an envelope detector 407, 408 may be used by a signal and control processor with firmware 501 to determine whether to switch an Antenna 109 to transmit or receive.

In an embodiment, one or more transmit/receive paths M=1 321, M 324 may be connected to one or more RF Ports (Connectors) M=1 403, M 404 of one or more wired modems—e.g., cable modems, Digital Subscriber Line (DSL) modems, fiber modems, dial-up modems, or a combination thereof—or radio modems $P_1$ 411, P 412, or a combination thereof. As illustrated in FIG. 4, in an embodiment, this may be accomplished by way of a coaxial connector 413 or any other suitable connector that a wired modem or radio modem may be configured to accept.

FIG. 5 illustrates an embodiment featuring a signal and control processor with firmware 501, comprising one or more processors, which may include micro-controllers, microprocessors, or a combination thereof. A signal and control processor in an embodiment provides combinatorial logic for signal processing and may include a plurality of controls and sensors for configuring and operating, or reading data from, various components of an Antenna 109, including, but not limited to, one or more radiating elements $E_1V$ 301, $E_NV$ 302 $E_1H$ 303, $E_NH$ 304, one or more optional polarization switches $S_1$ 305, $S_N$ 306, one or more amplifiers $A_1$ 309, $A_N$ 310, $B_1$ 401, $B_M$ 402, one or more RFSMs 314, one or more envelope detectors $D_1$ 407, $D_M$ 408, one or more secondary processor(s) 502, forms of non-volatile memory (NVM) 505 such as RAM chips 602 backed up by batteries 604 or FLASH chips 603 (see FIG. 6), one or more system status indicators 506, 507, 508, one or more magnetometers $MAG_1$ 516, $MAG_N$ 517, $MAG_P$ 518, one or more accelerometers $ACC_1$ 519, $ACC_N$ 520, $ACC_P$ 521, one or more digital temperature sensors 611 (FIG. 6), one or more crystal oscillators 612 (FIG. 6), and other components that may be employed to carry out the functional features of an Antenna Device 109.

Figure 7A:
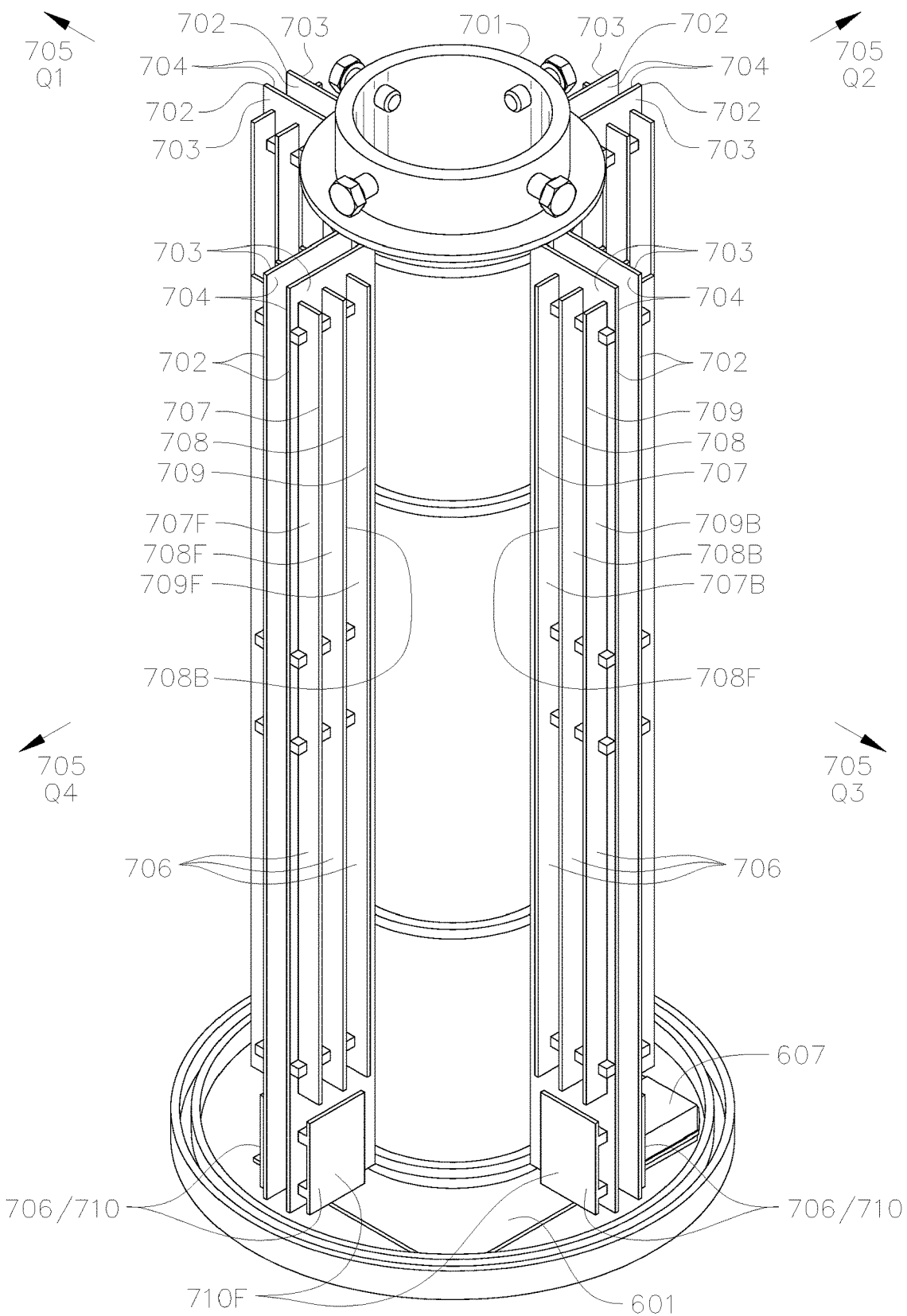
Figure 7B:
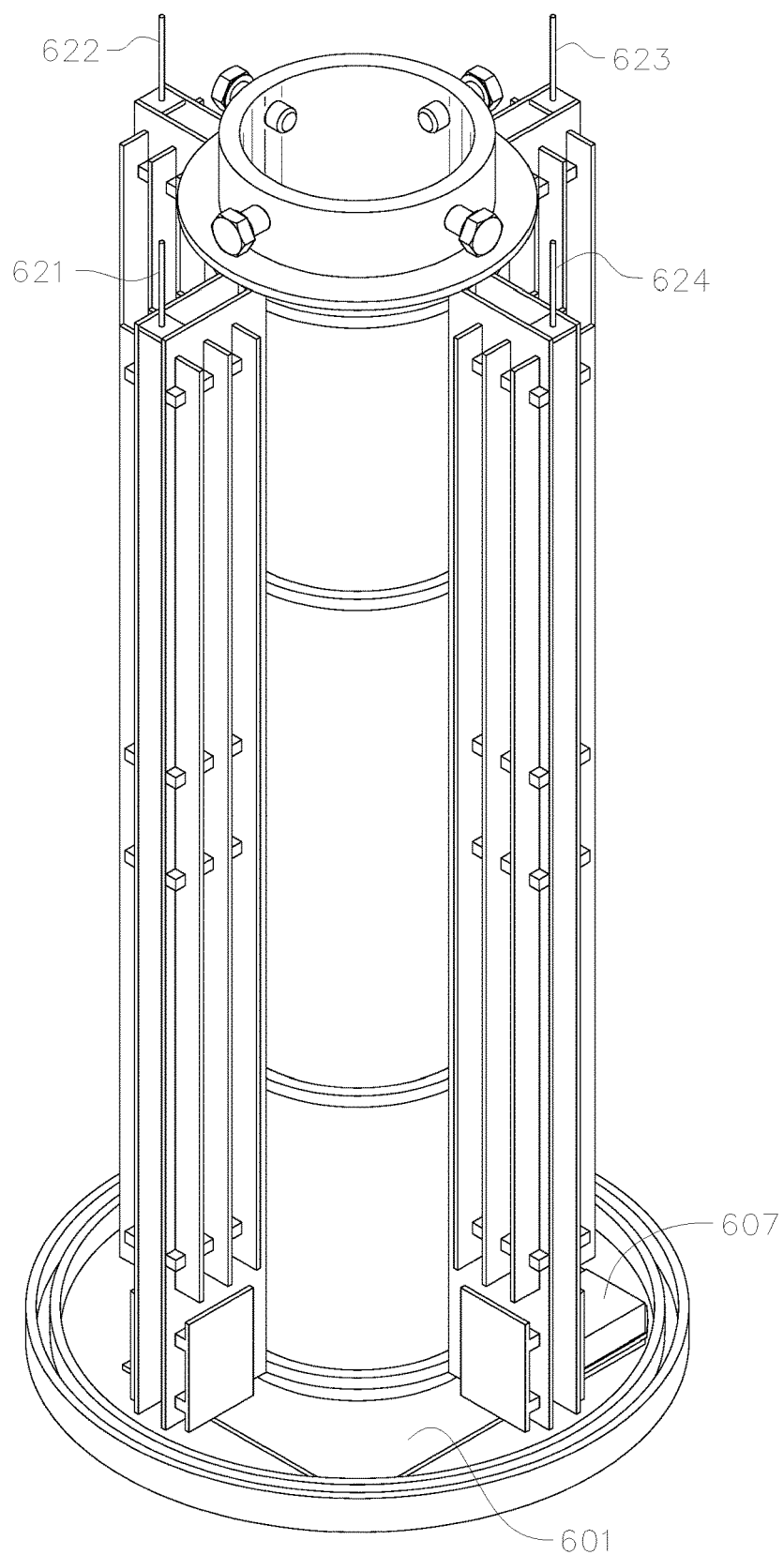
Figure 8:
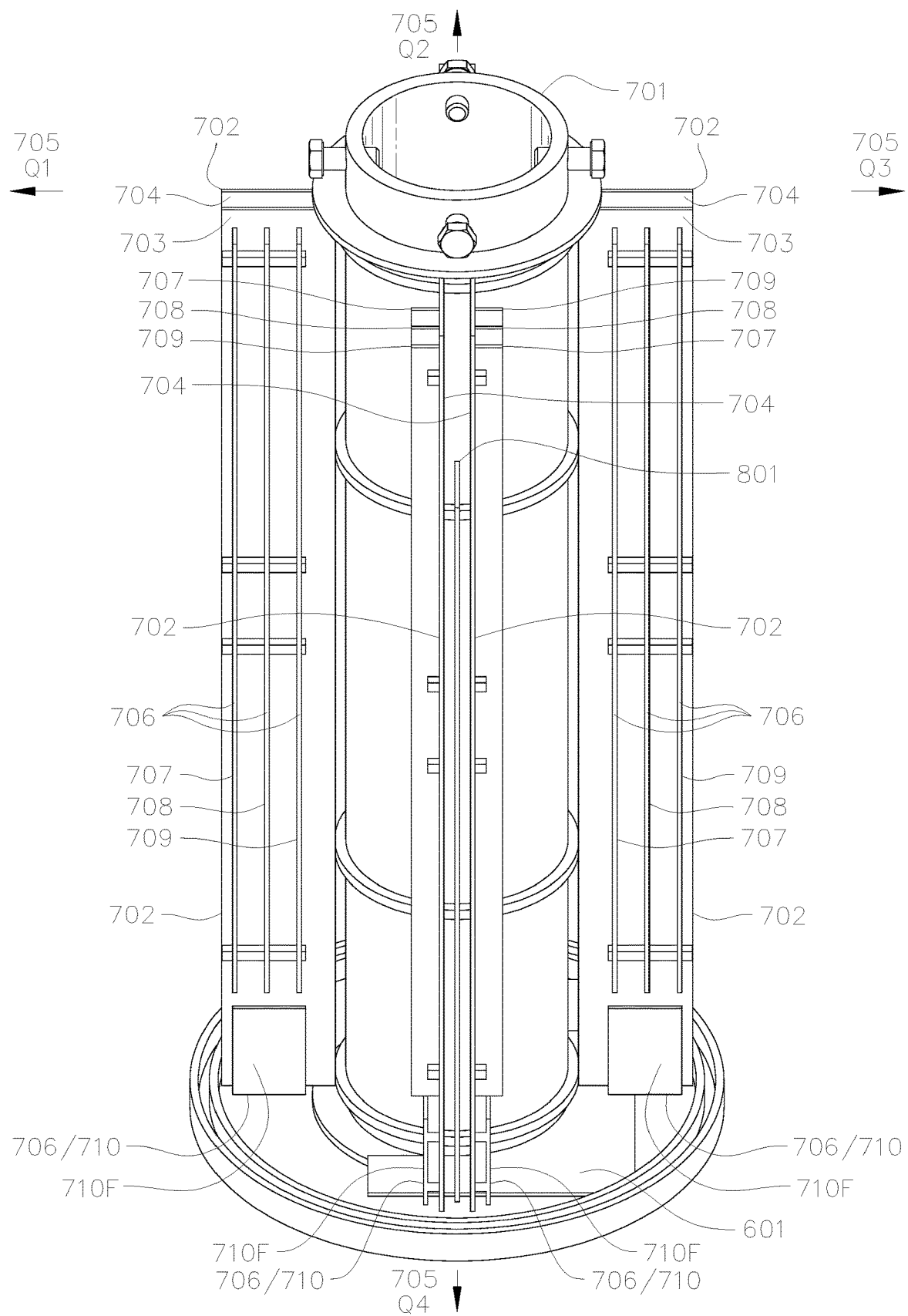
Figure 9:
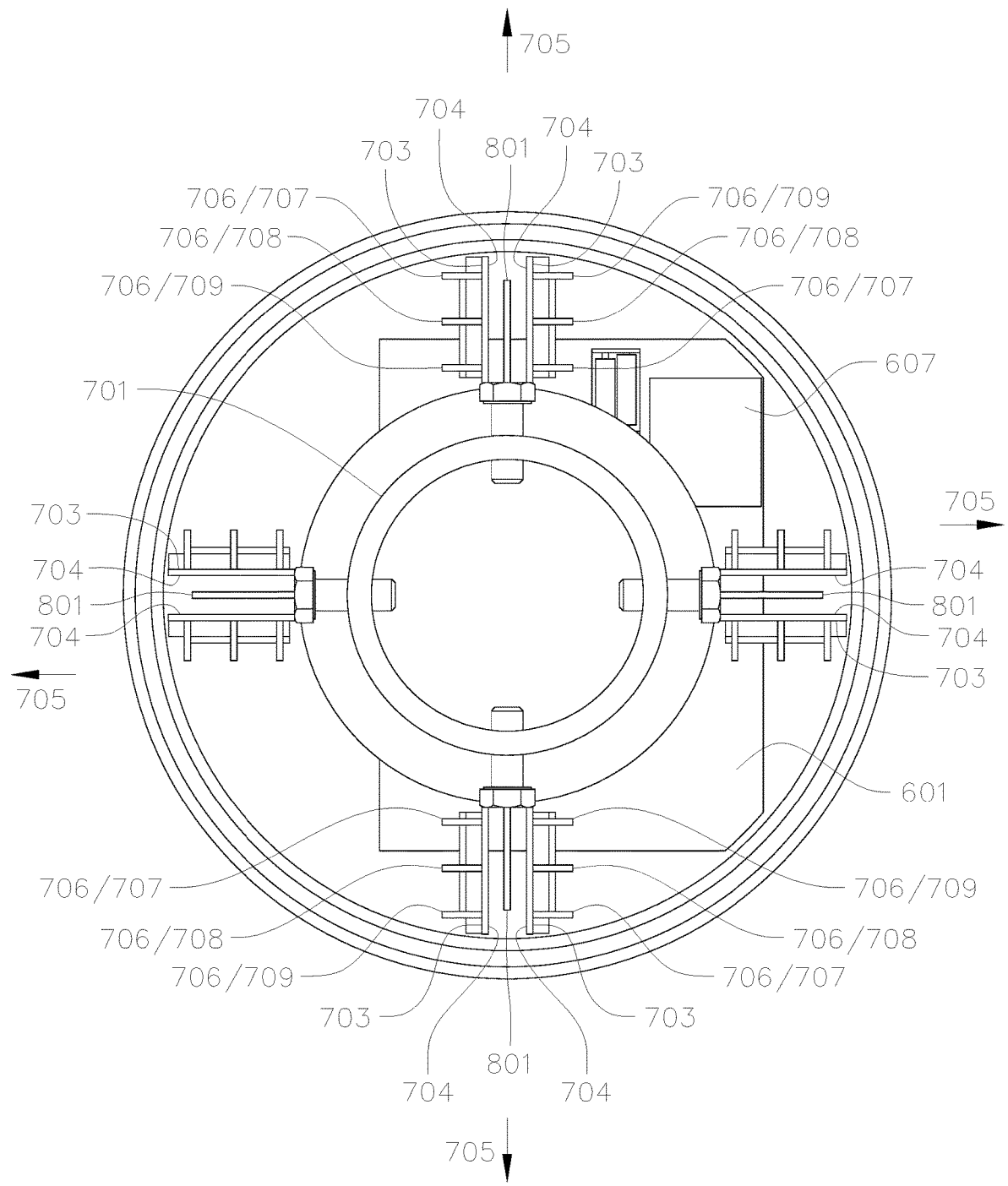

A signal and control processor with firmware 501 in an embodiment may be distributed across one or more printed circuit boards, such as a main printed circuit board 601 (FIG. 6) and one or more amplifier printed circuit boards 801 (see FIGS. 8-9). The latter circuit boards may be secured between the back sides 704 of two adjacent reflective panels 702 (see FIG. 7) and carry embedded amplifiers $A_1$ 309, $A_N$ 310, $B_1$ 401, $B_M$ 402 and various other Antenna 109 components, including, e.g., magnetometers $MAG_1$ 516, $MAG_{N-1}$ 517, $MAG_N$ 518, accelerometers $ACC_1$ 519, $ACC_{N-1}$ 520, $ACC_N$ 521, digital temperature sensors 611, etc. As further shown in FIG. 5, an embodiment may include an optional secondary processor 502 and surrogate controls 503 and sensors 504 to carry out desired functions with respect to an Antenna Device 109, e.g., the creation of virtual ports by putting multiple ports on a single quadrant and then rotating those ports to one or more of the remaining quadrants. The use of one or more dedicated secondary processors 502 in an embodiment, operating at the direction of a signal and control processor with firmware 501, may reduce central processing unit (CPU) and memory overhead for the latter processor 501, thereby potentially achieving greater efficiency and speed with respect to routine tasks and functions.

Figure 6A:
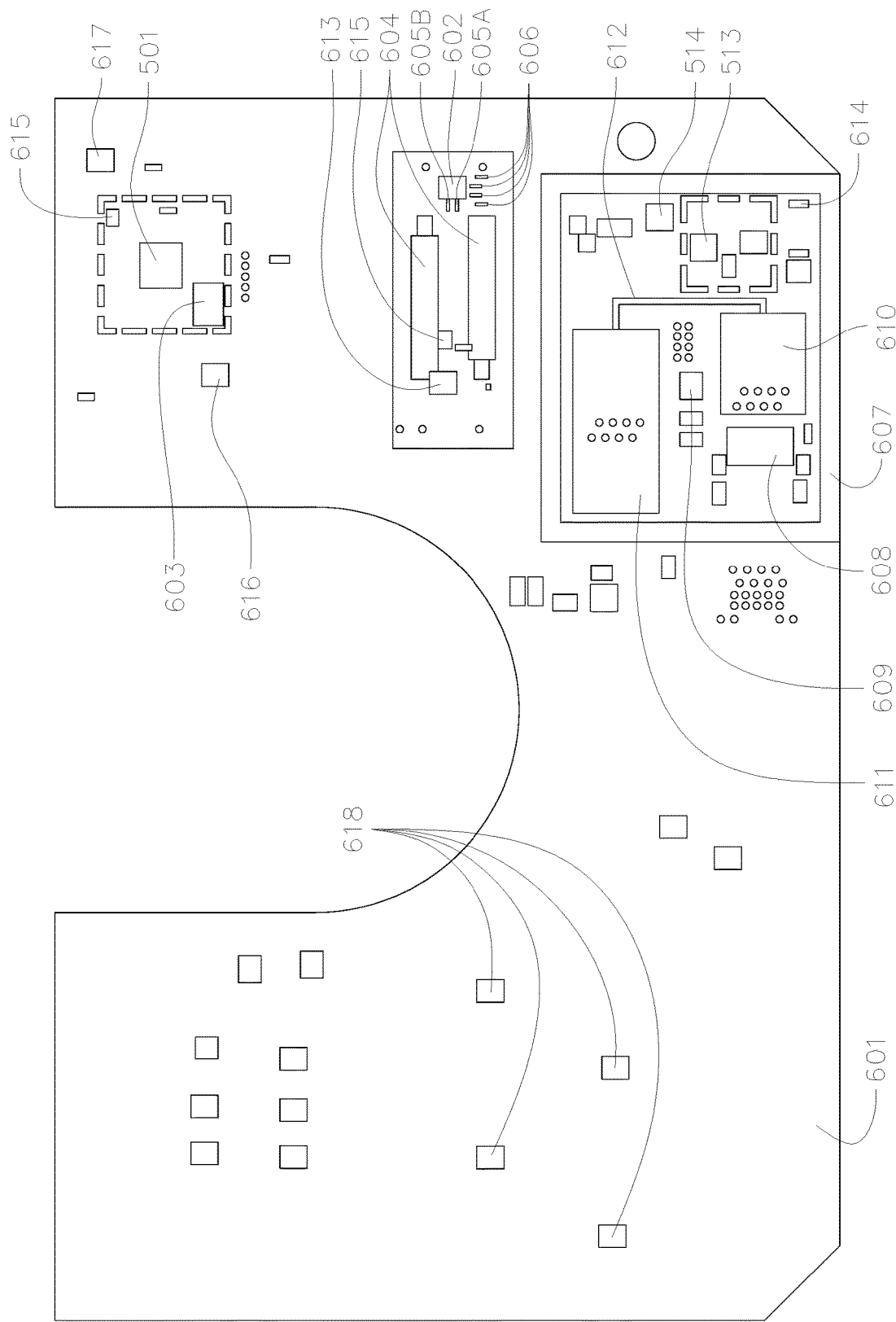

In an embodiment, a signal and control processor with firmware 501 may include NVM 505 embedded in the circuitry of one or more of its processors. Moreover, in an embodiment, various forms NVM memory may be implemented as semiconductor memory, in which data is stored on monolithic integrated circuits (chips or microchips), located on a main printed circuit board 601 (FIG. 6A). NVM may be used, for example, to store logs, firmware updates, settings, or any other internally useful data. In an embodiment, any such stored data may be mirrored or copied via the Internet to a data storage resource 103 in a private cloud 101.

NVM 505 in an embodiment may be comprised of non-volatile random-access memory (NVRAM), flash memory (FLASH), electrically erasable programmable read-only memory (EEPROM), or some combination thereof. In an embodiment, NVRAM may be provided by one or more NVRAM chips 602 (FIG. 6A). Flash memory may be provided by one or more FLASH chips 603 (FIG. 6A) in an embodiment. EEPROM, too, may be provided in an embodiment by one or more EEPROM chips located on a circuit board, including a main printed circuit board 601, or embedded within the circuitry of a signal and control processor with firmware 501, or both.

To provide power backup for one or more RAM chips 602 to create NVRAM, an embodiment may be configured to accept one or more batteries 604 (FIG. 6A). An NVRAM chip 602 may have two pins 605, one to accept power from an external power source for an Antenna 109, and one to accept power from a back-up source, e.g., batteries 604. In an embodiment, a diode 606 may be interposed between each of one or more batteries 604 and a RAM chip 602, and two diodes 606 between an external power source for an Antenna 109 and said RAM chip 602.

In an embodiment, one or more backup batteries 604 may be rechargeable, and each may be charged independently in accordance with its monitoring by a signal and control processor with firmware 501. When there is power to an Antenna 109, a signal and control processor with firmware 501 keeps backup batteries 604 switched off and charged, but when power to an Antenna 109 drops below a designated voltage, as may be set through firmware, the backup batteries 604 are switched on to preserve RAM. Additionally, an embodiment may include any number of both visible and audible system status indicators, such as colored lights 506, 507 and audible apparatus 508 which may, inter alia, be used to provide alerts when power to an Antenna 109 has dropped below a designated voltage.

In an embodiment, a signal and control processor with firmware 501 may comprise one or more interfaces for data input and output. By way of example, and not limitation, as illustrated in FIG. 5, there could be, in an embodiment, a local area network (LAN) Ethernet interface 509 or a Universal Asynchronous Receiver and Transmitter (UART) interface 510, or both, to connect to networking hardware (e.g., to a modem). Other forms of interfaces could include, again, by way of example and not limitation, an ethernet process peripheral or an input-output surrogate model. In an embodiment, an Antenna Device 109 may include one or more external data ports 1206 (FIG. 12), each acting as a point of attachment for a data cable or other wired means of carrying data to and from the Antenna Device 109. External data ports 1206 come in many forms that may be found in an embodiment, such as female SMA data ports 1202 (FIG. 12) and jacks 512, or combinations thereof. An external data line for a jack 512 may be an Ethernet cable. A data line 523, either directly or indirectly, may deliver data input and output between an external data port 1206 to a data interface.

In an embodiment, an Antenna Device 109 may be configured to accept electrical power via a power receptacle 1203 (FIG. 12) for delivery by power lines to all stages of the Antenna Device 109. A power receptacle 1203 may be, by way of example and not limitation, a power plug, a power socket, a coaxial cable connector, a jack, or any other suitable form of power receptable known in the art or to be discovered. A power receptacle 1203 may, but need not necessarily, be dedicated to the delivery of electrical power alone.

As shown in FIG. 5, in an embodiment, a Power over Ethernet (POE) system 511, interposed between a LAN Ethernet interface 509 and a jack 512, such as an RJ45 Port configured to accept an Ethernet cable, such as a CAT 5 or CAT 6, may be included to enable an Antenna Device 109 to be powered via an Ethernet connection. In such a case, the 48 volts typically carried over an Ethernet cable may be converted by one or more voltage regulators $V_1$ 513, $V_2$ 514, $V_N$ 515 to accommodate the varying power supply needs of all stages of an Antenna Device 109, for instance, where 5.0 volts and 3.3 volts would be required for different components of an Antenna Device 109.

As illustrated in FIG. 6A, in an embodiment, a power chamber 607 may house some PoE circuit 511 components. PoE transformer 608 for separating data and power coming from an Ethernet cable. In an embodiment, a PoE Controller 609 within a power chamber 607 may negotiate power consumption with the source of power for an Antenna 109.

A power chamber in an embodiment further may house a data connector 610, as well as an embedded server module 611, such as a Lantronix X-Port embedded server module, to act as a LAN Ethernet interface 509. In an embodiment, both a data connector 610 and an embedded server module 611 may be configured to accept a data transmission line, which may be an Ethernet cable, for the transmission of input and output data between them. A data connector 610 in an embodiment thus may serve to intermediate data between a POE transformer 608 and an embedded server module 611. In an embodiment, a UART chip 612 on a main printed circuit board 601, serving as a UART interface 510, may serve to intermediate data between an embedded server module 611 and a signal and control processor with firmware 501.

As further illustrated in FIG. 6A, in an embodiment, two voltage regulators $V_1$ 513, $V_2$ 514 may be located within a power chamber 607. In an embodiment, at least one voltage regulator $V_1$ 513 may accept input of 48 volts from a POE transformer 608 following its separation from data and reduce it to a lower fixed output voltage. Moreover, in an embodiment, stepped-down current from one voltage regulator $V_1$ 513 may be supplied to one or more additional voltage regulators, e.g., $V_2$ 514. Because a power chamber 608 may generate significant heat, a digital temperature sensor 611 may be included in a power chamber 608 in an embodiment to permit monitoring by a signal and control processor with firmware 501.

In an embodiment, a signal and control processor with firmware 501 may accept data from, and send commands to, one or more magnetic field sensors (magnetometers) $MAG_1$ 516, $MAG_{N-1}$ 517, $MAG_N$ 518 in an Antenna Device 109. An embodiment may also include one or more accelerometers $ACC_1$ 519, $ACC_{N-1}$ 520, $ACC_N$ 521 to measure proper acceleration. Each such accelerometer may provide data to, and accept commands from, a signal and control processor with firmware 501. Magnetometers $MAG_1$ 516, $MAG_{N-1}$ 517, $MAG_N$ 518 and accelerometers $ACC_1$ 519, $ACC_{N-1}$ 520, $ACC_N$ 521 in an embodiment may be combined on a single chip which may, but need not, include a digital temperature sensor 611. Magnetometers $MAG_1$ 516, $MAG_{N-11}$ 517, $MAG_N$ 518, accelerometers $ACC_1$ 519, $ACC_{N-1}$ 520, $ACC_N$ 521, and digital temperature sensors 611, whether or not combined on a single chip, may be embedded on one or more amplifier printed circuit boards 801 (FIGS. 8-9).

In an embodiment, a signal and control processor with firmware 510 may include in its circuitry a module and communication stack with a unique MAC address, allowing an Antenna Device 109 to be assigned a unique serial number. In an embodiment, an Antenna Device 109 may also be assigned a unique routable, static Internet Protocol (IP) address by an operator, enabling the Antenna Device 109 to attach to a local area network (LAN). In an embodiment, once an Antenna Device 109 is powered up and attached to a LAN, it may send data to and receive data from a server 102 via the Internet 107 or some other wide area network (WAN). In an embodiment, all communications between an Antenna Device 109 and a server 102 may be encrypted utilizing, for example, an AES 256 bit encryption standard to keep the server 102 secure.

As reflected in FIGS. 7-9, in an embodiment, an Antenna Device 109 may incorporate a core cylinder 701 defining a hollow center, which core cylinder 701 may be configured to secure it to both a surrounding housing structure and a support or mounting structure. A main printed circuit board 601 may be configured to encircle a portion of a core cylinder 701. In an embodiment, a plurality of reflective panels 702, each having a face side 703 and a back side 704, may be attached to and surround a core cylinder 701 to create segments. As further shown in FIGS. 7-9, in an embodiment, eight reflective panels 702 may be employed to create four segments (quadrants) $705_{Q1-Q4}$. In an embodiment, a reflective panel 702 may be comprised of aluminum or other suitable conductive material known or to be discovered.

The face 703 of each reflective panel 702 in an embodiment may comprise an array 706, which may be a collinear array, of vertical radiating elements $E_N V$ 302 or horizontal radiating elements $E_N H$ 304, or both. In an embodiment, one or more printed circuit boards 707, 708, 709, 710 with a front and back side may be attached to the face 703 of each reflective panel 702. Each radiating element $E_N V$ 302, $E_N H$ 304 in an embodiment may be comprised of a pattern of conductive material, such as copper. These radiating elements may be disposed on a front side and a back side 707F, 707B-710F, 710B of each of said printed circuit boards 707-710.

In an embodiment, a first, second, and third printed circuit board 707, 708, 709 each may have one or more arrays of vertically radiating elements $E_1 V$, $E_2 V$, $E_3 V$ 301, 302 disposed on their respective front sides and back sides 707F, 707B, 708F, 708B, and 709F and 709B. The second vertically radiating element $E_2$ V 302 may be configured to support a 2.4 GHz band on its front side 708F, while its back side may be configured to support a 5 GHz band. A fourth printed circuit board 710, having a front side 710F and a back side 710B, may be attached to the face 703 of a reflective panel 702 in an embodiment to accommodate one or more arrays of horizontal elements $E_1 H$ 301, $E_N H$ 302 disposed on the front 710F or back 710B, or both, of the fourth printed circuit board 710. In an embodiment, an Antenna Device 109 may default to activation of only four arrays of vertical radiating elements $E_1 V$ 301-$E_N V$ 302 per quadrant 705, which may comprise two arrays, one disposed on the front side 707F and one disposed on the back side 707B of the first circuit board 707, and two arrays, one disposed on the front side 709F and the other on the back side 709B of the third circuit board 709.

With respect to a each reflective panel 702, in an embodiment, each of the one or more arrays of vertical elements $E_1 V$, $EV_N$ 302 on the front side 708F and the back side 708B of the second circuit board 708 may have its own polarization switch $S_1$ 305, $S_N$ 306, and each such polarization switch $S_1$ 305, $S_N$ 306 may correspond to one of two horizontal elements $E_1 H$ 303, $E_2 H$ 304 on a fourth circuit board 710. When such a polarization switch $S_1$ 305, $S_N$ 306 is engaged, a vertical element $E_2$ V or $E_3 V$ 302 may be deactivated and an associated horizontal element $E_1 H$ 303, $E_2 H$ 304 activated.

For example, if a polarization switch $S_1$ 305 is associated with one or more arrays of vertical elements $E_N V$ 302 on the front side 708F of a second circuit board 708 and with one or more arrays of horizontal elements $E_N H$ 303 on a the front side 710F of a fourth circuit board 710, the polarization switch $S_1$ 305 may cause vertical element $E_N V$ 302 to be deactivated and $E_1 H$ 303 to be activated instead. Along with any remaining arrays of activated vertical elements $E_N V$ 302, the activated horizontal element $E_1 H$ 304 on a fourth circuit board 710 may cause the propagation of a circularly polarized wave, which may result in improved connectivity in circumstances in which exclusively vertical polarity proves insufficient, for instance, due to foliage in a desired coverage area.

Figure 10:
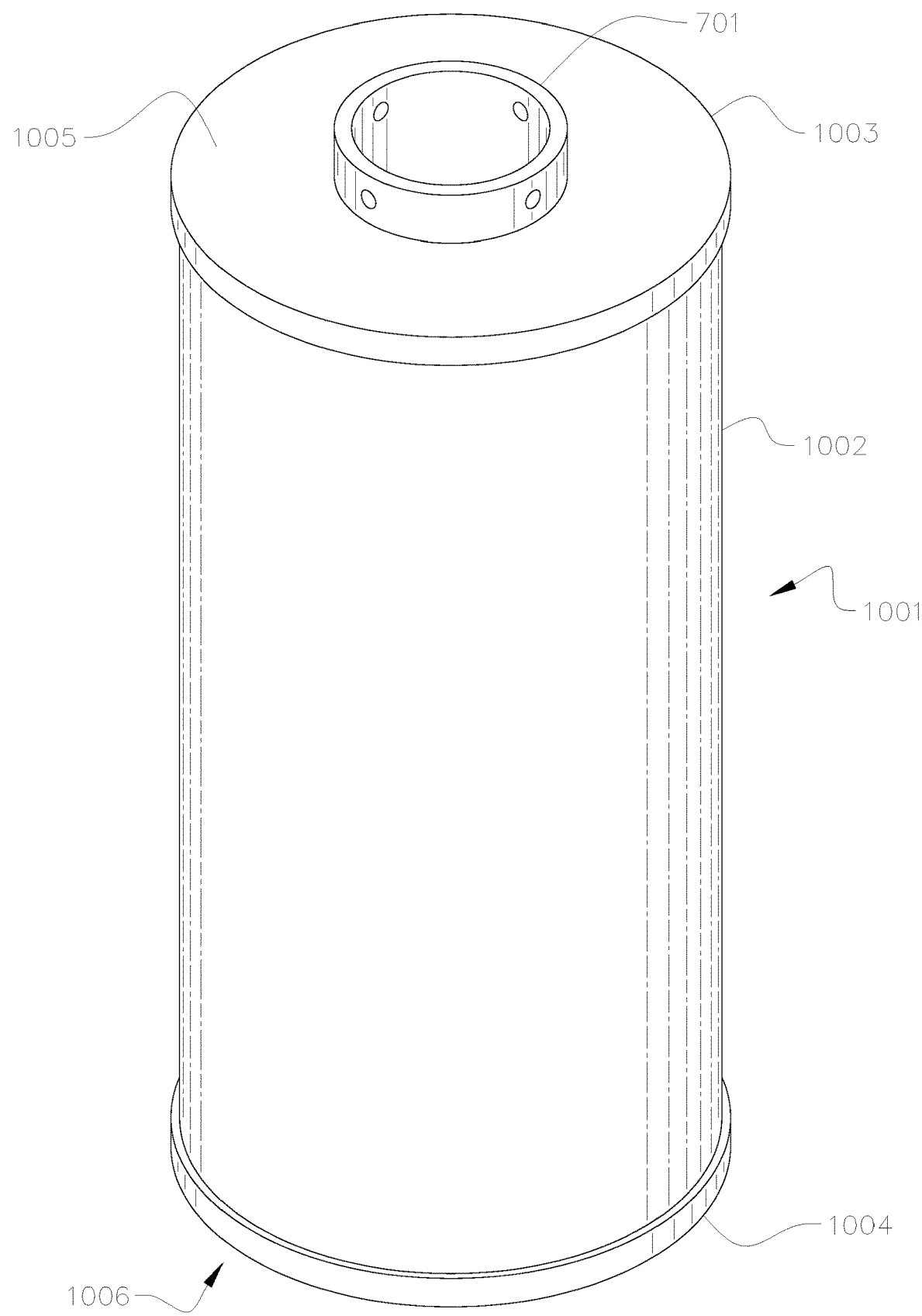
Figure 11:
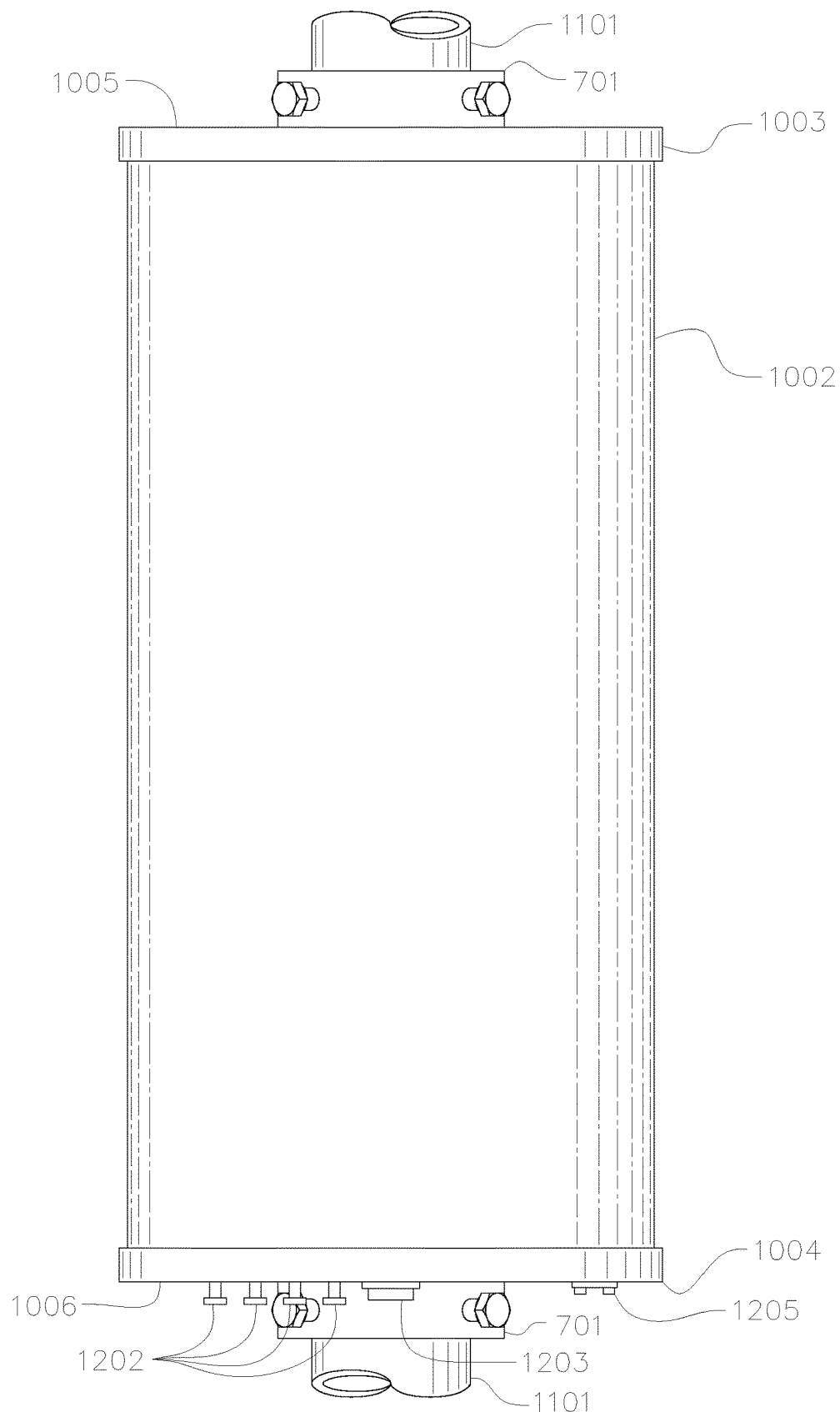
Figure 12:
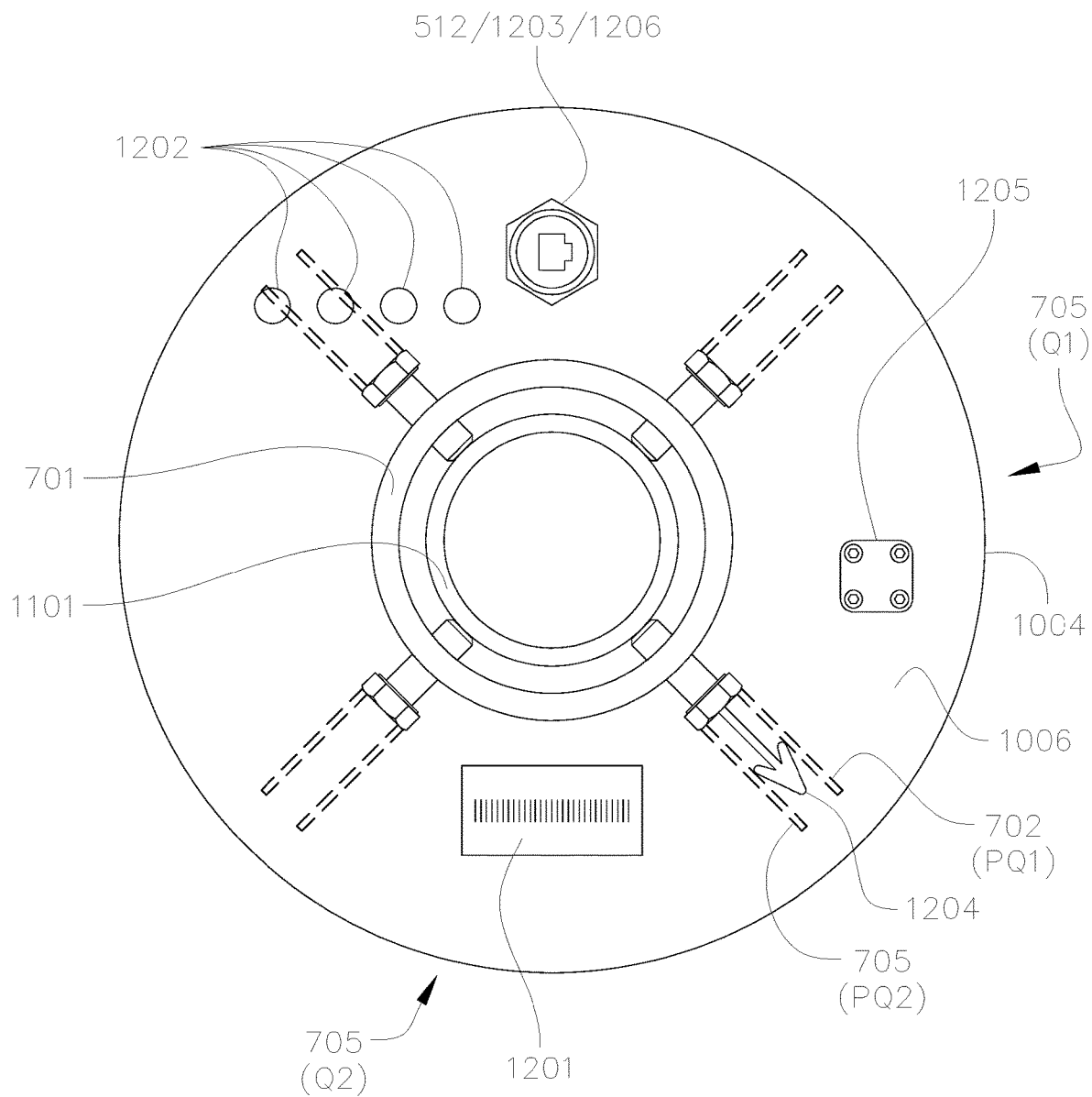

In an embodiment, as illustrated in FIGS. 10-12, housing 1001 for an Antenna 109 may comprise a single cylindrical form factor 1002 with a top plate 1003 in a ring shape defining a hole centered therein and having an external side 1004, and a bottom plate 1005 in a ring shape defining a hole centered therein and having an external side 1006. A top plate 1003 or a bottom plate 1004, or both, may be configured to permit the housing 1001 to be secured to a core cylinder 701 of an Antenna 109. Either a top plate 1003 or a bottom plate 1005, or both, may be either permanently fixed or detachable from said core cylinder 701. A cylindrical form factor 1002 with plates 1003, 1005 attached thereto may measure approximately 22" in height, approximately 12" in outside diameter, and weigh approximately four pounds empty, or approximately 22 pounds when the housed components of an Antenna Device 109 are present.

In an embodiment, one or both ends of a core cylinder 701 may be configured so as to enable an Antenna Device 109 to be removably affixed and secured to a mast 1101, which may be a metal pipe or other suitable mounting structure. A mast 1101 in an embodiment may be inserted either first through a top plate 1003, then through a core cylinder 701, and thence through a bottom plate 1005, or first through a bottom plate 1005, then through a core cylinder 701, and thence through a bottom plate 1005. In an embodiment, a mast 1101 may measure up to approximately 1.5" in diameter.

In an embodiment, MAC (Media Access Control) address, a serial number, and other data about an Antenna Device 109 may be affixed by means of a sticker 1201 or in some other manner to the external side 1004 of a detachable top plate 1003 or the external side 1006 of a detachable bottom plate 1005, or both, and also may be stored inside each Antenna 109 in NVM 505.

A power receptacle 1203 in an embodiment may be located on a plate 1003, 1005. In an embodiment, a plate 1003, 1005 may feature one or more SMA female external RF ports 1202, or one or more jacks 512, or both types of ports. In an embodiment, a jack 512, such as an RJ45 port, may be designated as a serial port in an embodiment and used to connect an Antenna Device 109 to an AP LAN port via an Ethernet cable, e.g., CAT 5 or CAT 6, as well as being designated for use simultaneously as a power receptacle 1203 to accept and deliver power to an Antenna Device 109 through standard PoE.

In an embodiment, a plate 1003, 1005 of a housing 1001 may have an externally visible arrow or other suitable directional symbol 1204 to aid in orientation of an Antenna 109. A directional symbol 1204 may be machined into the external side 1004, 1006 of a plate 1003, 1005, or may be applied with paint, a sticker, or any other suitable means. A directional symbol 1204 may be placed at any convenient location on the external side 1004, 1006 of a plate 1003, 1005, or on a cylindrical form factor 1002, e.g., as a straight vertical line extending from a bottom plate to a top plate.

In an embodiment, as illustrated in FIG. 12, a directional symbol 1204 may be positioned to point to the center between two adjacent radiating panels 702—where the origin of a quadrant lies—the inside a housing 1001 of an Antenna Device 109. For example, if in an Antenna Device 109, one quadrant $Q_1$ 705 is intended to cover West to North, with its center at Northwest, and an adjacent quadrant $Q_2$ 705 is intended to cover North to East, with its center at Northeast, a directional symbol 1204 may be centered in line with the adjacent radiating panels PQ1, PQ2 702 of these two quadrants Q1, Q2 705, such that if the directional symbol 1204 is pointing to geospatial North, an Antenna Device 109 may be aligned properly for each of these two adjacent quadrants Q1, Q2 703 to be able to cover their respective RF geographic coverage areas.

In an embodiment, once an Antenna Device 109 has been connected to an LAN, it may access a WAN, such as the Internet, using a default destination IP address to a server 102, and the server 102 thereby may request said Antenna Device 109 to send unique identifying data for itself, such as a MAC address and serial number, to the server 101 for authentication purposes. In an embodiment, once an Antenna Device 109 has been authenticated by a server 102, the server 102 may archive any unique identifying information for that Antenna Device 109 as entered into AMS by an operator, following which the Antenna Device 109 may query the server 101 for any firmware updates available for download and installation, and transmit to the server 101 various other data.

An embodiment may incorporate one or more built-in magnetometers $MAG_1$ 516, $MAG_{N-1}$ 517, $MAG_N$ 518, operated via control and data lines originating at a signal and control processor with firmware 501. By way of example and not limitation, a built-in magnetometer $MAG_1$ 516, $MAG_{N-1}$ 517, $MAG_N$ 518 may be an LIS3MDLTR digital output magnetic sensor, a ultra-low-power, high-performance, 3-axis magnetometer by ST Microelectronics.

Compass headings may be obtained by, for example, calculating the inverse trigonometric function of the normalized ratio of the horizontal plane variables: if the horizontal plane contains the variables Y and Z, Magnetic North (NM) may have a bearing calculated as Bearing=$\arcsin(Z/\sqrt{(Y^2+Z^2)})$.

Environmental conditions often encountered in and about Antenna Device 109 installations—for instance, the presence of a strong magnetic field, such as that from a solenoid actuated lock; a ferrous tower structure that may be supporting an Antenna Device 109; a large body of magnetizing material; a metal structure that has been struck by lightning, etc.—may have the effect of modifying the local magnetic field. These and other conditions can distort the heading (bearing) of a compass or the magnetic field detected by a magnetometer. Such distortion may result in an erroneous reading as to the direction of Magnetic North (NM) relative to the orientation of an Antenna Device 109, and of any or all geographic headings derived from the reading of the direction of Magnetic North (NM).

To overcome such distortion, in an embodiment, an Antenna Device 109 may comprise four magnetometers $MAG_1$, $MAG_2$, $MAG_3$, $MAG_4$ 516, 517. In an embodiment, these may be disposed evenly around a circle of approximately seven (7) inches in diameter, said circle centered about the center line of the core. In this fashion there would be a distance of seven (7) inches between diametrically opposed magnetometers. Local magnetic field distortions vary with position, whereas the distant geomagnetic field is uniform across a sampling range, in this case, a seven-inch circle.

In the presence of a distortion, each of said four magnetometers $MAG_1$ $MAG_2$, $MAG_3$, $MAG_4$ 516, 517 may differ in their respective bearings. For example, due to its proximity to the magnetic field of, e.g., a supporting tower, the quadrant closest to the supporting tower may experience greater distortion than the quadrant furthest (opposite) from the tower. By taking an average of four magnetometers, rather than a single magnetometer, reliability in determining Magnetic North (NM) is greatly improved, as the average would be more indicative of the uniform field (i.e., earth's magnetic field).

The above algorithm may be enhanced further by performing a comparison of the respective readings of the four magnetometers $MAG_1$, $MAG_2$, $MAG_3$, $MAG_4$ 516, 517 and removing the most deviant reading from the averaging operation of the remaining three compasses. By removing the most distorted reading, the average bearing is further representative of the actual Magnetic North ($N_M$).

More intricate algorithms may be employed in an embodiment in which the four compass readings can be augmented with a single local magnet model, and the readings utilized to determine the location, orientation and strength of the model's magnet. Once a local magnet is mathematically defined, the model is used to remove the effect of a single local magnet mathematically, to isolate the uniform field values. This, in turn, yields a highly accurate bearing of actual Magnetic North ($N_M$), even in the presence of a strong local magnetic field.

In an embodiment, magnetometer data from a remotely located Antenna Device 109 may be transmitted via a communications medium, such as the Internet 106, from the remotely located Antenna Device 109 to a server 102. Utilizing reliable sources such as, by way of example and not limitation, the online Magnetic Field Calculator of the National Centers for Environmental Information (NCEI) of the National Oceanic and Atmospheric Administration (NOAA) at https://www.ngdc.noaa.gov/geomag/calculators/magscale.shtml, an approximate, reasonably accurate declination for the remotely located Antenna Device 109 may be ascertained based on a street address or similar geographic location data for the remotely located Antenna Device 109 as entered into AMS by an operator, and the server 102 may, in turn, utilize this declination to calculate a differential between the geomagnetic heading of the device and its designated geographic heading, and display instructions for re-orienting the remotely located Antenna Device 109 so that it lines up with the designated geographic heading. In an embodiment, a server may access automatically an online source to determine the declination for a given street address or other geographic location data for an Antenna Device 109 as entered into AMS by an operator.

Once a remotely located Antenna Device 109 has been re-oriented to its designated geographic heading, an operator may define discreetly one or more RF geographic coverage areas 1502 for the Antenna Device 109 by entering true bearings (T) into AMS for transmission to the Antenna Device 109. The true bearings entered by an operator may be converted automatically by a server 102 running AMS to magnetic bearings for use by an Antenna 109 in an embodiment. A switching circuitry matrix and firmware in an Antenna 109 may carry out this automatic conversion in an embodiment as well. In an embodiment, an Antenna's 109 switching circuitry and software-based matrix then may direct an RF signal of an AP 107 through a specified quadrant 705 using all, or a subset of, a plurality of radiating elements $E_1V$ 301, $E_NV$ 302, $E_1H$ 303, $E_NH$ 304 to propagate RF signals to one or more RF geographic coverage areas, and send additional profile settings for the Antenna Device 109 as selected by an operator. Once an Antenna Device 109 has been configured remotely by an operator, in an embodiment, it may operate autonomously, requiring no further interaction with a server 102, unless and until an RF geographic coverage area 1502 needs to be added, deleted or altered in some fashion, or the profile settings for an Antenna Device 109 otherwise need to be changed, in which case a connection between Antenna Device 109 and a server 102 may be re-established.

Figure 13:
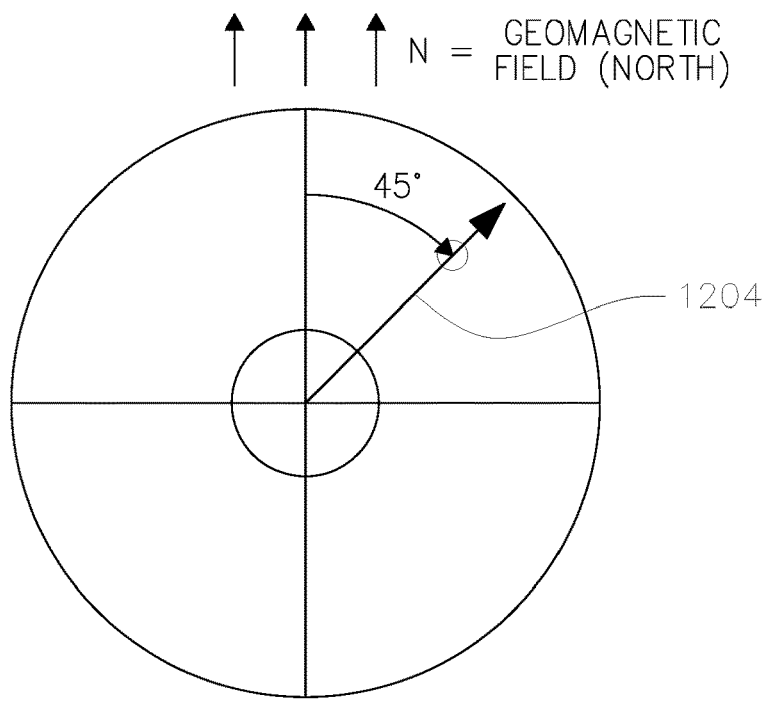
Figure 14:
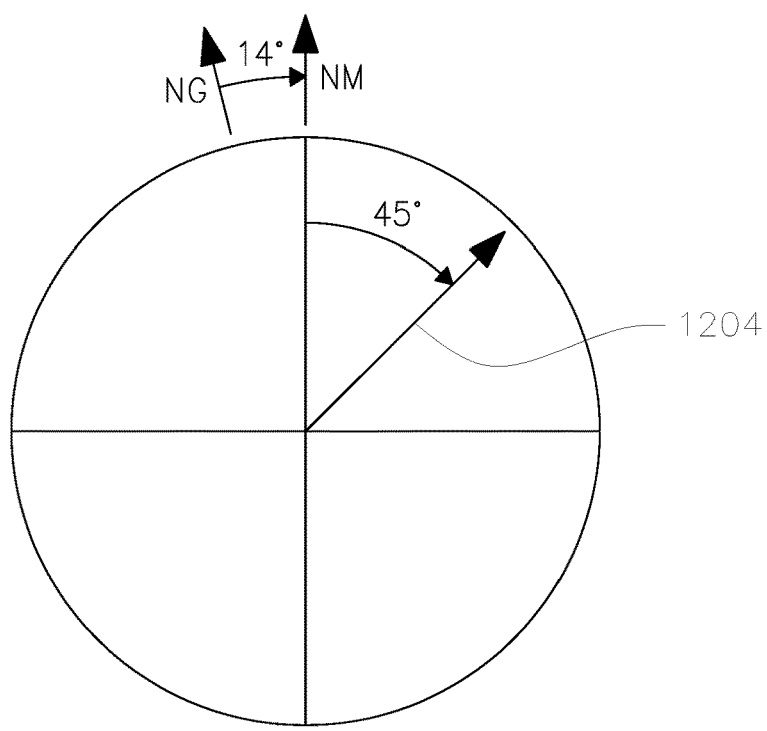

FIG. 13 illustrates a top view of one possible orientation of an Antenna 109 (by reference to an arrow or other directional symbol 1204) with a compass reading from a single magnetometer 516 of 45° East) (+45° relative to Magnetic North ($N_M$). Assuming the local declination for the Antenna 109 location to be 14° East (+14°), for example, Magnetic North ($N_M$) would then be to the East of True North, i.e., Geographic North ($N_G$), as illustrated in FIG. 14. If the magnetometer 516 reads 45° East) (+45° relative to Magnetic North ($N_M$), Geographic North ($N_G$) would therefore be further West by 14°. Based on the 45° East (+45) compass reading of the magnetometer 516 then, a directional symbol 1204 of the Antenna 109 would be pointing 59° East) (+59° from Geographic North ($N_G$). The latter bearing could then be utilized for ascertaining the orientation of an Antenna 109 with respect to a map 1501.

Figure 15:
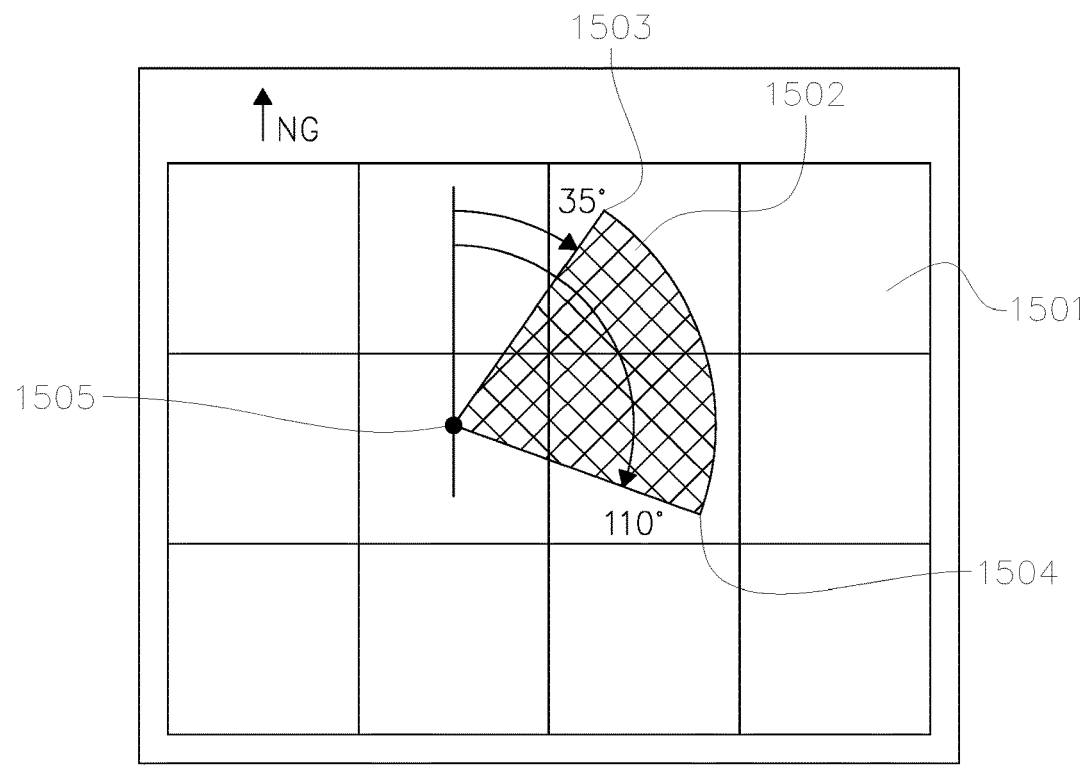

FIG. 15 reflects a map 1501 with a desired RF coverage area 1502 of 90° or less. The RF coverage area 1502 as illustrated is defined by a First True Bearing 1503 and a Second True Bearing 1504, each with a point of origin 1505 at an Antenna 109. The coverage area extends 35° East) (+35° from Geographic North ($N_G$) to 110° East (110°+) from Geographic North ($N_G$). The optimal bearing for directing RF radiation to service this RF coverage area 1502 would be given by the average of the two true bearings defining the RF coverage area, i.e., 72.5° East) (+72.5°.

In an embodiment utilizing a single magnetometer $MAG_1$ 516, $MAG_2$, $MAG_3$, $MAG_4$ 517 for each quadrant $Q_1$, $Q_2$, $Q_3$, $Q_4$ 705 in a quadrant-segmented Antenna Device 109, readings from the four magnetometers $MAG_1$, $MAG_2$, $MAG_3$, $MAG_4$ 516, 517 would be used to calculate a composite bearing. For example, given that $MAG_1$ in $Q_1$=+325, $MAG_2$ in $Q_2$=+055, $MAG_3$ in $Q_3$=+146 and $MAG_4$ in $Q_4$=+234, the composite bearing would be +010, i.e., the orientation of the Antenna 109, based on a directional symbol 1204, would be 10° East (+10) relative to Magnetic North ($N_M$).

Figure 16:
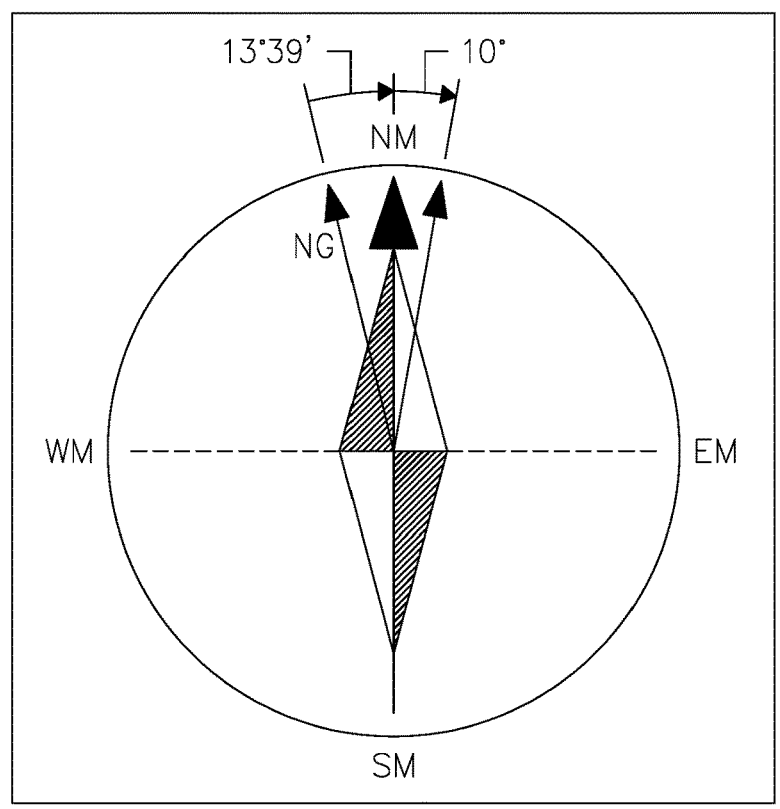

The declination of the installation location of an Antenna 109 may be found from websites such as www.magnetic-declination.com. Assuming, for example, an Antenna 109 is installed at a latitude of 37.405992° and a longitude of −122.078515°, the corresponding magnetic declination would be 13°39' East, i.e., Magnetic North ($N_M$) would be 13°39' East (+13°39') of Geographic North ($N_G$), as illustrated in FIG. 16. This Degree Minute Second (DMS) value of 13°39' converts to a decimal angle value of −13.65°. Thus, given a composite bearing of 10° East (+10) relative to Magnetic North ($N_M$), the declination from Geographic North ($N_G$) would be 23.65°.

Following on the foregoing example, in an embodiment, upon transmission of magnetometer data from an Antenna Device 109 to a server 102, AMS running on the server 102 may calculate and return the applicable declination based on the location of the Antenna 109. If, for example, an operator wished to align an Antenna 109 with Geographic North ($N_G$), a server 102 may indicate that the Antenna Device 109 should be rotated counterclockwise by 23.65°. Following that rotation, an Antenna Device 109 could request a new compass reading, and could receive from the server 102 a response either confirming the bearing to be Geographic North ($N_G$) within a designated tolerance, or indicating that further rotation of the Antenna 109, either clockwise or counterclockwise, may be required (e.g., rounding a value of 23.65° up to a value of) 24° if outside any such designated tolerance.

High-gain sectoral antennas have the challenging task of covering a wide azimuthal area, like a quadrant 705, or 90°, while providing a high directivity. In order to do so, a fan beam needs to be created. A fan beam consists of an array 706 of elements $E_1V$ 301, $E_NV$ 302 disposed perpendicularly to the plane where one wishes to have a wide coverage. To cover a wide azimuthal area, an array 706 may be disposed vertically, narrowing the elevation coverage to achieve the desired gain.

In an embodiment, an Antenna 109 may need to overcome internal losses resulting from its adaptive resources (switches, diplexers, filters, detectors, etc.). This requirement places an additional burden for which compensation may be had by means of creating additional gain. A resulting optimization for an embodiment may be an array 706 with +12 to +13 dBi gain at S-Band (2.400-2.485 GHz) and +13 to +14 dBi gain at C-band (5-6 GHz). These high gain values, in turn, would constrict the elevation coverage to an approximate range between 12° (for C-band) and 15° (for S-band).

Due to the narrow elevation beamwidths of high gain antennas, their installation requires great care. A small inclination of an Antenna 109 of +5 degrees can have significant implications to its range and coverage. It therefore can be useful to monitor the tilt angle of an Antenna 109 to assess proper coverage of a targeted RF geographic coverage area.

Figure 17:
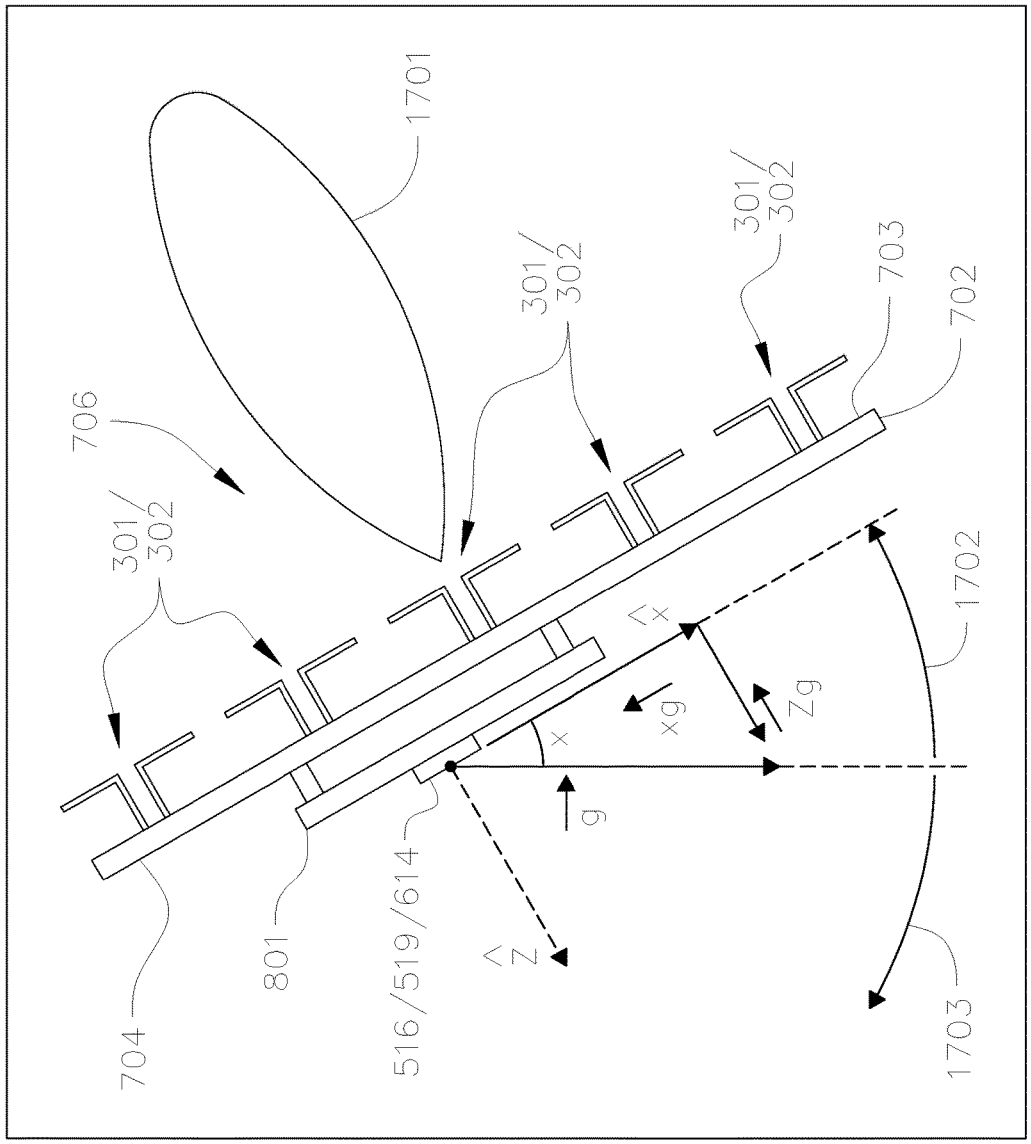

FIG. 17 illustrates an embodiment with an upward-tilted reflector 702 having on its face side 703 an array 706 of vertical elements $E_1V$ 301, $E_NV$ 302 with an upward-projecting antenna elevation pattern 1701. As further illustrated in FIG. 17, in an embodiment, an amplifier printed circuit board 801 may be mounted on the back side 704 of a reflector 702 parallel to its face and back sides 703, 704, and an accelerometer $ACC_N$ 521 mounted on the amplifier printed circuit board 801.

To measure tilt, one can utilize one or more electronic accelerometers $ACC_1$ 519, $ACC_{N-1}$ 520, $ACC_N$ 521, such as ST Microelectronics' LSM303 family of combined 3-axis Accelerometer and Magnetometer Integrated Circuits (AMICs), providing acceleration readings in X, Y and Z axes of a three-dimensional Cartesian coordinate system. In an embodiment, accelerometers $ACC_1$ 519, $A_{N-1}$ 520, $A_N$ 521 may connect to a microcontroller of a signal and control processor with firmware 501 via an I2C (IIC, or Inter-Integrated Circuit) bus to provide X-, Y- and Z-axis accelerometer readings.

In addition to or in lieu of one or more magnetometers, an embodiment may configured with one or more GPS/GNSS Receivers 619 (FIG. 6B), each of said GPS/GNSS Receivers 619 coupled to the signal and control processor with firmware 501 (FIG. 5) via one or more control lines 522 and 523 data lines, to determine the geographic location of an Antenna Device 109. In such an embodiment, each GPS/GNSS Receiver 619 (FIG. 6B) further may be coupled to a switch 620 via one or more control lines and data lines, said switch 620 thence coupled to one or more GPS/GNSS-dedicated antennae 711-714 (FIG. 7B) via RF Connectors 621-624 (FIG. 6B). The switch 620 may be configured to select one or more GPS/GNSS-dedicated antennae 711-714.

In an embodiment, one or more accelerometers $ACC_1$ 519, $ACC_N$ 502 may be the ST Electronics LMS303AGR AMIC. When an Antenna Device 109 is mounted predominantly upright, the fixation of each accelerator $ACC_1$ 519, ACC$_N$ 502 on an amplifier printed circuit board 801 immediately behind and parallel to a reflector 702 of a high gain sectoral array 706, where acceleration along the Z-axis (unit vector $\hat{z}$) points behind the reflector and perpendicular to it, and acceleration along the X-axis (unit vector $\hat{x}$) points downward and parallel to the reflector, produces a very small reading in $\hat{z}$, but a large reading in $\hat{x}$ due to the influence of gravity. The magnitude of acceleration due to gravity (the gravity vector $\vec{g}$) is usually 9.8 m/s² downward. Thus, $\vec{x}_g$ would denote the $\hat{x}$ component measurement of $\vec{g}$, while $\vec{z}_g$ would denote the $\hat{z}$ component measurement of $\vec{g}$. Since $\vec{g} = \vec{z}_g + \vec{x}_g$, trigonometry may be used to calculate the tilt angle as follows:

$$\text{Tilt Angle in } Z: \alpha = \operatorname{Arctan} \frac{\vec{z}_g}{|\vec{x}_g|}$$

or, for small angles:

$$\text{Tilt Angle in } Z: \alpha \sim \frac{\vec{z}_g}{|\vec{x}_g|} \text{ in radians}$$

If the angle is positive, it is an up-tilt angle 1702, and the Antenna 109 is up-tilted; and if negative, it is a down-tilt angle 1703, and the Antenna 109 is down-tilted.

Each accelerometer may provide X, Y and Z readings in an embodiment, and therefore may also report the tilt angle in Y, i.e., in a direction parallel to a reflector 702 and perpendicular to the X-axis. The tilt in Y may be calculated as follows:

$$\text{Tilt Angle in } Y: \alpha = \operatorname{Arctan} \frac{\vec{y}_g}{|\vec{x}_g|}$$

where $\vec{y}_g$ is the reading from the 3rd axis.

2. SDA Method a. Communication Generally

An embodiment comprising an SDA method may enable the creation, on a server 102, of one or more software-defined antenna profiles that define various signal propagation characteristics for one or more Antenna Devices 109, such as antenna type, assigned ports, frequency bands and polarity to be applied to an end-user defined RF geographic coverage area. A server 102 in embodiment comprising such an SDA method may further remotely install and maintain a custom profile on one or more addressable, reconfigurable, quadrant-segmented, multiple-input and multiple-output (MIMO) beam-forming Antenna Devices 109 at one or more APs 107. When communicating via modems 205, 204, 411, 412 over a TCP connection in an embodiment, a server 102 and any Antenna Devices 109 may do so in a simple command/response format. A server 102 may send a command to an Antenna Device 109, and the Antenna 109 may respond with an indication to the server 102 that the command has been carried out. An Antenna Device 109, depending on the command, may send back detailed information to the server 102 in a response. In general, one or more operators may enter and save, in a server 102, data to identify an Antenna Device 109 by reference to, e.g., an end-user account, its MAC address, its serial number, one or more port numbers, its physical address, the name of the Antenna Device 109, and so forth.

In an embodiment, an operator may query an Antenna Device 109 via a server 102 for its current Geomagnetic heading. If a response from an Antenna Device 109 reflects that it is not oriented as desired, e.g., not pointing in a designated Geospatial direction, such as True North, a server 102 may calculate and cause to display instructions for properly adjusting the Geospatial orientation of the Antenna Device 109 based on a differential between its current Geomagnetic heading and a designated Geospatial heading. Once an Antenna Device 109 has been properly oriented and is pointing in the desired Geospatial direction, a server 102 then may utilize the post-adjusted Geomagnetic heading of the Antenna Device 109 to calculate and confirm its new Geospatial orientation.

An operator may enter data defining a custom profile for an Antenna 109, such as desired RF coverage area, ports to be associated with a quadrant, polarization, and band selection, all of which an operator may cause to be sent from a server 102 to the Antenna Device 109 to be stored in NVM 505 and then applied to the Antenna Device 109, causing the Antenna Device 109 to begin propagating an RF signal in a designated geographic coverage area. An operator may also cause a server 102 to query an Antenna Device 109 for a tilt angle, which the Antenna Device 109 then may return to the server 102 for display to the operator in order to assess RF coverage of a designated geographic coverage area.

b. Command Structure

In an embodiment, a command structure for remote configuration of the various properties of an Antenna 109 may be as follows:

Table of Commands, Data and Anticipated Response Data:

Commands/responses may be sent as ASCII characters. All commands/command response headers may have a fixed length of four characters and may be human readable (abbreviations). Data may be sent or received either as decimal ASCII or hexadecimal ASCII characters, depending on context (numeric responses are decimal, status or memory contents are in hexadecimal).

Example

In decimal ASCII, one hundred="100"→decimal ASCII="64" hexadecimal ASCII. Multiple parameters or data fields are separated by a <space> character.

Example

"CMPS 001 002 089 181 273" "BUZZ FFC0". Every command or response must be terminated by a line feed character (<LF>) (=0x0A=decimal 10 value).

Command format: [Command] [Parameters/Data]<LF>
Response format: [Command] [Data]<LF>
or
Unrecognized command: "ERROR" [Command] [Parameters/Data]<LF>
Responses to commands may have a variable length, depending on the command.

Status

Status Request: SRQ?<LF>

This command requests a dump of Antenna 109 status data. Response not yet defined: display/save response AS IS (human readable from Antenna 109).

Response:
   SREQ CFG1 1qbh 2qbh 3qbh 4qbh CMPS xxx ddd ddd ddd ddd TEMP ±xx ±yy ±dd ±dd ±dd ±dd
   TEST cccc VOLT aa.a b.bb c.cc d.dd e.ee f.ff LNAG ±dd ±dd ±dd ±dd<LF>
   Details on response appear below.

Configuration

Antenna 109 Configuration Query: CFG?<LF>
   This command requests configuration of active ports.
Response format: CFG1 pqbh pqbh pqbh pqbh vt<LF>
   Each set of data in this response format may correspond to ports 1 to 4 as follows:
   p port number in hexadecimal ASCII (usually 1, 2, 3 or 4, but 5-C are valid too);
   q quadrant number in hexadecimal ASCII (values are A-D);
   b band number in hexadecimal ASCII (values are 0 for 2 GHz, 1 for 5 GHz, 2 for dual band, 2 GHz and 5 GHz simultaneously); and
   h horizontal polarization value in hexadecimal ASCII (values are 0 for vertical or VPOL, which may be the most common setting/default, and 1 for horizontal or HPOL).
Ports 1 and 4 may only support VPOL, while ports 2 & 3 may support HPOL and VPOL.

Example

CFG1 1A10 2B10 3C10 4D$_{10}$ 0A<LF>
   The above example could be the power-on default for a new newly deployed Antenna 109:
   Port 1 connected to quadrant 1 at 5 GHz, vertical polarization (VPOL);
   Port 2 connected to quadrant 2 at 5 GHz, vertical polarization (VPOL);
   Port 3 connected to quadrant 3 at 5 GHz, vertical Polarization (VPOL); and
   Port 4 connected to quadrant 4 at 5 GHz, vertical polarization (VPOL).
Port numbers values normally may be 1-4; however, 5-8 and 9-C represent virtual ports 1 and 2, respectively.
   Virtual ports are ports an Antenna 109 may jump to enable coverage in other quadrants. If virtual ports are scheduled, the query response will include the virtual port data as follows:
   Command: CFG?<LF>
   Response: CFG1 1qbh 2qbh 3qbh 4qbh CFG5 5qbh 6qbh 7qbh 8qbh CFG9 9qbh Aqbh Bqbh Cqbh vt<LF>
   Antenna 109 Port Configuration Setting: CFGP pqbh pqbh pqbh pqbh vt<LF>
   This command sets and saves configuration of active ports.
Response format: CFGP pqbh pqbh pqbh pqbh vt<LF> (Echo of Received Command)
   Each set of data in this response format may correspond to ports 1 to 4 as follows:
   p port number in hexadecimal ASCII (usually 1, 2, 3 or 4, but 5-C are valid too);
   q quadrant number in hexadecimal ASCII (values are A-D);
   b band number in hexadecimal ASCII (values are 0 for 2 GHz, 1 for 5 GHz);
   h horizontal polarization value in hexadecimal ASCII (values are 0 for vertical or VPOL, which is the most common setting/default, 1 for horizontal or HPOL);
   V virtual set number in hexadecimal ASCII (values are 0 for non-virtual/default, 1 for virtual set 1 or ports 5-8, 2 for virtual set 2 or ports 9-C); and
   t time to hold the setting for in minutes in hexadecimal ASCII (values are 0-E, F is for final or permanent setting).

Example

CFGP 1A00 2A01 3C10 4C10 0F<LF>
   The above example may be for connecting through a forested area North at 2 GHz, and high traffic clients South on 5 GHz:
   Port 1 connected to quadrant 1 at 2 GHz, vertical polarization (VPOL), non-virtual, final;
   Port 2 connected to quadrant 1 at 2 GHz, horizontal polarization (HPOL), non-virtual, final;
   Port 3 connected to quadrant 3 at 5 GHz, vertical polarization (VPOL), non-virtual, final; and
   Port 4 connected to quadrant 3 at 5 GHz, vertical polarization (VPOL) non-virtual, final.
Save Current Final Antenna 109 Configuration: CFGW<LF>
Response format: CFGW<LF> (echo)

Magnetometer (Compass)

Antenna 109 Compass Query: CMP?<LF>
   This command requests magnetometer data for all quadrants.
Response format: CMPS xxx ddd ddd ddd ddd <LF>
   Each set of data in this response format may correspond to ports 1 to 4 as follows:
   xxx composite compass bearing in decimal ASCII, relative to quadrant 1 (values 000-359 degrees); and
   ddd individual quadrant compass bearing in decimal ASCII, sent in sequence, quadrant 1 to quadrant 4 (values 000-359 degrees).
Quadrant 1 could be a quadrant with RF connectors and LAN interface, while quadrant 4 could contain LEDs and a secondary port.

Example

CMPS 000 002 090 179 271<LF>
   The above example reflects the following results:
   Composite bearing is 0 degrees to Magnetic North (quadrant 1 faces this direction);
   Quadrant 1 is pointing to 002 degrees, or +2 degrees East of Magnetic North;
   Quadrant 2 is pointing to 090 degrees, or +90 degrees East of Magnetic North (due East);
   Quadrant 3 is pointing to 179 degrees, or +1 degree East of Magnetic South; and
   Quadrant 4 is pointing to 271 degrees, or −89 degrees West of Magnetic North.

LEDs

Antenna 109 LED Settings: LEDR ab<LF> or LEDG ab<LF>
   This command sets a red (LEDR) and a green (LEDG) LEDs.
Response format: LEDR ab<LF> or LEDG ab<LF> (echo)
   Each parameter in this response format may be as follows:
   a the seconds OFF in hexadecimal ASCII (values 0-F); and
   b the seconds ON in hexadecimal ASCII (values 0-F).
Values for time parameters a and b may be: 0-A in seconds; B=30 seconds; C=1 minute; D=10 minutes; E=1 hour; and F=continuous.

Examples

LEDG 00<LF>
Turns OFF green LED.
LEDG 0F<LF>
Turns green LED continuously ON
LEDG 55<LF>
Turns green LED ON for 5 seconds and OFF for 5 seconds, and repeats (10 second cycle, 50% duty).
LEDR 91<LF>
Turns red LED ON 1 second and OFF for 9 seconds, and repeats (10 second cycle, 10% duty).
Tilt Angle
Antenna 109 Tilt Angle Query: TLT?<LF>
This command requests Antenna 109 tilt data for all quadrants.
Response format: TILT xx.x+dd.d+dd.d+dd.d+dd.d<LF>
Each set of data in this response format may correspond to ports 1 to 4 as follows:
 xx.x the absolute value of the composite tilt angle in decimal ASCII (values 00.0-90.0 degrees); and
 ±dd.d the individual quadrant tilt angle in decimal ASCII, sent in sequence,
 quadrant 1 to quadrant 4 (values −90.0 to +90.0 degrees). Quadrant 1 could be designated as a quadrant in the direction of an Antenna 109's orientation, opposite to RF connectors and LAN interface.

Example

TILT 08.5 −08.0 +03.1 +08.1 −03.2<LF>
The above example reflects the following results:
Composite absolute tilt is 8.5 degrees;
Quadrant 1 tilt is-8.0 degrees, or 8.0 degrees downward;
Quadrant 2 tilt is +3.1 degrees, or 3.1 degrees upward;
Quadrant 3 tilt is +8.1 degrees, or 8.1 degrees upward; and
Quadrant 4 tilt is-3.2 degrees, or 3.2 degrees downward.
Temperature
Antenna 109 Temperature Query: TMP?<LF>
This command requests temperature data for all measured locations in degrees centigrade (C).
Response format: TEMP ±xx ±yy ±dd ±dd ±dd ±dd <LF>
Each set of data in this response format may correspond to the following locations:
 ±xx the signed temperature in decimal ASCII for a power supply chamber (values −99-+99° C.);
 ±yy the signed temperature in decimal ASCII for a microcontroller core (values −99-+99° C.); and
 +dd the signed temperature in decimal ASCII for each quadrant (1 through 4) in sequence (values −99-+99° C.).

Example

Temp+35 +32 +37 +35 +32 +35<LF>
The above example reflects the following results:
Power Supply Chamber is at +35° C.;
Microcontroller core is at +32° C.;
Quadrant 1 is at +37° C.;
Quadrant 2 is at +35° C.;
Quadrant 3 is at +32° C.; and
Quadrant 4 is at +35° C.
Buzzer
Antenna 109 Buzzer Settings: BUZZ abnd <LF>
This command sets a buzzer.
Response format: BUZZ abnd <LF> (echo)
Each parameter in this response format may be as follows:
 a is the seconds OFF in hexadecimal ASCII (values 0-F);
 b is the seconds ON in hexadecimal ASCII (values 0-F);
 n is the tone number in hexadecimal ASCII (values 0-F), (0=lowest frequency, F=highest frequency); and
 d is the tone duration in 10's of milliseconds hexadecimal ASCII (values 0-F, 0=off, 1=10 ms, 2=20 ms, . . . , F=150 ms).
Values for time parameters a and b may be as follows: 0-A in seconds, B=30 seconds, C=1 minute, D=10 minutes, E=1 hour, F=continuous.

Examples

BUZZ 0000<LF>
Turn buzzer OFF.
BUZZ 0F81<LF>
Buzzer is continuously ON, beeping a mid-frequency tone for 10 ms every second.
BUZZ 55C4<LF>
Buzzer is ON for 5 seconds and OFF for 5 seconds, then repeats (10 second cycle, 50% duty), beeping a high pitch sound for 40 ms every second.
Serial Number
Antenna 109 Serial Number Query: SER?<LF>
This command requests the serial number for an Antenna 109.
Response format: SERN hh hh hh hh hh hh-m vvvv rrrr<LF>
Each set of data in this response format may correspond to the following locations:
 h 12-character MAC address number in hexadecimal ASCII (values: 00 00 00 00 00 00 to FF FF FF FF FF FF);
 −m manufacturer code ASCII alphanumeric (values: −0 to −9 and −A to −Z);
 v firmware version number in hexadecimal ASCII (values: 0000 to FFFF);
 r firmware revision number in hexadecimal ASCII (values: 0000 to FFFF).

Examples

SERN 00 80 A3 $D_3$ $E_9$ $_5$D-M 000A 0003<LF>
The above example reflects the following results (manufacturer name is merely hypothetical):
MAC address 00-80-A3-$D_3$-$E_9$-5D;
Manufacturer code-M (Myers Engineering International, Inc.);
Firmware version 10 (0x000A); and
Firmware revision 3 (0x0003).
SERN 00 80 A3 $D_3$ $E_9$ $_5$D-D 0003 000F<LF>
The above example reflects the following results (manufacturer name is merely hypothetical):
MAC address 00-80-A3-$D_3$-$E_9$-5D;
Manufacturer code-D (Dynamic Manufacturing);
Firmware version 3 (0x0003); and
Firmware Revision 15 (0x000F).
Mac Address
Antenna 109 MAC Address Query: MAC?<LF>
This command requests the MAC address of an Antenna 109.
Response format: MACX hh hh hh hh hh hh<LF>
Each set of data in this response format may correspond to the following locations:
 hh the 6 character pair MAC address in hexadecimal ASCII (values: 00 00 00 00 00 00 to FF FF FF FF FF FF).

Example

MACX 00 80 A3 D₃ E₉ 5D<LF>
The above example reflects the following MAC Address: 00-80-A3-D₃-E₉-5D.
Local IP Address
Antenna 109 Local IP Address Query: LIP?<LF>
This command requests the local IP address of an Antenna 109.
Response format: LIPX ddd ddd ddd ddd<LF>
Each set of data in this response format may correspond to the following locations:
    ddd the 3 digit numeric value of the IP fields in decimal ASCII character (values: 000-255).

Example

LIPX 192 168 001 196<LF>
The above example reflects an Antenna 109's local IP Address as 192.168.1.196
AP Brand/Make
Antenna 109 AP Brand or Make/Manufacturer Firmware Query: APM?<LF>
This command requests the brand/make/manufacturer of an Antenna 109's firmware.
Response format: APMK cccccccc<LF>
Each set of data in this response format may correspond to the following locations:
    c the 8-character ASCII of the brand or make of firmware (values: e.g., CISCO, SAMSUNG, GENERIC, etc.).
Unused characters may be space characters. The manufacturer names are merely hypothetical.

Example

APMK Samsung <LF>
The above example would show an Antenna 109 is running the Samsung version of firmware.
Self-Test
Antenna 109 Self-Test Query: TST?<LF>
This command requests self-test status for an Antenna 109.
Response format: TEST cccc<LF>
Each set of data in this response format may correspond to the following locations:
    cccc the 4-character ASCII values of PASS or FAIL (values: PASS,FAIL).

Example

Test Pass<LF>
The above example reflects than an Antenna 109 passed its internal self-tests.
Internal Voltages
Antenna 109 Internal Voltage Readings Query: VLT?<LF>
This command requests internal voltage readings for an Antenna 109.
Response format: VOLT aa.a b.bb c.cc d.dd e.ee f.ff<LF>
Each set of data in this response format may correspond to the following locations:
    aa.a Power over Ethernet (POE) input voltage in decimal ASCII (values: 00.0-99.9 volts);
    b.bb a 5-volt regulator voltage in decimal ASCII (values: 0.00-9.99 volts);
    c.cc a 3.6 volt regulator voltage in decimal ASCII (values: 0.00-9.99 volts);
    d.dd a 3.3 volt regulator voltage in decimal ASCII (values: 0.00-9.99 volts);
    e.ee a 3.2 volt first battery voltage in decimal ASCII (values: 0.00-9.99 volts);
    f.ff a 3.2 volt second battery voltage in decimal ASCII (values: 0.00-9.99 volts).

Example

Volt 47.5 4.99 3.58 3.27 2.50 3.11<LF>
The above example reflects the following voltages for an Antenna 109:
    PoE=47.5 VDC;
    5V Reg=4.99 VDC;
    3.6V Reg=3.58 VDC;
    3.3V Reg=3.27 VDC;
    V Batt1=2.50 VDC;
    V Batt2=3.11 VDC.
Low Noise Amplifier Gain
Antenna 109 LNA Gain Query: LNA?<LF>
This command requests configuration of active ports.
Response format: LNAG±dd±dd dd #dd<LF>
Each set of data in this response format corresponds to ports 1 to 4 as follows:
    ±dd a port's approximate dB gain in decimal ASCII (values: −20 to +17 dB).

Example

LNAG +17 +17 +00 +00<LF>
The above example may be a power-on default for a newly deployed Antenna 109:
    Port 1 LNA gain is approximately +17 dB (typically +30 dBil to +36 dBil total peak gain);
    Port 2 LNA gain is approximately +17 dB;
    Port 3 LNA gain is approximately +0 dB (typically +13 dBil to +19 dBil total peak gain); and
    Port 4 LNA gain is approximately +0 dB.
Antenna 109 LNA Gain Setting: LNAP ±dd ±dd ±dd ±dd vt<LF>
This command sets and saves configuration of active Ports.
Response format: LNAP ±dd ±dd ±dd ±dd vt<LF > (echo of received command)
Each set of data in this response format corresponds to ports 1 to 4 as follows:
    ±dd a port's approximate dB gain in decimal ASCII (values: −20 to +17 dB);
    v a virtual set number in hexadecimal ASCII (values may be 0 for non-virtual/default, 1 for virtual set 1 or ports 5-8, 2 for virtual set 2 or ports 9-C);
    t time to hold the setting in minutes in hexadecimal ASCII (values may be 0-E, with F being reserved for final or permanent setting).

Example

LNAP +17 +17 +10 +10 0F<LF>
The above example is for a permanent LNA gain setting:
    Port 1 LNA gain set to approximately +17 dB (typically +30 dBil to +36 dBil total peak gain) non-virtual port, final setting;
    Port 2 LNA gain set to approximately +17 dB, non-virtual port, final setting;
    Port 3 LNA gain set to approximately +10 dB (typically +23 dBil to +29 dBil total peak gain) non-virtual port, final setting; and Port 4 LNA gain set to approximately +10 dB, non-virtual port, final setting.
Save Current Final Apogee LNA Gain: LNAW<LF>
Response format: LNAW<LF> (echo)
Firmware Block (Update)
Antenna 109 Firmware Block Read Query: FWB? 0baaaaaa<LF>

This command requests block of 64 bytes, starting at address aaaaaa (hexadecimal ASCII), from Bank b (b value ranges from 0 to F). NOTE: u is 0 for all queries. The address must be divisible by 0x40 (Hex 40): 000000, 000040, 000080, 0000C0, 000100, 000140, . . . 01FFC0.
Response format: FWBR ubaaaaaa hh hh hh hh hh . . . hh<LF>

The parameters in this response format are as follows:
  u status=always 0 in a query, in Hexadecimal ASCII (values: 0);
  b firmware copy bank, in hexadecimal ASCII (values: 0-F), where up to 16 versions of the firmware can be stored;
  aaaaaa block starting address in hexadecimal ASCII (values: 00000000-001FFFC0); and
  hh . . . hh block of 64 bytes starting at address 0baaaaaa above (values: 00-FF).

Example

FWB? 0A000080<LF>
FWBR 0A000080 00 01 02 03 04 05 06 07 08 09 0A 0B 0C 0D 0E 0F
  10 11 12 13 14 15 16 17 18 19 1A 1B 1C 1D 1E 1F
  20 21 22 23 24 25 26 27 28 29 2A 2B 2C 2D 2E 2F
  30 31 32 33 34 35 36 37 38 39 3A 3B 3C 3D 3E 3F<LF>

The above example shows the Firmware Block starting at address 000080 in Bank A (decimal 10):
  00 01 02 03 04 05 06 07 08 09 0A 0B 0C 0D 0E 0F 10
  11 12 13 14 15 16 17 18 19 1A 1B 1C 1D 1E 1F 20 21
  22 23 24 25 26 27 28 29 2A 2B 2C 2D 2E 2F 30 31 32
  33 34 35 36 37 38 39 3A 3B 3C 3D 3E 3F Antenna 109 Firmware Block Setting: FWBK ubaaaaaa hh hh hh . . . hh<LF>

The parameters in this command format may be as follows:
  u status in hexadecimal ASCII (values: 0-2) set to u=1 while sending firmware data, to u=0 when firmware sending has been completed, set to u=2 when erasing entire firmware;
  b firmware copy bank, in hexadecimal ASCII (values: 0-F); up to 16 versions of the firmware can be stored
  aaaaaa block starting address in hexadecimal ASCII (values: 00000000-001FFFC0)
  hh . . . hh block of 64 bytes starting at address baaaaaa above (values: 00-FF)

This command sets new firmware block content of 64 bytes, starting at address ubaaaaaa (hexadecimal ASCII). This address must be divisible by 0x40 (Hex 40): 000000, 000040, 000080, 0000C0, 000100, 000140, . . . 1FFC0.

Status must be u=0, i.e., the last block of 64 bytes must have been sent, in order to restart sending firmware by sending one more block, i.e., repeating the last block. Status must be u=2 before when saving new firmware.
Response format: FWBK ubaaaaaa hh hh hh . . . hh<LF> (echo of received command)

Example

FWBK 1E$_{0002}$C0 00 01 02 03 04 05 06 07 08 09 0A 0B 0C 0D 0E 0F
  10 11 12 13 14 15 16 17 18 19 1A 1B 1C 1D 1E 1F
  20 21 22 23 24 25 26 27 28 29 2A 2B 2C 2D 2E 2F
  30 31 32 33 34 35 36 37 38 39 3A 3B 3C 3D 3E 3F<LF>

The above example sets the firmware block starting at address 000002C0 of Firmware Bank E (decimal 14):
  00 01 02 03 04 05 06 07 08 09 0A 0B 0C 0D 0E 0F 10
  11 12 13 14 15 16 17 18 19 1A 1B 1C 1D 1E 1F 20 21
  22 23 24 25 26 27 28 29 2A 2B 2C 2D 2E 2F 30 31 32
  33 34 35 36 37 38 39 3A 3B 3C 3D 3E 3F Sample last block of firmware transaction:
→ FWBK 120FFC0 00 01 02 03 04 05 06 07 08 09 0A 0B 0C 0D 0E 0F
  10 11 12 13 14 15 16 17 18 19 1A 1B 1C 1D 1E 1F
  20 21 22 23 24 25 26 27 28 29 2A 2B 2C 2D 2E 2F
  30 31 32 33 34 35 36 37 38 39 3A 3B 3C 3D 3E 3F<LF>
← FWBK 120FFC0 00 01 02 03 04 05 06 07 08 09 0A 0B 0C 0D 0E 0F
  10 11 12 13 14 15 16 17 18 19 1A 1B 1C 1D 1E 1F
  20 21 22 23 24 25 26 27 28 29 2A 2B 2C 2D 2E 2F
  30 31 32 33 34 35 36 37 38 39 3A 3B 3C 3D 3E 3F<LF>
→ FWBK 020FFC0 00 01 02 03 04 05 06 07 08 09 0A 0B 0C 0D 0E 0F
  10 11 12 13 14 15 16 17 18 19 1A 1B 1C 1D 1E 1F
  20 21 22 23 24 25 26 27 28 29 2A 2B 2C 2D 2E 2F
  30 31 32 33 34 35 36 37 38 39 3A 3B 3C 3D 3E 3F<LF>
← FWBK 020FFC0 00 01 02 03 04 05 06 07 08 09 0A 0B 0C 0D 0E 0F
  10 11 12 13 14 15 16 17 18 19 1A 1B 1C 1D 1E 1F
  20 21 22 23 24 25 26 27 28 29 2A 2B 2C 2D 2E 2F
  30 31 32 33 34 35 36 37 38 39 3A 3B 3C 3D 3E 3F<LF>

Firmware setting is complete, new firmware saved in bank 2. When u=0, the data sent is not saved, but it signals an Antenna 109 that the firmware setting activity has finished, so any partial data in its buffer is written to memory and saved. An Antenna 109 may buffer 33 blocks of 64 bytes before saving data to flash memory. If an error is detected during an upload, the upload may be stopped by sending a last block with u=2 (erase), then uploading again from the beginning. An Antenna 109 will erase the whole bank when u changes from a 0 to a 1, or when u=2, i.e., when a new upload begins. Flash memory cannot be edited, but must be erased, then re-written. Thus, u=1 is interpreted to mean a firmware upload is in progress, and u=0 terminates a firmware upload in progress (firmware upload is complete). $A_N$ OPERATOR MUST VERIFY NEW FIRMWARE.
Update Firmware (after all the Blocks are Set and Verified with a Read): FUPD b<LF>
The parameters in this command format are as follows:
  b is the firmware copy bank, in hexadecimal ASCII (values: 0-F), and up to sixteen (16) versions of the firmware can be stored.
Response Format: FUPD b<LF> (Echo)

Following a response, there will be a period of time during which an Antenna 109 will be inactive while it is updating its firmware. If a firmware update fails, by default, an Antenna 109 may update to the next most recent firmware bank b−1. A bank number may be incremented by 1 with each firmware upgrade. When b=F, increment to b=0: 0→1→2→3→4 . . . →E→F→0→1→2→.
Firmware Update Procedure:
1. Erase the firmware copy bank, with u=2 (FWBK 2baaaaaa . . . ). Data should be the first block, or dummy data (address and data will be ignored).

2. Upload the firmware to the next bank with FWBK, with u set to 1 (FWBK 1baaaaaa . . . ), and start uploading at the beginning address (normally not 000000), incrementing by hex 000040 with each block. A bank value (b) should not be changed during the upload, as it will terminate the upload and damage the firmware at both bank numbers.

3. Repeat the last upload block above, but with u=0 (FWBK 0baaaaaa . . . ) to finish the firmware upload.

4. Once the firmware has completely and successfully uploaded, an operator may read each and every block uploaded above and verify its contents by comparing to the original firmware file.

5. Once every block has been verified to be correct and identical to the original firmware file, a firmware update command may be issued, pointing to the above bank: FUPD b<LF>

6. After some time (update+reboot), an Antenna will reset operation, running on the new firmware code.

3. Process Flow

AMS running on a server 102 in an embodiment may support permissions for at least two types of operators: administrators and end-users. Administrator permissions may enable an administrator to establish one or more accounts, to register one or more Antenna Devices 109 with each such account, to view, edit, and configure a profile for each Antenna Device 109 associated with each of said one or more accounts. End-user permissions may enable an end-user to view and enter supplemental but potentially variable identifying information for one or more Antenna Devices 109 associated with an account for that end-user.

In an embodiment, an administrator may initiate registration of an Antenna Device 109 by first making a determination as to whether there already exists an account for an end-user. If an administrator determines that there is an existing account for an end-user, the administrator simply will access the existing account for that end-user. If no such account exists, the administrator may create an account for the end-user. In an embodiment, an end-user may be required to provide an administrator with pertinent end-user contact information, e.g., company name, company address, company e-mail address and company telephone number in order to create an account.

In an embodiment, an account may be created only by an administrator. Following the establishment of a new account, in an embodiment, an administrator may provide login credentials to an end-user to enable the end-user to access AMS.

Once an existing account for an end-user has been identified, or a new account established for an end-user, in an embodiment, an administrator may proceed to register one or more Antenna Devices 109 to the account by entering into an AMS database permanent, identifying data unique to each such Antenna Device 109. By way of example and not limitation, in an embodiment, these data could be a MAC address or a serial number, or both. In an embodiment, following registration of one or more Antenna Devices 109 to be associated with an account, an administrator then may provide login credentials to an end-user to enable the end-user to access AMS.

FIGS. 18-30 illustrate various GUI windows and graphics or other suitable visual monitor that may be displayed to one or more operators to carry out an SDA method in an embodiment. An SDA method may comprise multiple sub-methods, at least some of which may be carried out independently, but will always include a sub-method of establishing a connection between a server and an Antenna Device 109 and authenticating an Antenna Device 109, and a sub-method of creating and installing or modifying an antenna profile on an Antenna Device 109. Other sub-methods included in an SDA may be registration by an administrator of one or more Antenna Devices 109 to be associated with an account, orienting an Antenna Device 109, measuring the tilt of an Antenna Device 109 for possible tilt adjustment, and installation of new firmware for an Antenna Device 109.

FIGS. 31-35 together constitute a high-level flow chart reflecting one embodiment of a main process flow for an SDA method comprising multiple sub-methods.

An SDA, in an embodiment, may include registration—the creation of an account for an end-user with at least one Antenna Device 109—initiated by an administrator 3101 using AMS on a server 102. This first sub-method may involve a determination by an administrator as to whether an end-user is new or existing 3102, following which an administrator, using AMS on a server 102, may attempt to locate an existing account for an existing end-user 3103, or create a new account for a new end-user 3104, and register 3105 an Antenna Device 109 to the account of the end user by entering into AMS permanent, device-specific data associated with each of the one or more Antenna Devices 109. By way of example and not limitation, these permanent, device-specific data may include a MAC address, a serial number, or both.

Figure 18A:
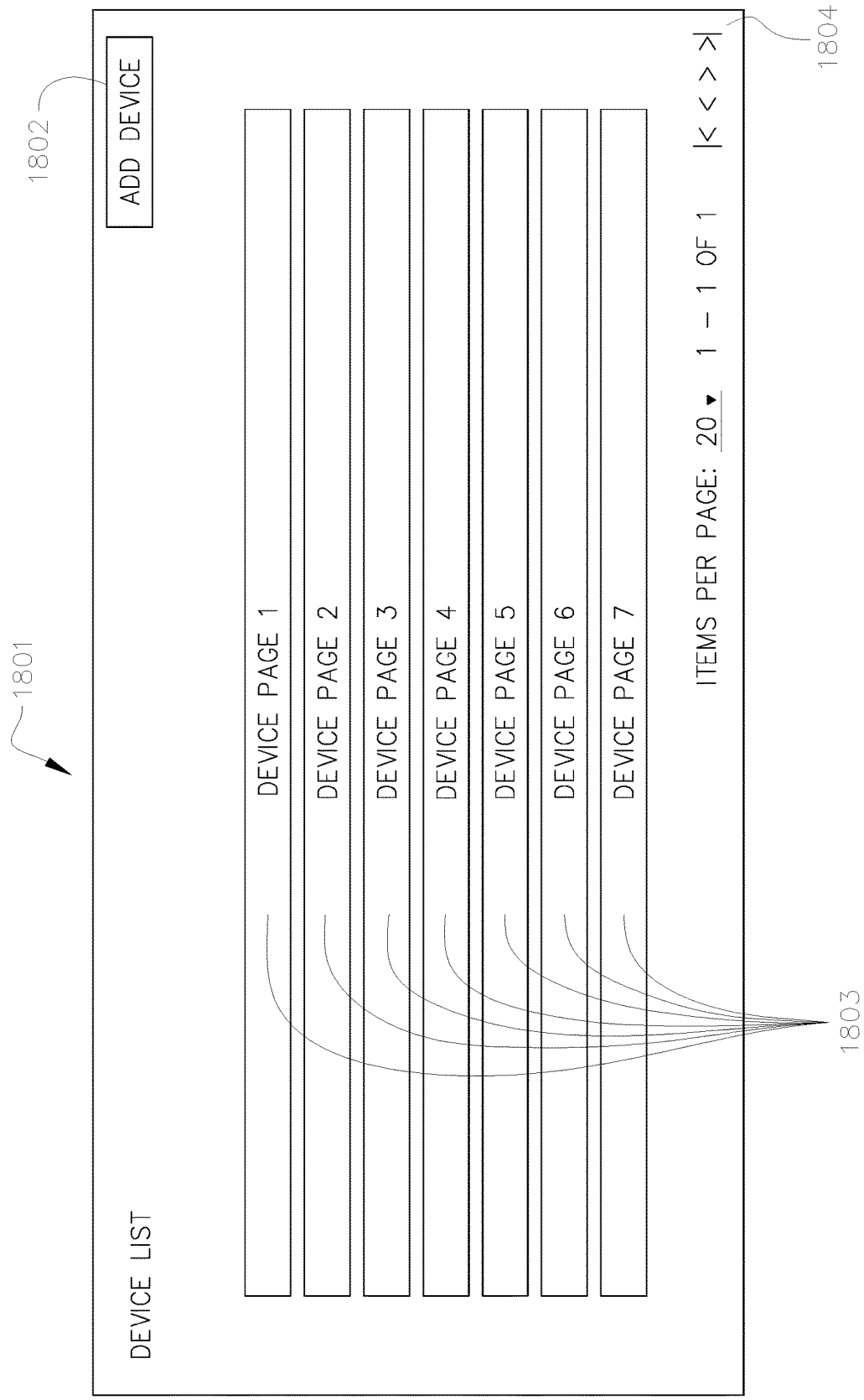
Figure 18B:
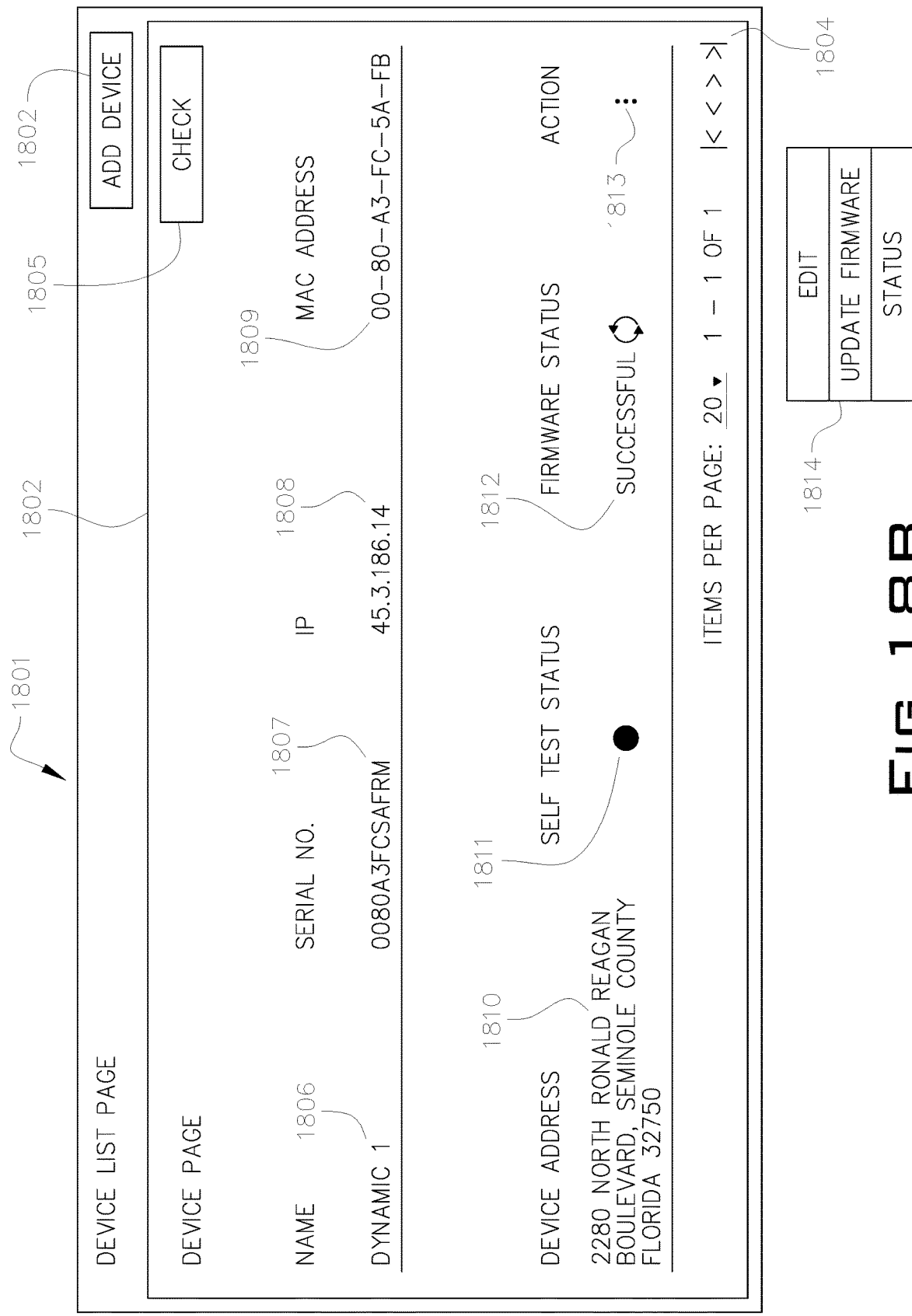

In an embodiment, an administrator may navigate to a Device List GUI window 1801, as illustrated in FIG. 18, or another form of display of Antenna Devices 109 registered to an account. A Device List GUI Window 1801 or other suitable display output may contain various data fields to identify an Antenna Device 109, such as fields for a Device MAC Address, a Device Serial Number, a Device Name, a Device IP Address, and a Device (Physical or Street) Address. Additionally, in an embodiment, a Device List GUI Window 1801 may comprise one or more command buttons, such as an Add Device Button, 1807, an Action (More Options) Button, and a Get All Status Button 1809. In an embodiment, a Device List GUI Window 1801 or other suitable display further may include status indicators, such as a Self-Test Status Indicator 1810 and a Firmware Status Indicator 1811.

Figure 19:
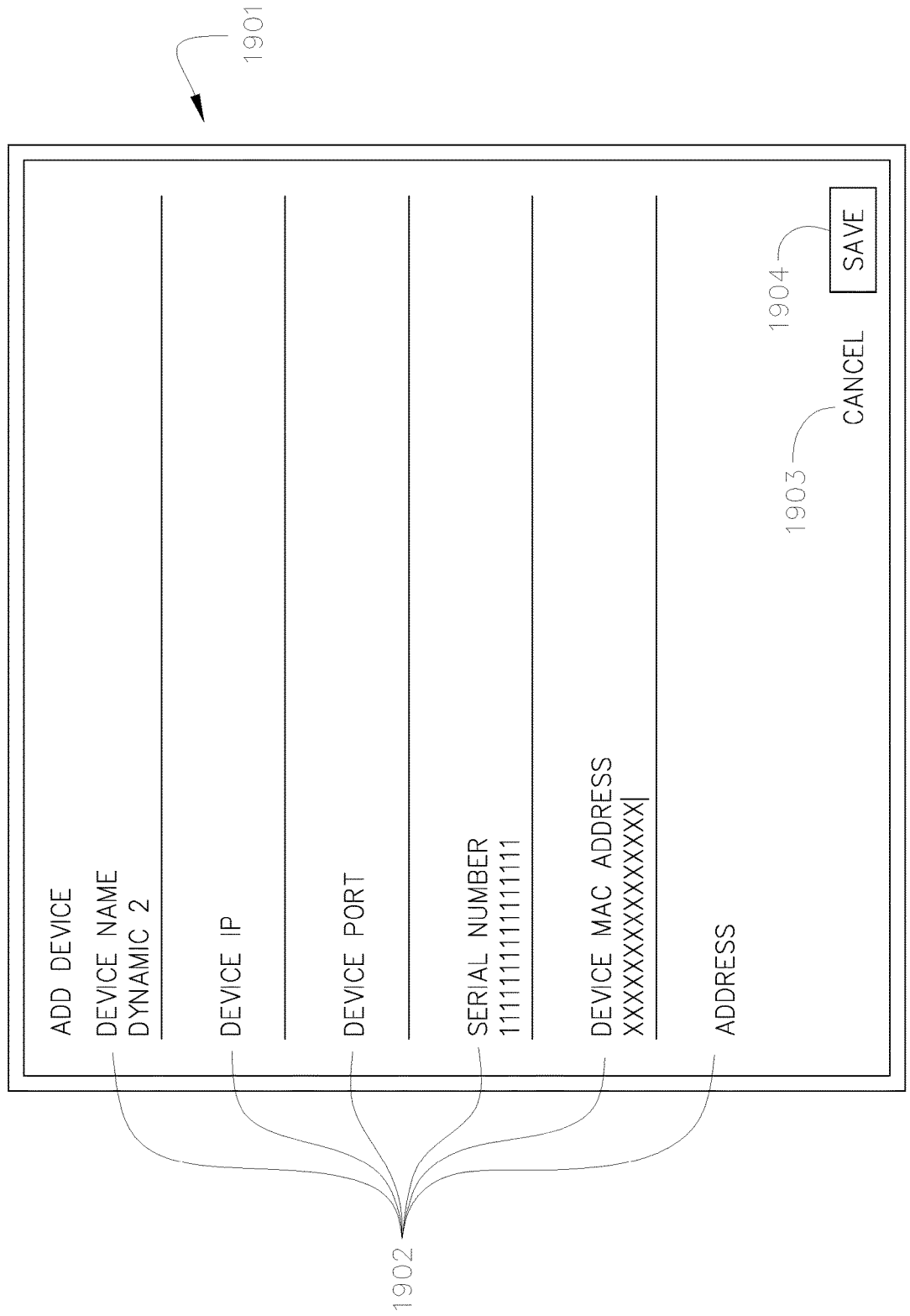

In an embodiment, an administrator may click on an Add Device button 1807, or otherwise execute a command associated with adding an Antenna Device 109, to open an Add Device GUI Window 1901, as shown in FIG. 19, or other suitable display. An Add Device GUI Window 1901 or other suitable display in an embodiment may have a data entry field for each data field appearing in a Device List GUI Window 1801 or other suitable display. In an embodiment, one or more of these data entry fields may only be accessible to, or modifiable by, an operator with administrative privileges.

In an Add Device GUI Window 1901 or other suitable display of an embodiment, an administrator may record for an Antenna Device 109 a MAC address in a Device MAC Address Field 1802 and a serial number in a Device Serial Number Field 1803. An administrator, in an embodiment, may also record in a Device Name Field 1804 a name for each Antenna 109. Fields for additional data for an Antenna Device 109, such as a Device IP Address Field 1805, Device Port Number Field 1902, and Device (physical or street) Address Field 1806, may be left blank by an administrator in an embodiment for an end-user to populate at a later time by remote access via the Internet 106 or other suitable communications medium to AMS running on a server 102.

In an embodiment, an administrator may save the entered data by clicking on a Save Button 1903, or otherwise by executing a command associated with saving the entered data. A Cancel Command Button 1904 may be clicked, or a command otherwise executed in an embodiment to close out an Add Device GUI Window 1901 or other suitable display without making any changes to its various data fields. In an embodiment, finally, an administrator may provide an end-user with credentials to access AMS 3106 on the server 102, who may then add certain identification data for which may be subject to change, at which point a first sub-method of an SDA method concludes, and no further action may be required of the administrator with respect to the registration of the one or more Antenna Devices 109.

In an embodiment, AMS may enable an operator, who may be an end-user, to create an antenna profile for an Antenna Device 109. An antenna profile may include, in an embodiment: 1) a defined RF coverage area; 2) an antenna type, i.e., single panel, sector (multi-panel) or omni-directional; 3) an assignment of one or more ports to one or more reflective panels; 4) a selection of RF single band, RF dual band or RF multi-band operation; and 5) a selection of antenna polarity, i.e., vertical polarity, horizontal polarity or dual polarity.

In an embodiment, once a profile has been completed, an operator, who may be an end-user, may execute a command causing AMS running on a server 102 to download said antenna profile via the Internet 106 or another suitable communication medium to a remotely installed Antenna Device 109 with one or more embedded microprocessors, circuitry and one or more switching matrices. An Antenna Device 109 in an embodiment then may send a response to a central server 102 acknowledging the command, and proceed first to store the profile in NVM 505, and then to apply the profile. In an embodiment, once a profile has been so stored and applied, an Antenna Device 109 may begin propagating an RF signal to any geographic coverage area defined in the profile without further interaction with AMS.

Figure 20:
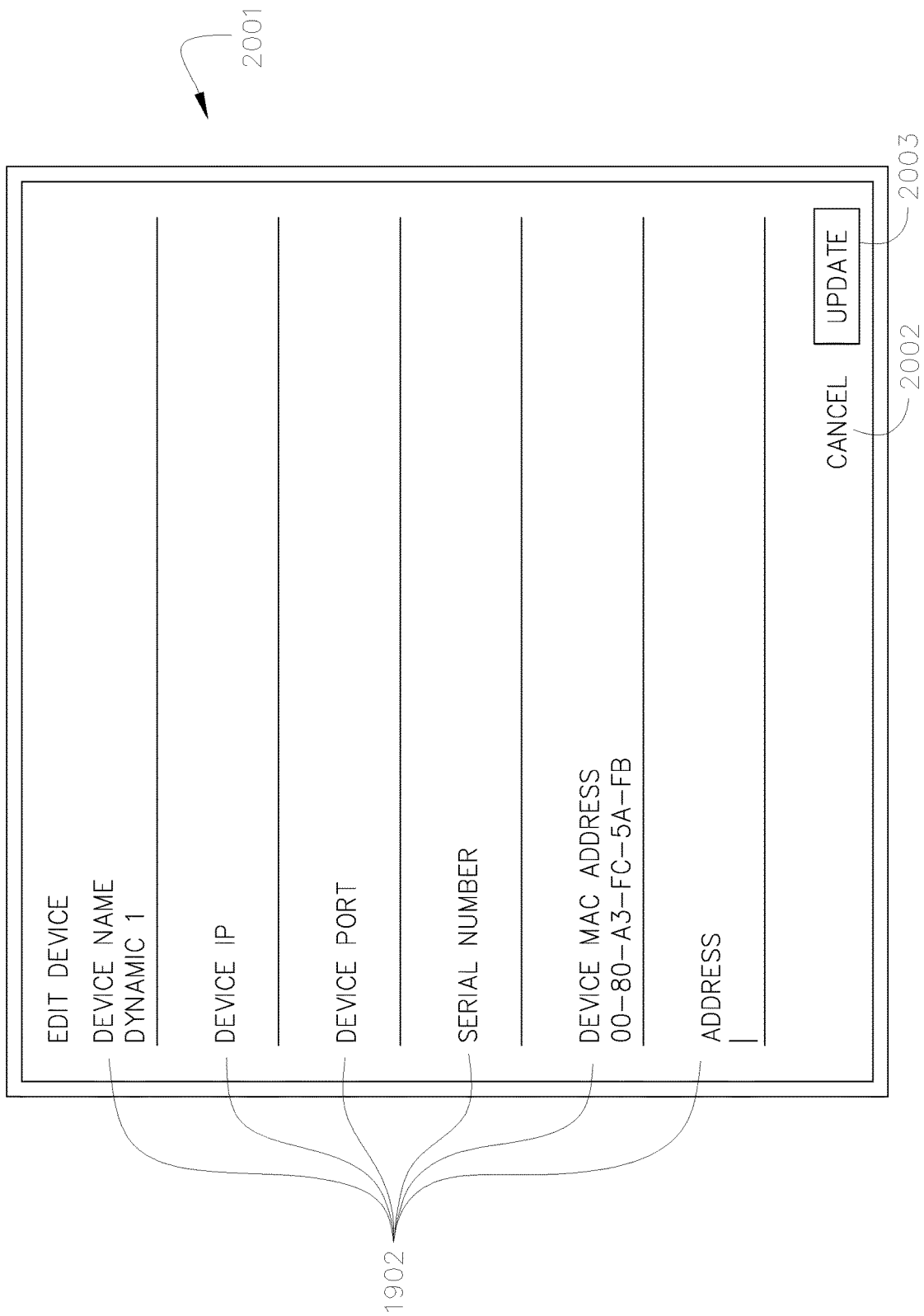

In an embodiment, beginning with FIG. 31, a second sub-method of an SDA method may commence after an end-user navigates to a Device List GUI window 1801 (FIG. 18) in which certain fields (e.g., Device MAC Address Field 1803, Device Serial Number Field 1804, Device Name Field 1805) may have been populated previously by an administrator. An end-user may click on an ACTION Button 1809 to produce an Edit Device GUI Window 2001, as illustrated in FIG. 20, into the available unpopulated fields of which the end-user may enter additional data, such as Device IP Address Field 1805, Device Port Number Field 1902, and Device Address Field 1806, 3107. A device IP address and device port number for an Antenna 109 may enable AMS to establish a secure connection to the Antenna 109 once it has been installed and powered. A device address (e.g., a street address) may provide physical, geographic location data for an Antenna 109 by which AMS may determine the declination of the Antenna 109. A device may also initiate a perpetual, secure connection to a server.

Once additional data has been entered into any of the various available data fields in an Edit Device GUI Window 2001, an operator, who may be an end-user, may save those data to a server by clicking on an Update (Save) Button 2002. A Cancel Button 2003 may be used to close out an Edit Device GUI Window 2001 without saving any changes to its various data fields.

Authentication of an Antenna Device

In an embodiment, a Device List GUI Window 1801.1 may display a Device Page GUI Window ("Device Page") 1801.2 for each of one or more Antenna Devices 109 associated with an end-user across one or more Display Pages 1801.3. An end-user, in an embodiment, may navigate to a Device List GUI Window 1801, 3109, automatically causing AMS to attempt to establish a connection between a server 102 and each Antenna Device 109 associated with said end-user's account by opening a Transmission Control Protocol/Internet Protocol (TCP-IP) socket and sending a command query to each Antenna Device 109 to initiate an IPSec Tunnel 3109. Alternatively, in an embodiment, an Antenna Device 109 may initiate the connection to a server 102 by opening a TCP-IP socket and sending a command query to the server 102 to initiate an IPSec Tunnel, and this connection may remain open for an indefinite period of time.

In an embodiment, a determination then may be made by AMS as to whether a connection to an Antenna 109 has been successful 3110. If not, AMS may cause a Self-Test Status Indicator 1810 in a Device Page 1801.2 for an Antenna 109 to display red 3111, and an end-user may then decide whether to retry establishing a connection 3112 by clicking a Check Button 1809 within said Device Page 1801.2, or to report the connection failure to an administrator 3201 (see FIG. 32). An end-user may re-attempt connection an unlimited number of times in an embodiment. When a secure connection has been established between a server 102 and an Antenna 109, AMS may cause a Self-Test Status Indicator 1810 in a Device Page 1801.2 for that Antenna 109 to display green 3202.

As reflected in FIG. 32, in an embodiment, upon establishing a secure connection, a command from AMS may query an Antenna 109 for its MAC address, serial number, and current firmware version. An Antenna 109 may respond to this AMS command by transmitting its MAC address, serial number, and current firmware version to AMS, which may then attempt to authenticate the Antenna 109 by comparing its unique MAC address and serial number to the MAC address and serial number for that Antenna 109 in an AMS database 3203 and ascertain whether they match 3204. If they fail to match, AMS may close the connection 3205 to any Antenna 109 that cannot be so authenticated and display a "MAC Mismatch" error message in the Device MAC Address Field 1802 of the Device Page 1801.2 for that Antenna 109, 3206. An end-user then may refer the mismatch to an administrator 3201 for resolution. When AMS has determined that the unique MAC address of an Antenna 109 is identical to the MAC address for that Antenna 109 in an AMS database, authentication is complete 3207 for the Antenna 109.

Updating Firmware for an Antenna Device

In an embodiment, upon completion of authentication 3207 of an Antenna Device 109, if a new firmware version is available, AMS will so inform an end-user via a Firmware Status Indicator/Button 1811 located within a Device Page 1801.2 for that Antenna 109. An end-user may then determine whether to update the firmware 3208.

If the Device Page 1801.2 for an Antenna Device 109 that an end-user may wish to review for a possible firmware upgrade does not appear on the current Display Page 1801.3 of a Device List GUI Window 1801.1, then utilizing Navigation Buttons 1812 within the Device List GUI Window 1801.1, an end-user may navigate to each Display Page 1801.3 until the Device Page 1801.2 for the Antenna Device 109 of interest is displayed by AMS 3210.

If the firmware for an Antenna 109 is up to date, in an embodiment, a Firmware Status Indicator/Button 1811 within a Device Page Window 1801.2 may display "SUCCESSFUL", reflecting that the last firmware update installed in an Antenna 109 remains the most current one available, or otherwise display "FIRMWARE UPDATE AVAILABLE" in lieu of "SUCCESSFUL" to indicate that new firmware may be downloaded at the option of the end-user. In the former case, an end-user may proceed with the creation and installation of a profile for the Antenna 109 utilizing the most current version of the firmware already installed in the Antenna 109, while in the latter case, an end-user may elect either to update the firmware version for the Antenna 109 or to continue building a profile for the Antenna 109 using the existing prior version of firmware stored in the Antenna 109.

If an end-user wishes to download the latest firmware to an Antenna 109, in an embodiment, the end-user may click on "FIRMWARE UPDATE AVAILABLE" i.e., the Firmware Status Button/Indicator 1811, 3301, which may cause AMS to open a TCP-IP Socket 3302, and the selected Antenna Device 109 to initiate an IPSec Tunnel 3303. In an embodiment, AMS may then proceed to send the update to the selected Antenna Device 109, 3304. During this process, a Firmware Status Indicator/Button 1811 may display the word "IN PROGRESS."

A determination may then be made as to whether a download of firmware to an Antenna 109 succeeded 3305. When a download of firmware has been completed, the Antenna 109 installs the firmware update and causes the Firmware Status Button/Indicator 1811 to read "SUCCESSFUL." If a download or installation of firmware to an Antenna 109 is unsuccessful, however, AMS will close the TCP-IP socket 3306 and the Antenna 109 will terminate the IPSec Tunnel 3307. In this event, the Firmware Status Button/Indicator 1811 does not display "SUCCESSFUL," and an end-user may retry the foregoing process of updating the firmware.

Alignment of an Antenna Device

Figure 21:
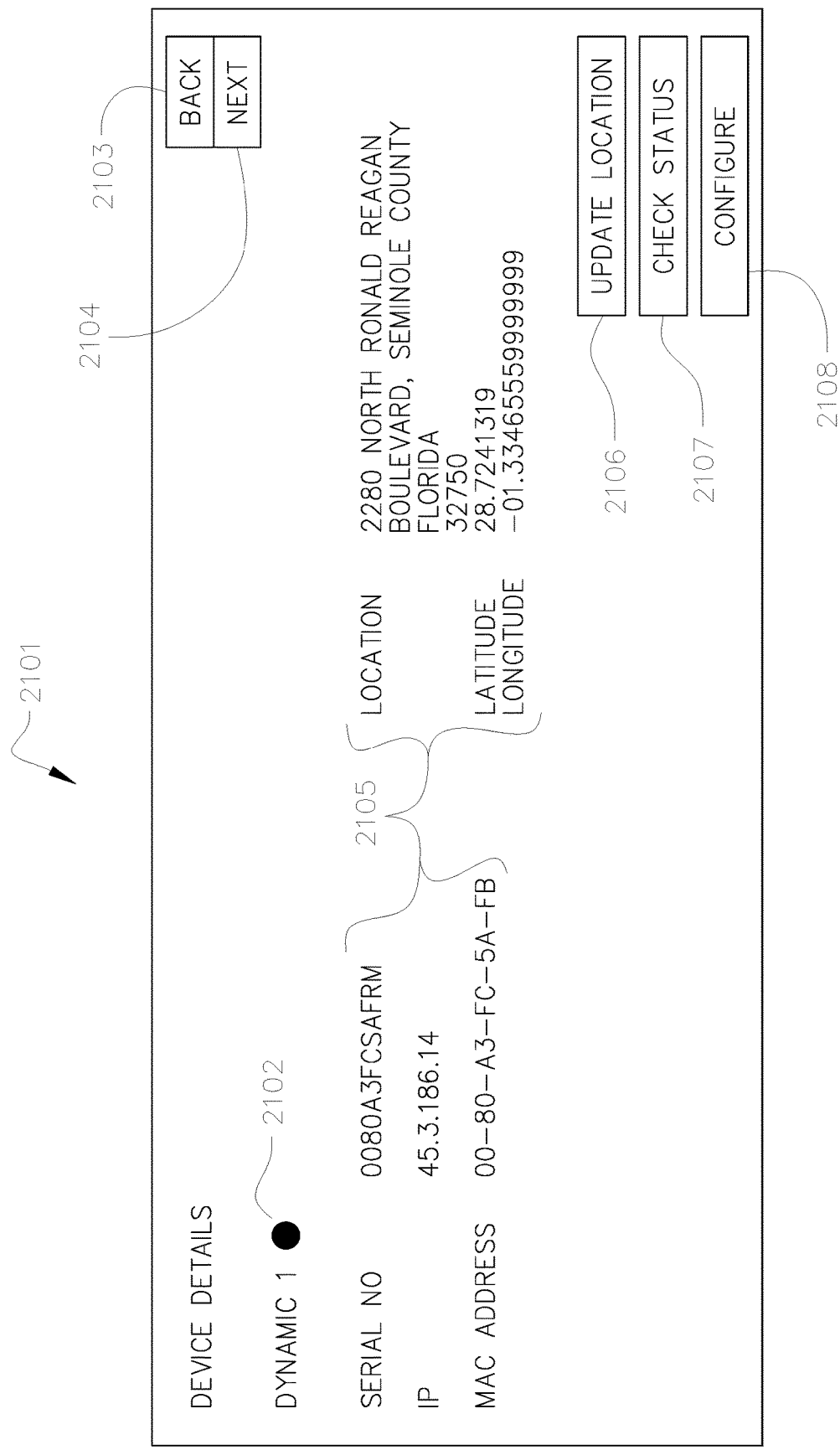
Figure 22:
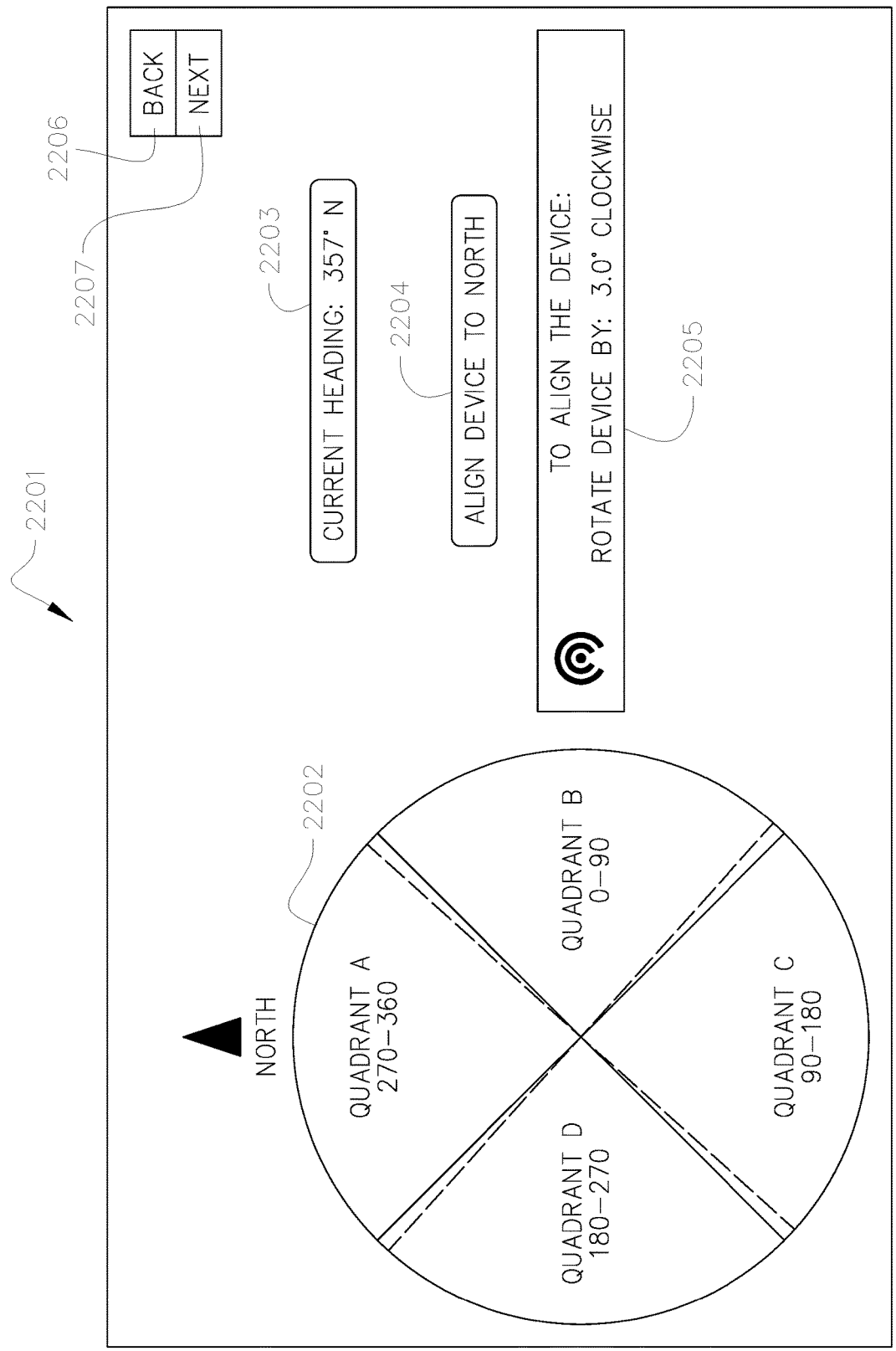

Following any authentication 3207, in an embodiment, an end-user may select an Antenna Device 109 and navigate to a Device Details (Device Page) GUI Window 2101 for the selected Antenna Device 109, as illustrated in FIG. 21, and click on a Configure button 2104 to cause AMS to display an Align Device North GUI Window 2201, as illustrated in FIG. 22, then click on an Align Device To North Button 2204, 3211. AMS then may send a query command to the Antenna Device 109, which may respond to the AMS query command by determining the orientation of the Antenna Device 109 with respect to Magnetic North and communicating that current magnetic heading to AMS which, as reflected in FIG. 33, proceeds to ascertain the whether the orientation of the Antenna Device 109 is aligned to Geographic North 3308. AMS then may display to an end-user within a Current Heading Display 2203 in an Align Device North GUI Window 2201 the true current heading of an Antenna Device 109 utilizing data supplied by a single magnetometer or, if there are a plurality of magnetometers in an Antenna Device 109, a true current heading derived from the respective magnetic headings of the plurality of magnetometers. Current headings so displayed may be expressed in degrees of arc.

In an embodiment, an end-user or technician physically co-located at an Antenna Device 109 may access AMS via a tablet, laptop, or other portable wireless device to view an Alignment Status and Instructions Display 2205 within an Align Device North GUI Window 2201. In an embodiment, a technician physically co-located at an Antenna Device 109 may communicate via cellular phone or other means with an end-user viewing an Alignment Status and Instructions Display 2205 within an Align Device North GUI Window 2201 from a computer workstation or other device. The individual co-located at an Antenna Device 109 thus may rotate the Antenna Device 109 clockwise or counter-clockwise by a certain number of degrees of arc 3214, if required to align the Antenna Device 109 to Geographic North, based on instructions displayed by AMS 3309 in the Alignment Status and Instructions Display 2205. An embodiment might also use mechanical or electrical means, or both, to rotate and orient properly an Antenna Device 109 in line with a designated geospatial heading. Such mechanical or electrical means could be controlled and operated remotely by an operator using AMS.

Figure 23:
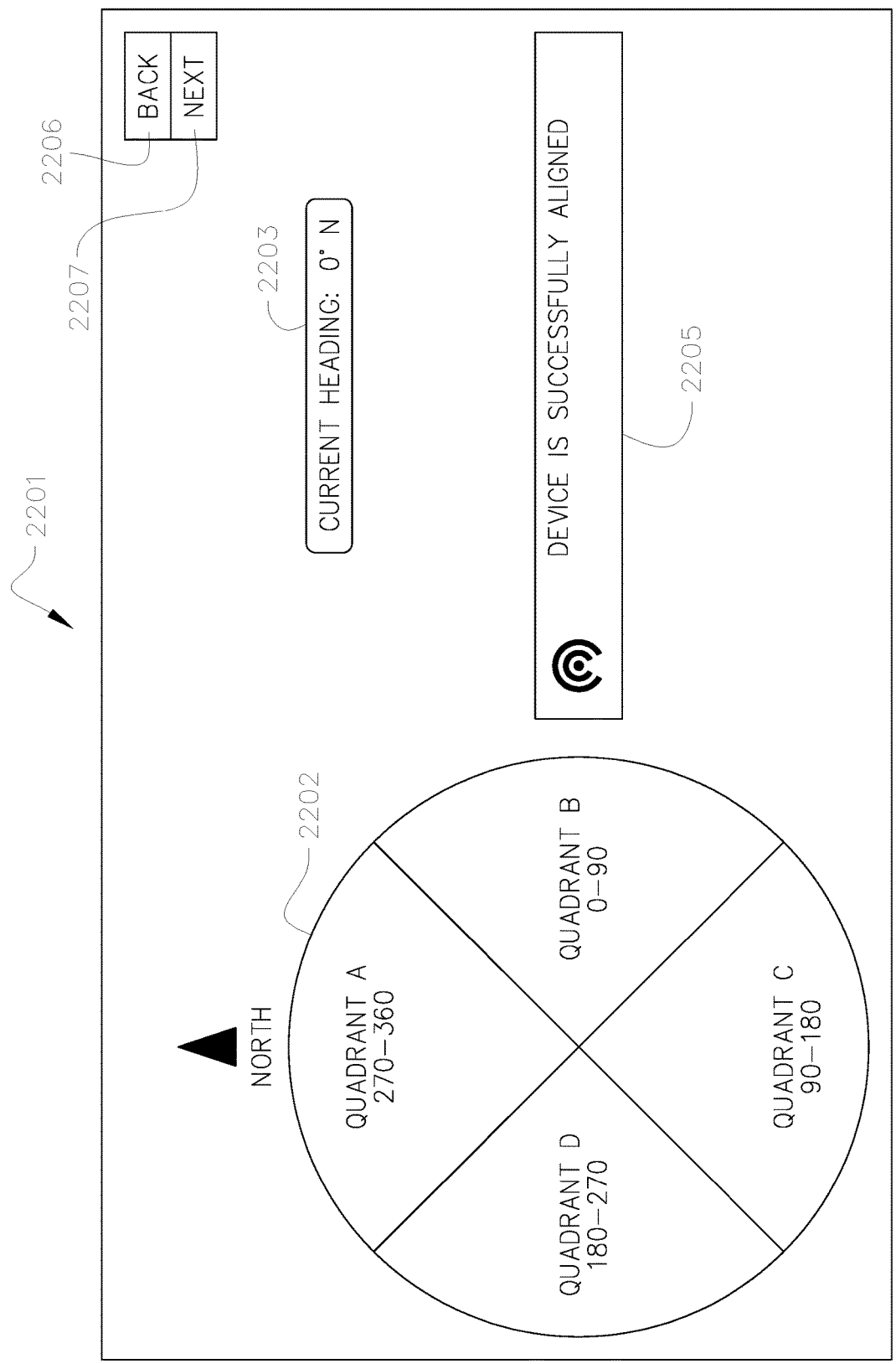
FIG. 23 Graphics For Display In A Device Orientation Page/GUI Window In An Embodiment Reflecting Confirmation Of Alignment Of An Antenna To Geospatial North (N.B.—The Center Of Quadrant A Should Be On A True North Heading)
Figure 24:
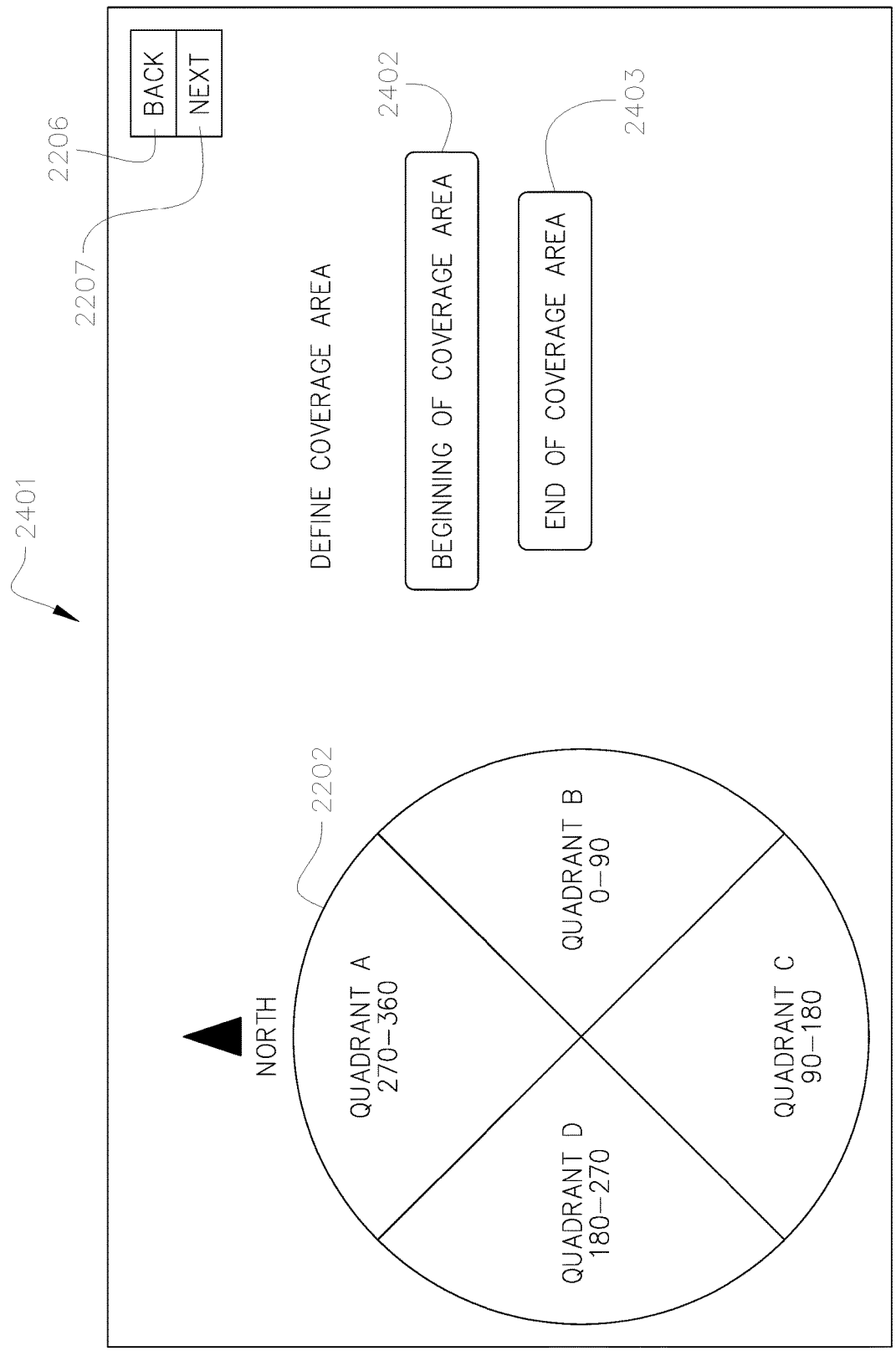
FIG. 24 Graphics For Display In A Define Coverage Area GUI Window In An Embodiment including Input Fields For An Operator To Populate To Define A Coverage Field, And Command Buttons For Calculating (Setting) A Coverage Area Based On Operator Inputs And For Resetting An Existing Coverage Area Configuration (N.B.—The Center Of Quadrant A Should On A True North Heading)

Once an Antenna Device 109 re-alignment has been completed, clicking on an Align Device To North Button and may cause AMS to re-calculate the true heading and display the results of the re-alignment effort to an operator. If the Antenna Device 109 remains unaligned to Geographic North, the alignment process may be repeated until the message "Device Is Successfully Aligned" is displayed in the Alignment Status and Instructions Display 2205, 3310 and the Current Heading Display 2203 reads 0° N, as illustrated in FIG. 23. When "Device Is Successfully Aligned" is so displayed 3310, the resulting heading of the Antenna 109 is stored in AMS, and an end-user may then navigate, e.g., by clicking a NEXT Button, to a Define Coverage Area GUI Window 2401, 3311 as illustrated in FIG. 24.

Defining an RF Geographic Coverage Area for an Antenna Device

Figure 25:
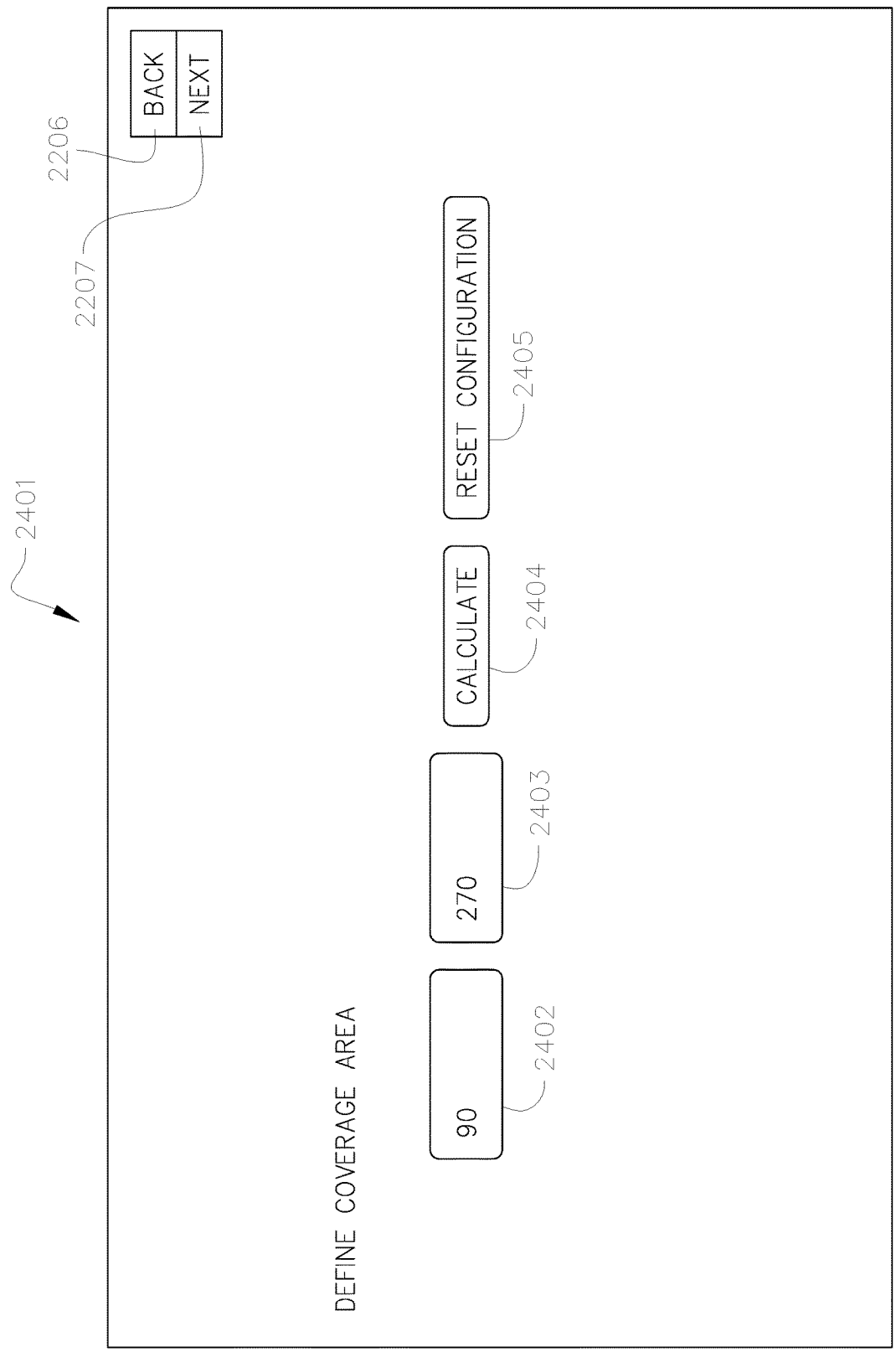
FIG. 25 Graphics For Display In A Define Coverage Area Page/GUI Window In An Embodiment Reflecting Beginning And Ending Fields As Having Been Populated By An Operator To Define A Coverage Area FIG. 26 Graphic For Display In A Define Coverage Area Page/GUI Window In An Embodiment Reflecting (here, in black) The Antenna Quadrants Activated After An Operator Has Defined And Set A Coverage Area (N.B.—The Center Of Quadrant A Should On A True North Heading) with A Get Device Tilt Button FIG. 27 Graphics For Display In A Define Coverage Area Page/GUI Window In An Embodiment Including A Get Device Tilt Button And A Resulting Display of Tilt For Each Quadrant FIG. 28 Graphics For Display In A Device Profile Page/GUI Window In An Embodiment Reflecting Available Operating Mode Options For Active Quadrants That May Be Selected By An Operator FIG. 29 Graphic For Display In A Device Profile Page/GUI Window In An Embodiment Reflecting Certain Operating Mode Options For Active Quadrants As Having Been Selected By An Operator FIG. 30 Graphics For Display In A GUI Window In An Embodiment Including A Finalize Configurations Pop-Up Menu Cancel Configurations Button and Continue Button FIG. 31A Flow Chart For A Method Of Implementing A Profile For An Antenna In An Embodiment-Server Initiates Connection (1/8)
Figure 26:
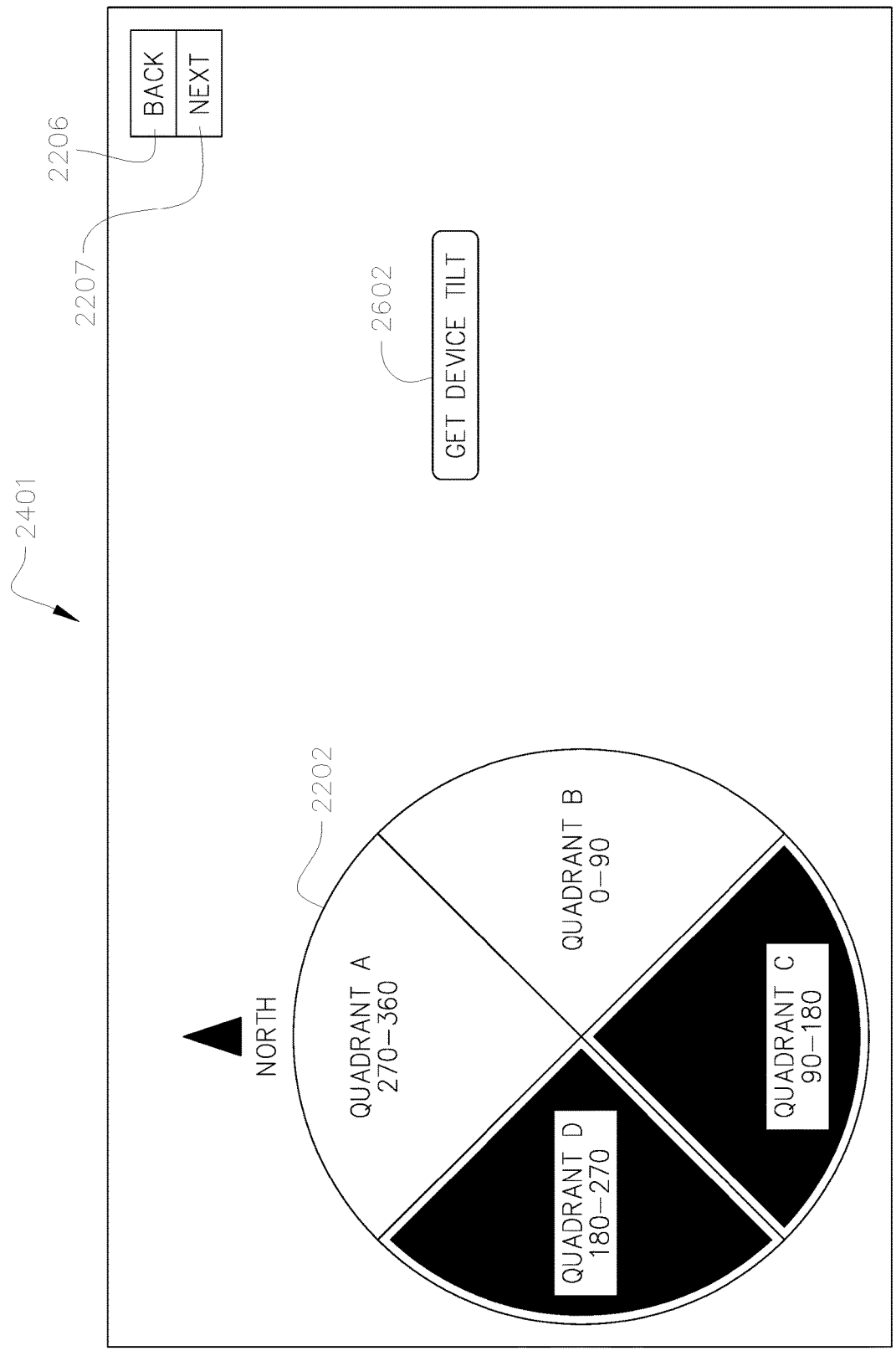

In an embodiment, a define coverage area process requires an end-user to provide AMS with true bearings to indicate the beginning and end of a desired Radio Frequency (RF) coverage area. When an Antenna 109 has been aligned to Geographic North, in an embodiment, quadrants designed $Q_A$, QB, $Q_C$, $Q_D$, could cover, respectively, 90° from 270° to 360°, 90° from 0° to 90°, 90° from 90° to 180° and 90° from 180° to 270°, as illustrated in FIG. 23. In an embodiment, upon navigating to a Define Coverage Area GUI Window 2401 as illustrated in FIG. 24, displayed by AMS 3312, an end-user may populate a Beginning of Coverage Area Field 2402 and an End of Coverage Area Field 2403 by entering degrees of arc, reflecting true bearings for the beginning and end of a desired RF coverage area originating at an Antenna 109, 3313, as illustrated in FIG. 25. An end-user may then click a Calculate Button 2404, 3313, to display the RF coverage area so defined in a graphic image in a GUI window as illustrated in FIG. 26, in which darkened areas-Quadrants C and D-reflect that these two quadrants have been activated 3316. In an embodiment, a configuration of an RF coverage area may be reset using a Reset Configuration Button 2405, and new values entered by an end-user for a Beginning of Coverage Area Field 2402 and an End of Coverage Area Field 2403.

As an example, as illustrated in FIG. 25, a value of 90° has been entered in the Beginning of Coverage Area Field 2402 and a value of 270° has been entered in the End of Coverage Area Field 2403. These values would reflect a desired cover area of 180°, beginning East and continuing to Southeast, to South, to Southwest and ending at West. AMS calculates the intended coverage area in relation to Geographic North based on the values entered by an end-user and determines which of four quadrants of an Antenna 109 should be activated to achieve the desired coverage.

Determining Device Tilt for an Antenna Device

In an embodiment, tilt in an Antenna 109 may be ascertained based on the quadrants AMS has configured and activated. Unintentional tilt in an Antenna 109 can cause signal propagation to be less than optimal in a desired coverage area. In an embodiment, AMS may query an Antenna 109 for tilt and then display the result in degrees of arc for up tilt and down tilt.

Figure 27:
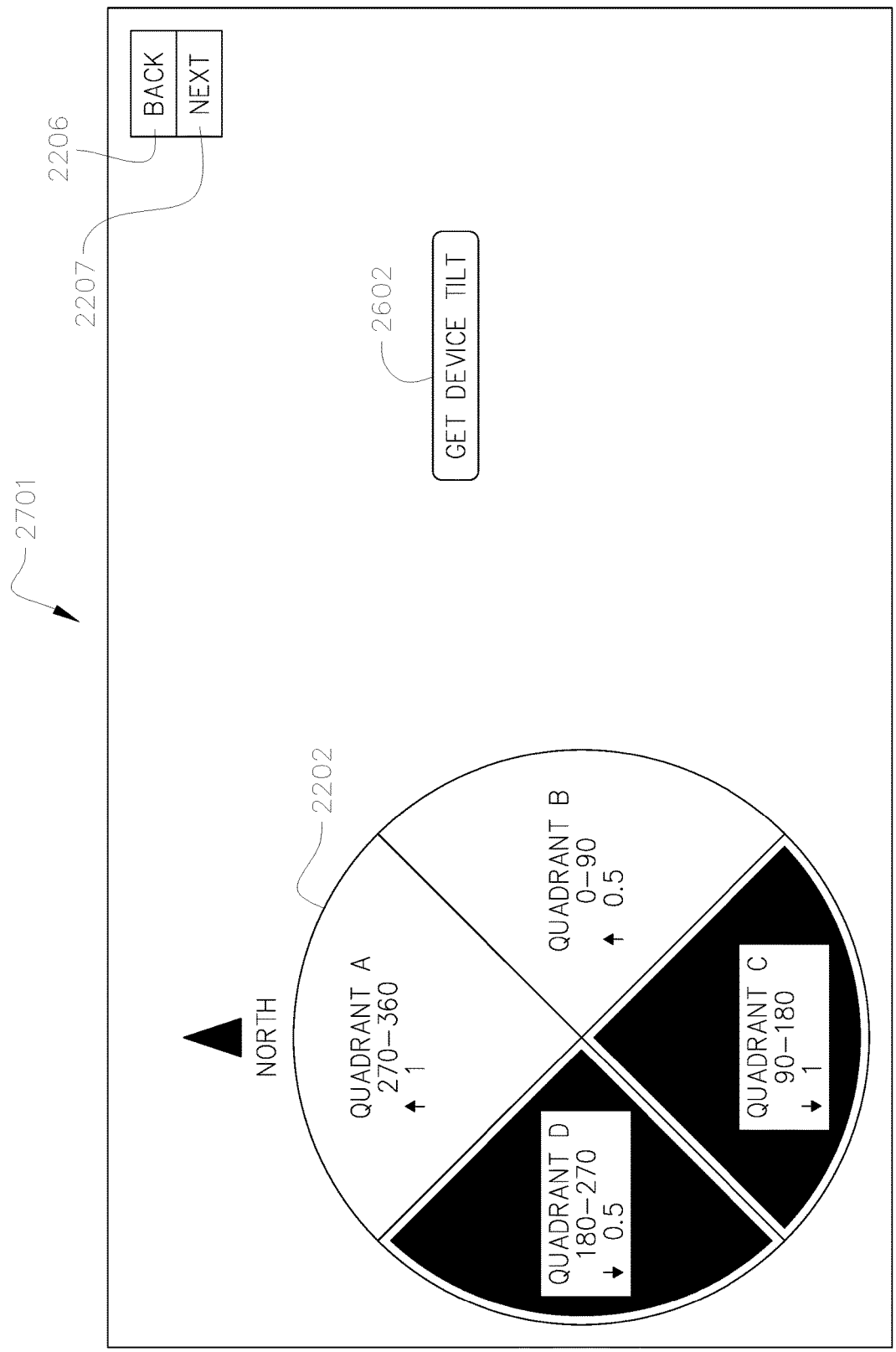

To determine the degree of tilt in an installed Antenna 109, in an embodiment, as illustrated in FIG. 27, an end-user, may select a Get Device Tilt Button 2702 in a Device Tilt GGUI window with a mouse. Selecting a Get Device Tilt Button 2702 may open a TCP/IP socket on a front end of a server and a remote Antenna Device 109 may respond by building an IPsec tunnel back to the open TCP/IP socket. In an embodiment, AMS then may send a command to an Antenna Device 109 that queries for its tilt. While this query may be carried out following any re-orientation of an Antenna Device 109 in a horizontal plane, it is preferable to do so before said re-orientation in a horizontal plane. One or more embedded accelerometers in an Antenna Device 109 may be employed to measure the degrees of tilt for the Antenna Device 109 and each segment thereof, and to transmit the result to the server via AMS, which may then display the result to an operator. As illustrated in FIG. 27, utilizing a remotely located Antenna Device 109 with a plurality of accelerometers, the degrees of tilt in the shaded quadrants selected for activation are 0.5° downward tilt in Quadrant D and 1.0° downward in Quadrant C.

Assigning Ports, Bands and Polarities with AMS

Based upon the true bearings selected by an end-user, in an embodiment, AMS may define an Antenna Device 109 to be a single-sector or multi-sector antenna, enabling the Antenna Device 109 to propagate an RF signal, e.g., over a 180° area from East, to Southeast, to South, to Southwest, to West, as illustrated in FIG. 26. An Antenna Device 109, in an embodiment, may comprise 90° quadrants and a plurality of external SMA-female RF ports 1202, e.g., four ports. Each quadrant of such an Antenna Device 109 in an embodiment may contain a plurality of available bands, e.g., one or more 2.4 GHz band radiating elements and one or more 5.0 GHz band radiating elements. In an embodiment with four external SMA-female RF ports 1202, two ports, e.g., ports numbered 1 and 4 respectively, may be designated for vertical polarity, while the remaining two ports, ports numbered 3 and 4 respectively, could be designated for vertical polarity or horizontal polarity. In an embodiment, each quadrant may be equipped with two sets of filters for each band: one set to suppress adjacent out-of-band noise, and another set of low noise amplifiers to amplify the RF signals received from devices associated with a network for the account of an end-user.

In an embodiment, an Antenna 109 may connect to one or more access points (AP), which may be effectuated via one or more wired modems, one or more wireless modems for creating Wireless Local Area Networks (WLANs), one or more radio modems for creating Virtual Large Area Networks (VLANs), or a combination thereof. A connection may be made in an embodiment by way of external RF ports that support one or more bands, e.g., a 2.4 GHz band or a 5 GHz band, or both. The connection of multiple APs to single Antenna Device 109 permits expansion in the number of concurrent wireless and other electronic devices that may utilize an Antenna Device 109.

Figure 28:
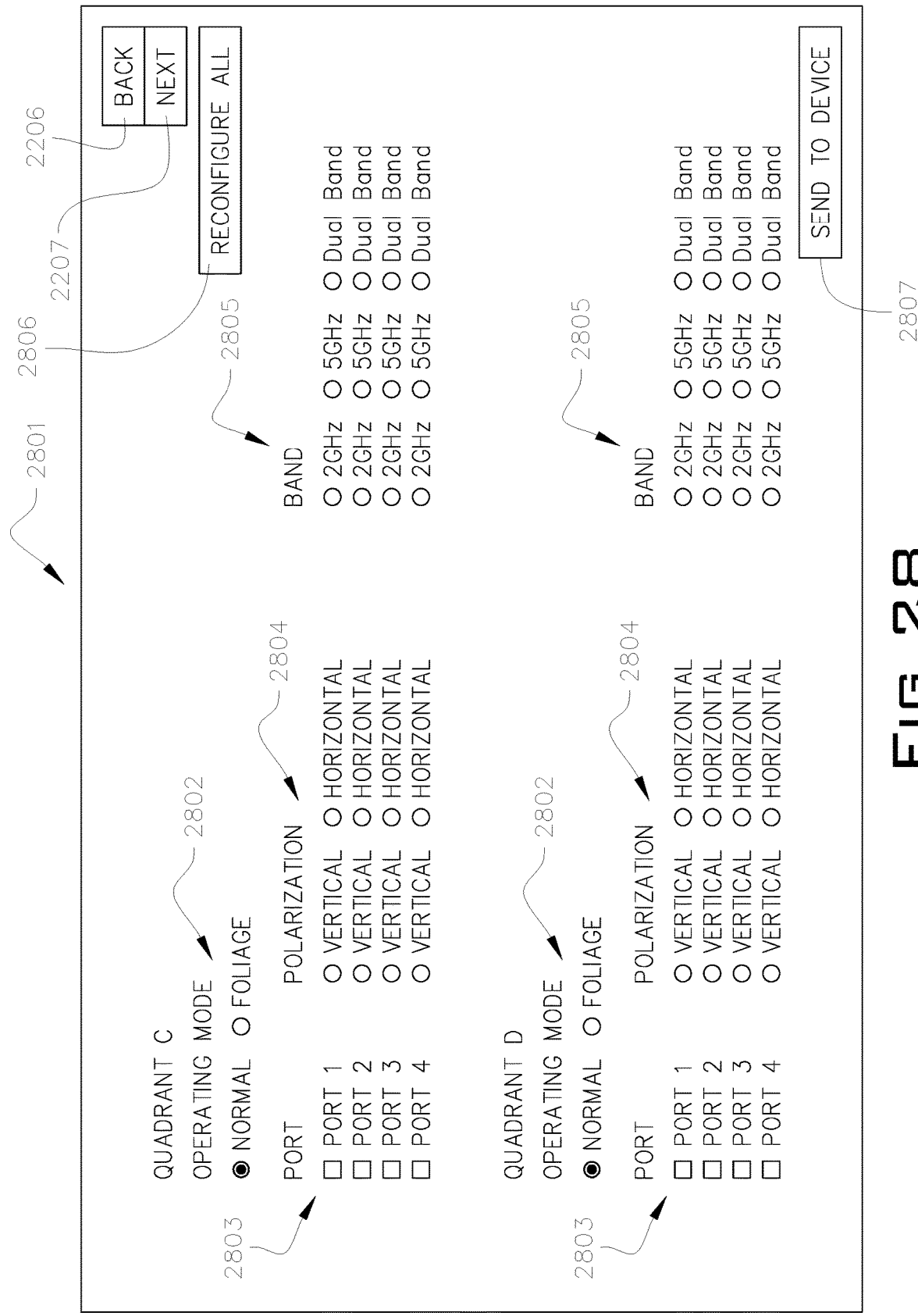
Figure 29:
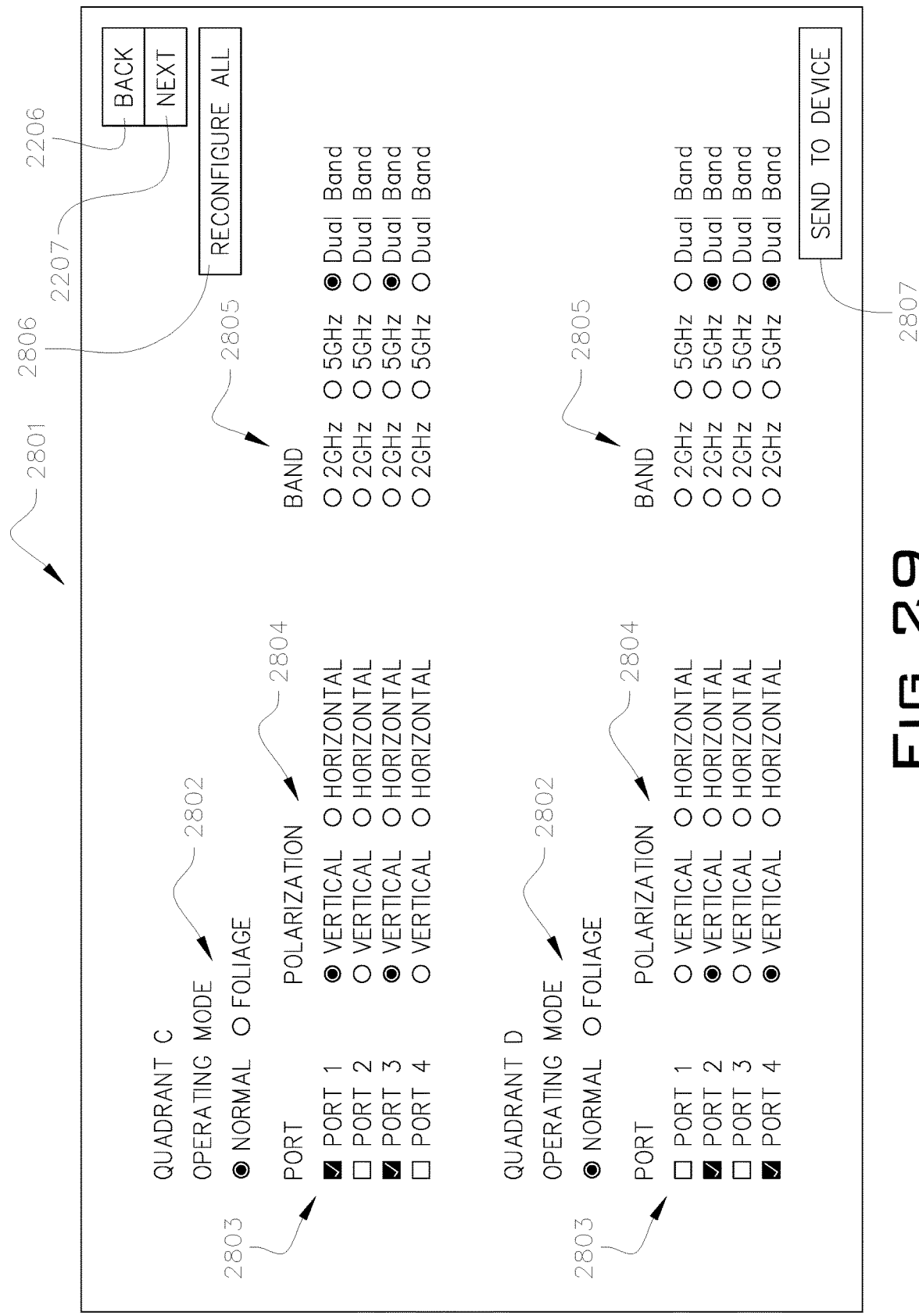
Figure 31A:
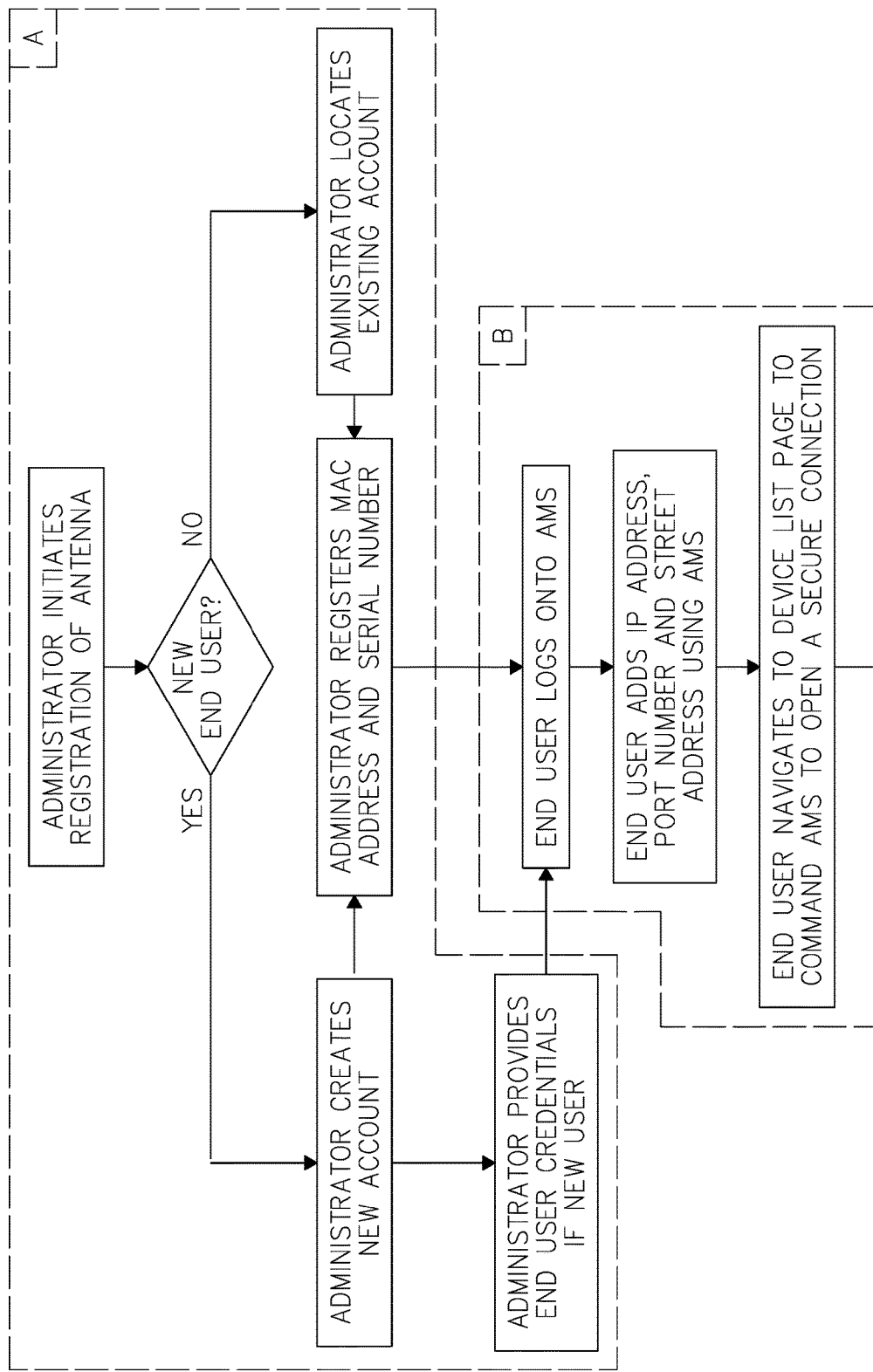
FIG. 31B Flow Chart For A Method Of Implementing A Profile For An Antenna In An Embodiment-Server Initiates Connection (2/8)
FIG. 31C Flow Chart For A Method Of Implementing A Profile For An Antenna In An Embodiment-Server Initiates Connection (3/8)
FIG. 31D Flow Chart For A Method Of Implementing A Profile For An Antenna In An Embodiment-Server Initiates Connection (4/8)
FIG. 31E Flow Chart For A Method Of Implementing A Profile For An Antenna In An Embodiment-Server Initiates Connection (5/8)
FIG. 31F Flow Chart For A Method Of Implementing A Profile For An Antenna In An Embodiment-Server Initiates Connection (6/8)
FIG. 31G Flow Chart For A Method Of Implementing A Profile For An Antenna In An Embodiment-Server Initiates Connection (7/8)
FIG. 31H Flow Chart For A Method Of Implementing A Profile For An Antenna In An Embodiment-Server Initiates Connection (8/8)
Figure 31B:
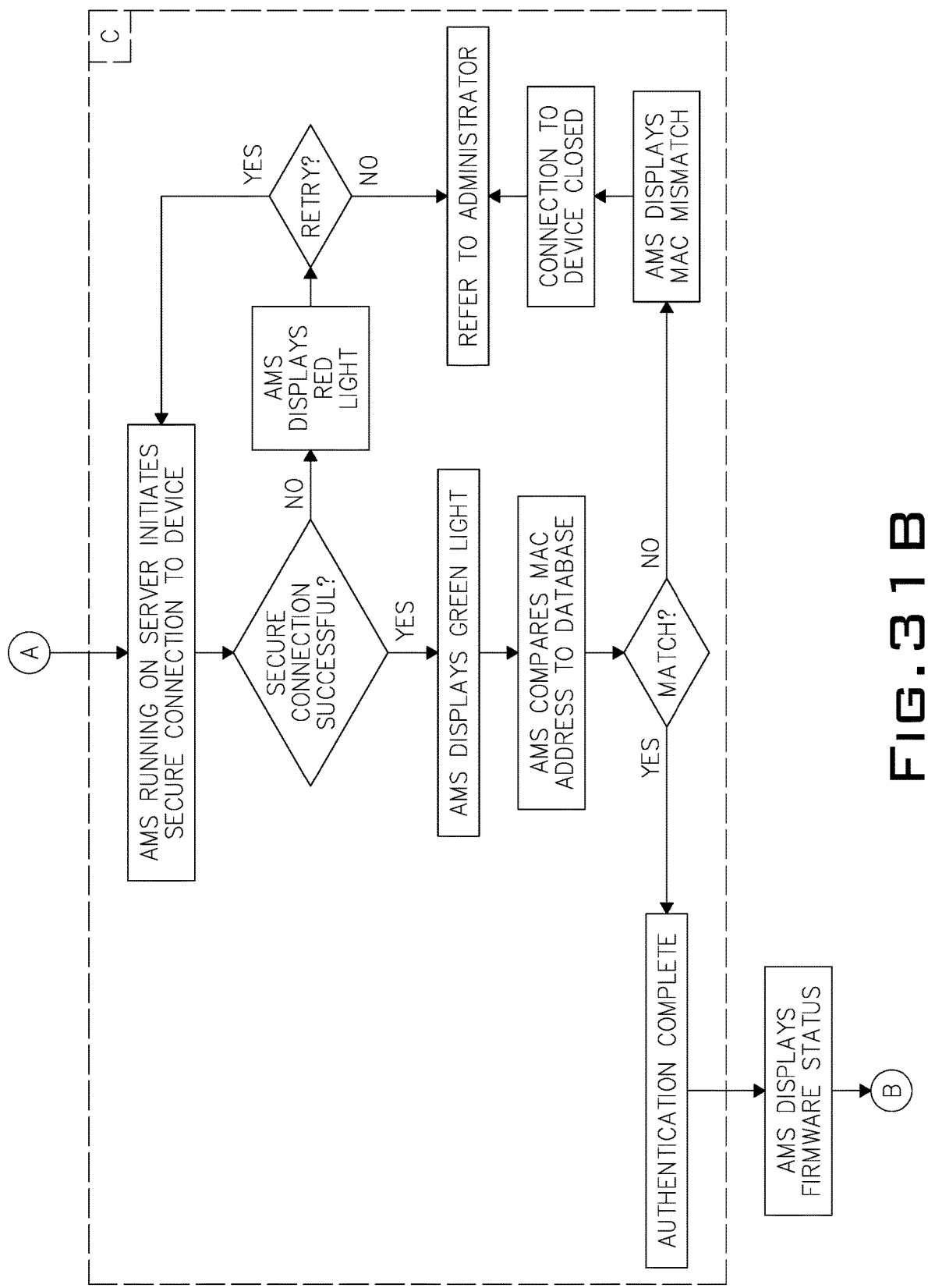
Figure 31D:
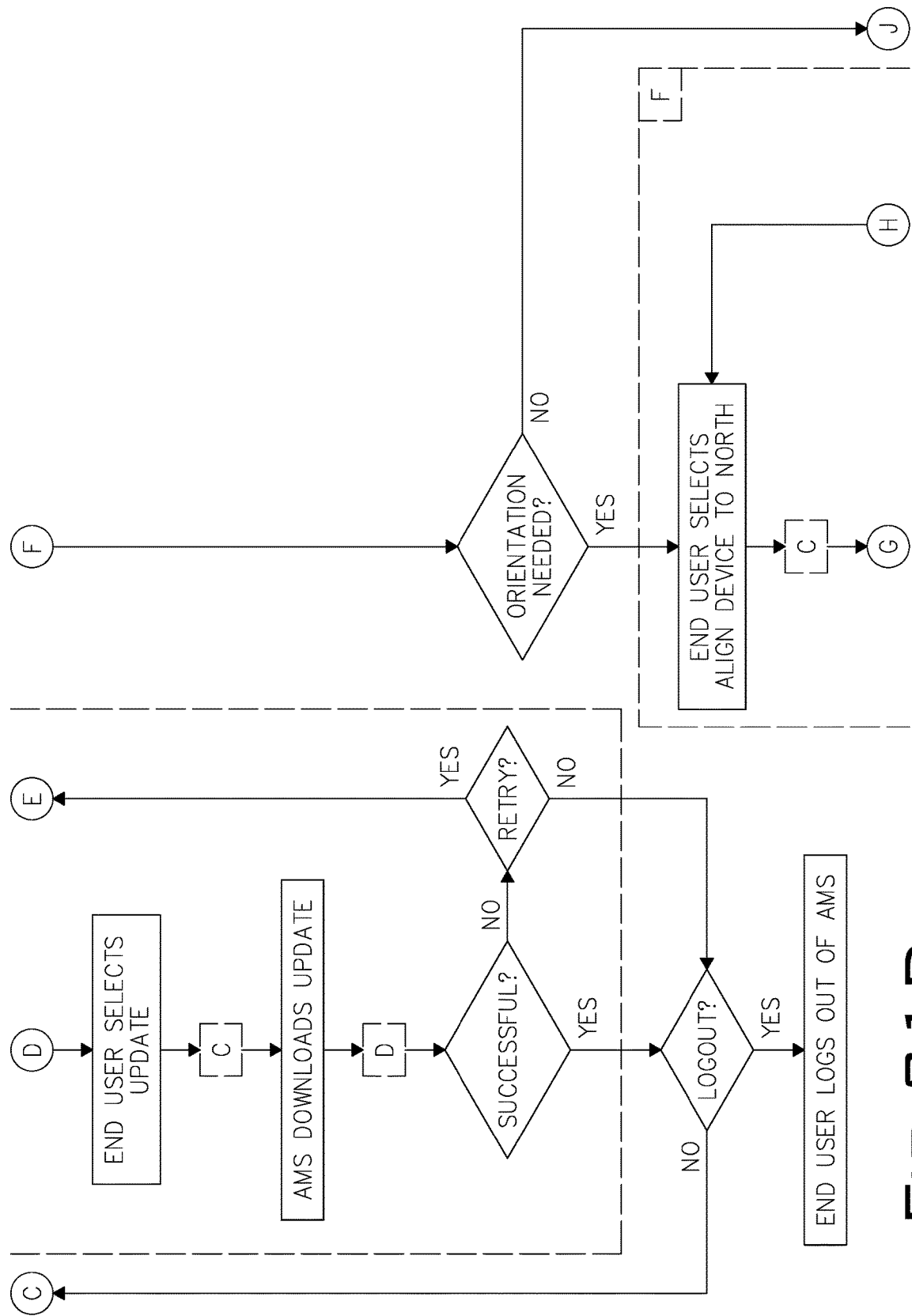
Figure 31E:
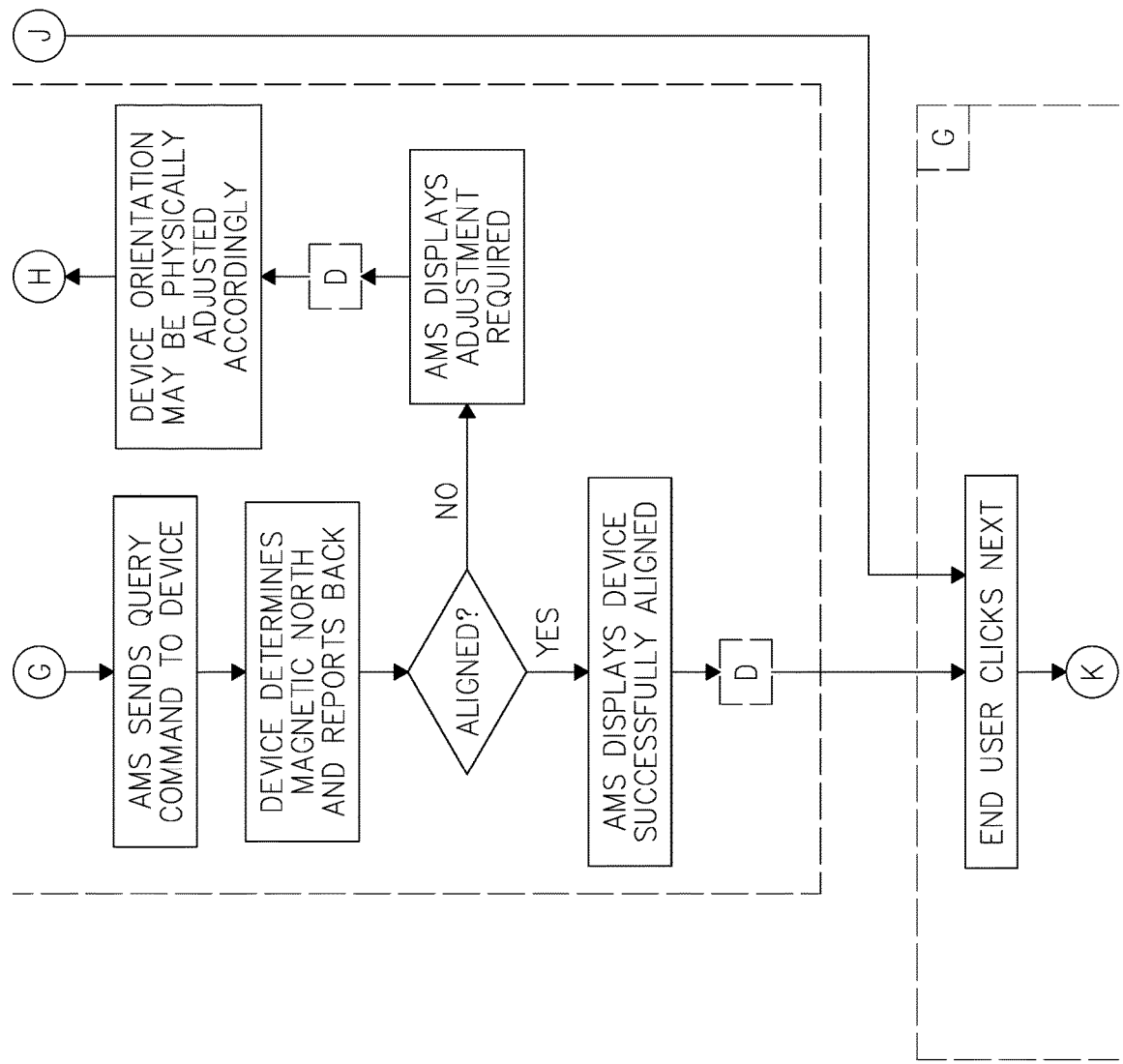
Figure 31F:
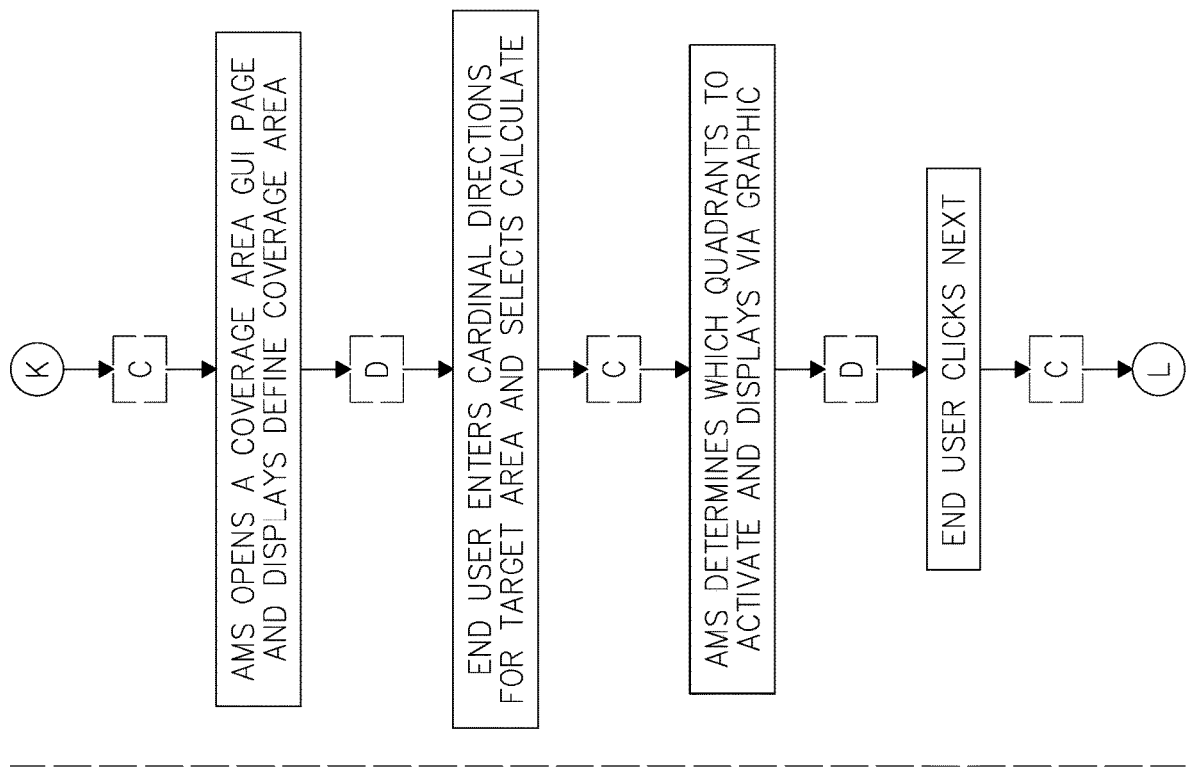
Figure 31G:
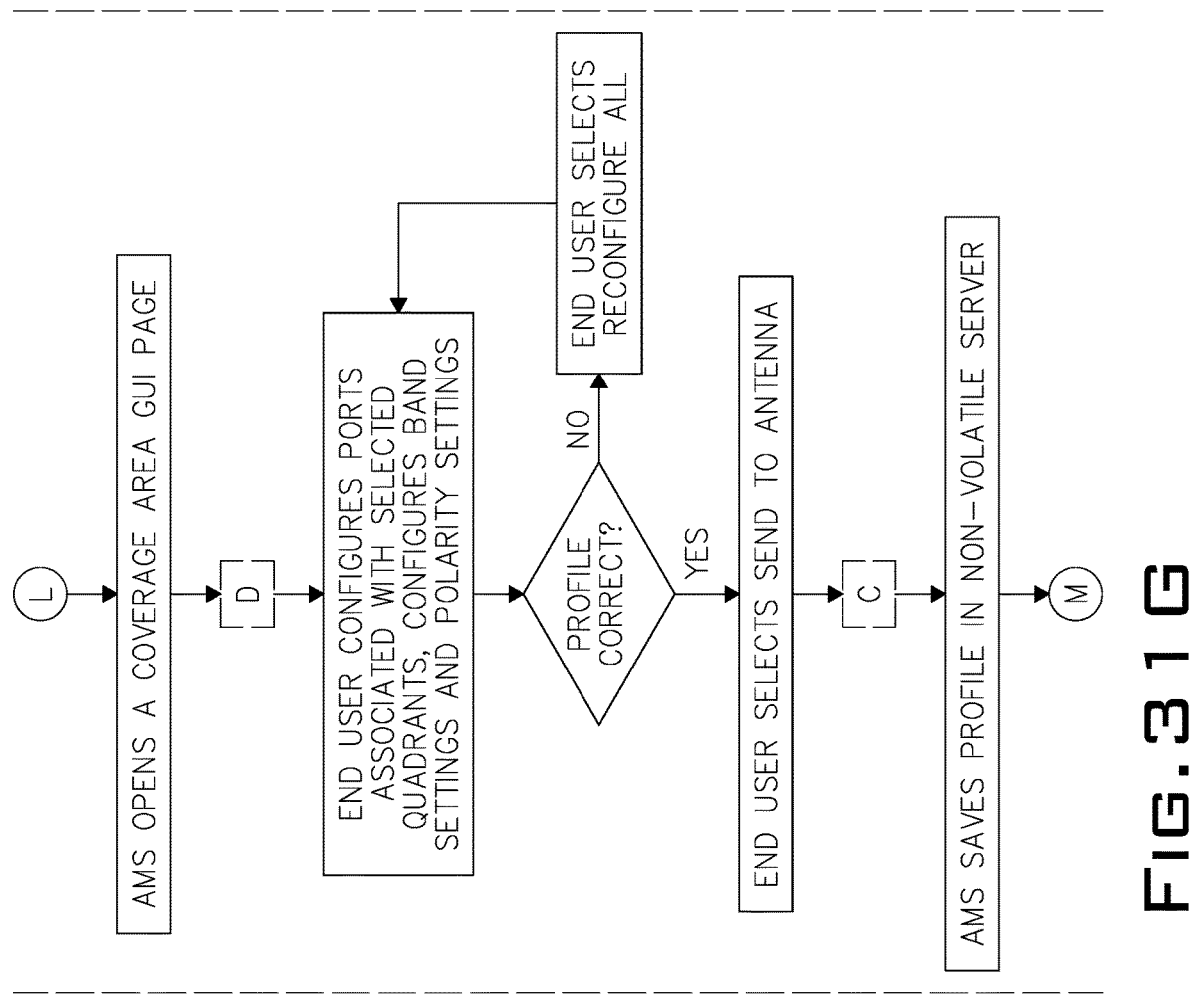
Figure 31H:
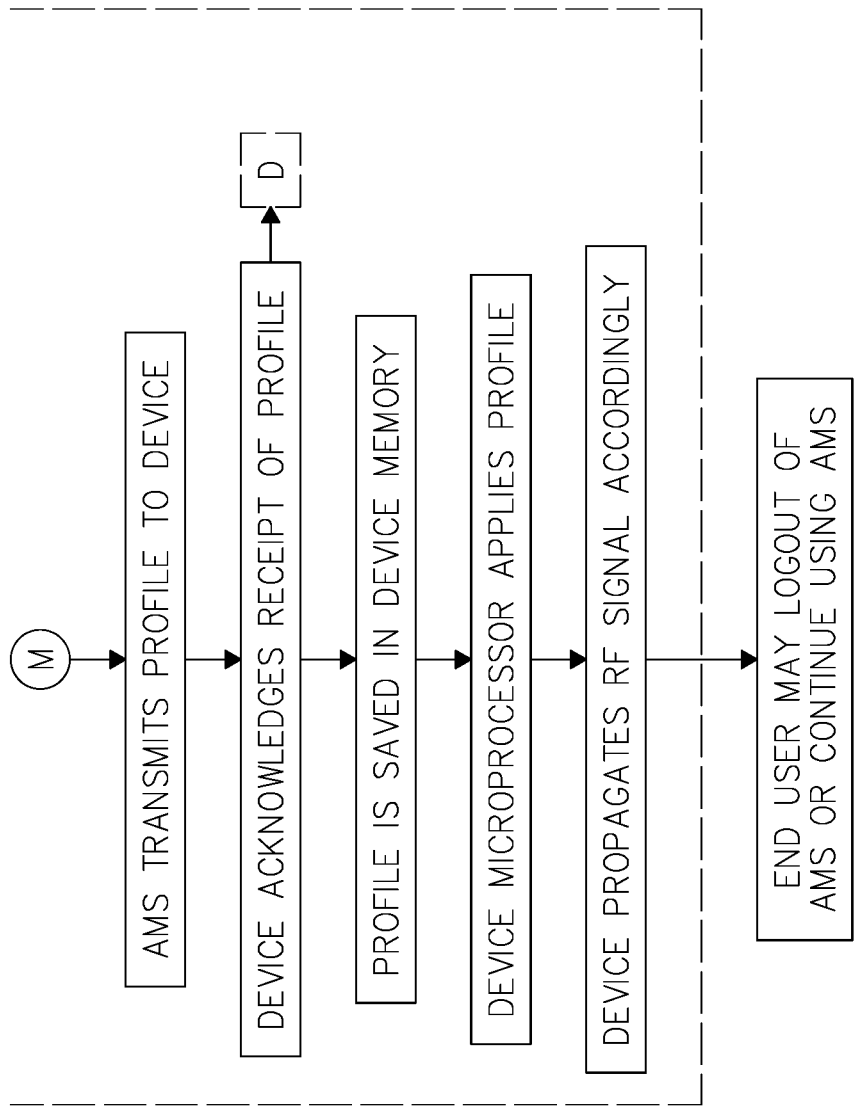
Figure 32A:
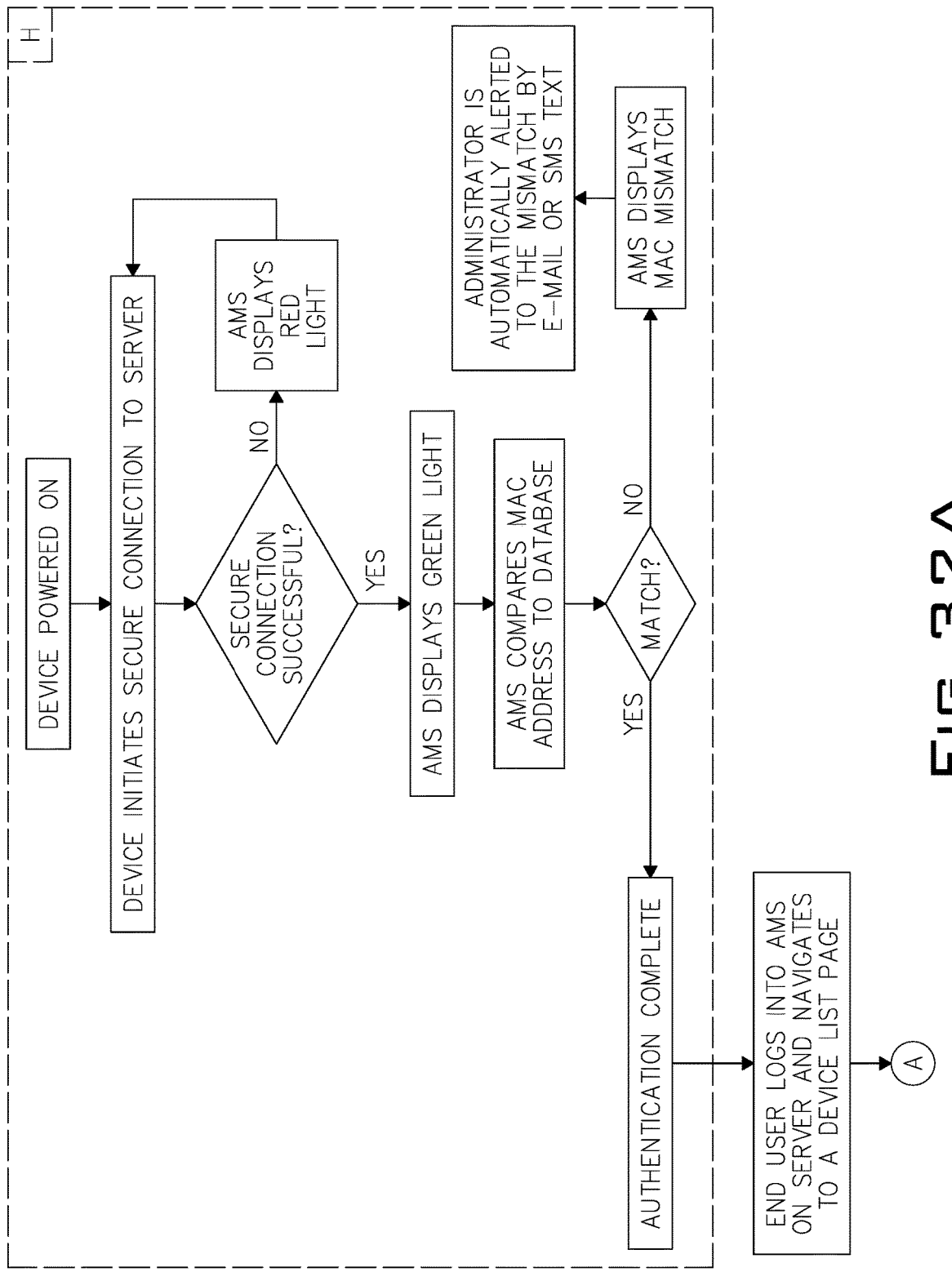
FIG. 32A Flow Chart For A Method Of Implementing A Profile For An Antenna In An Embodiment-Antenna Device Initiates Connection (1/6)
Figure 32B:
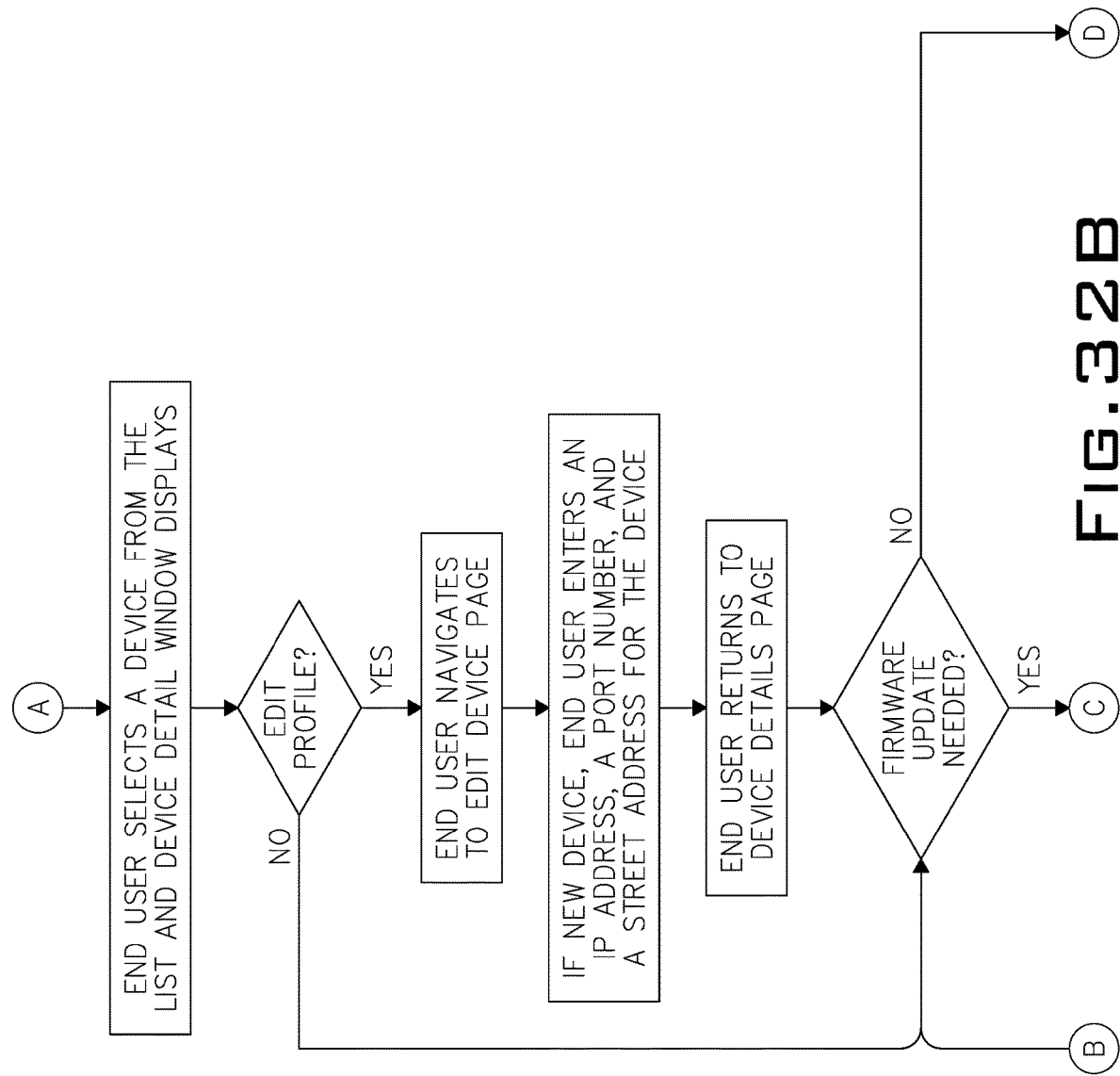
FIG. 32B Flow Chart For A Method Of Implementing A Profile For An Antenna In An Embodiment-Antenna Device Initiates Connection (2/6)
Figure 32D:
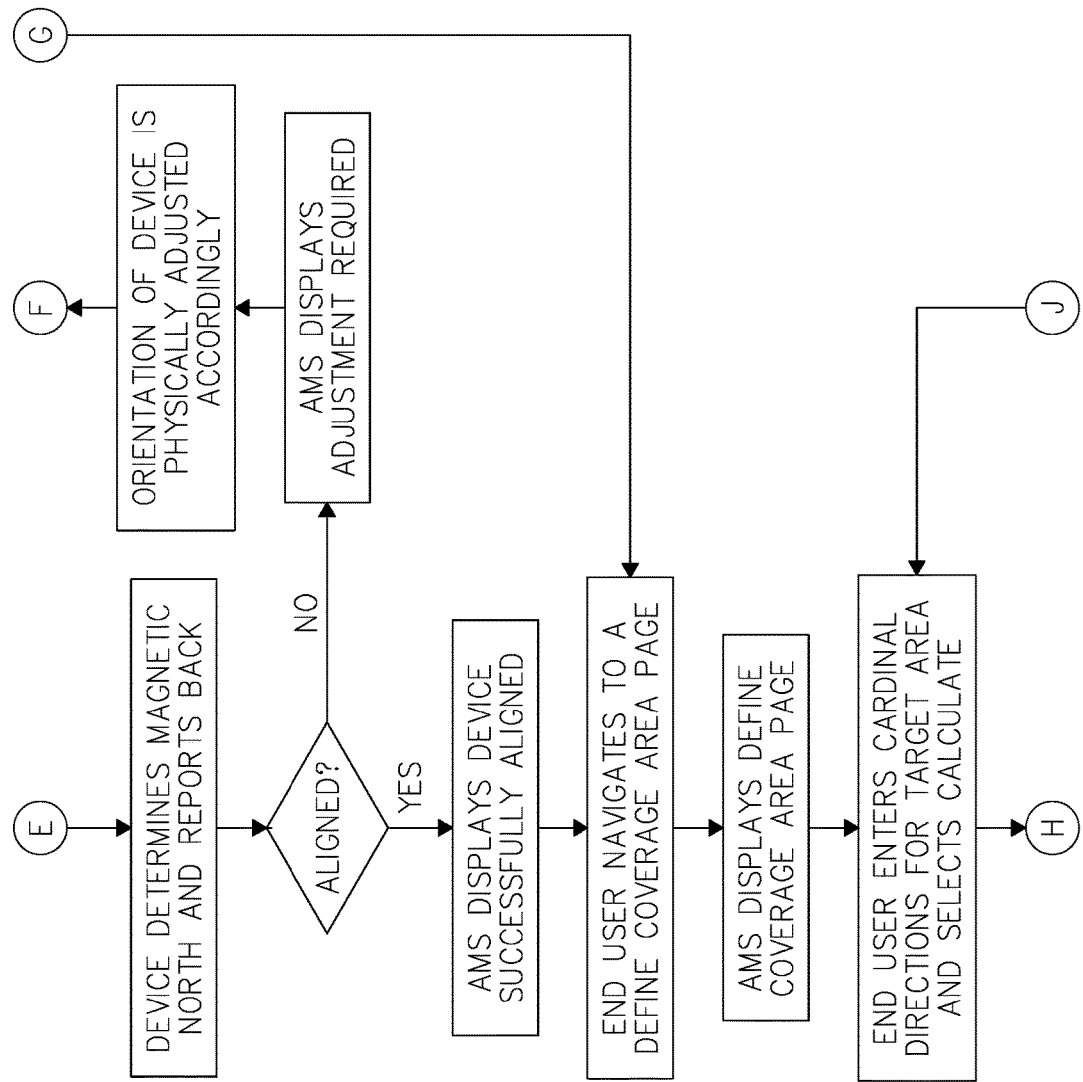
FIG. 32D Flow Chart For A Method Of Implementing A Profile For An Antenna In An Embodiment-Antenna Device Initiates Connection (4/6)
Figure 32F:
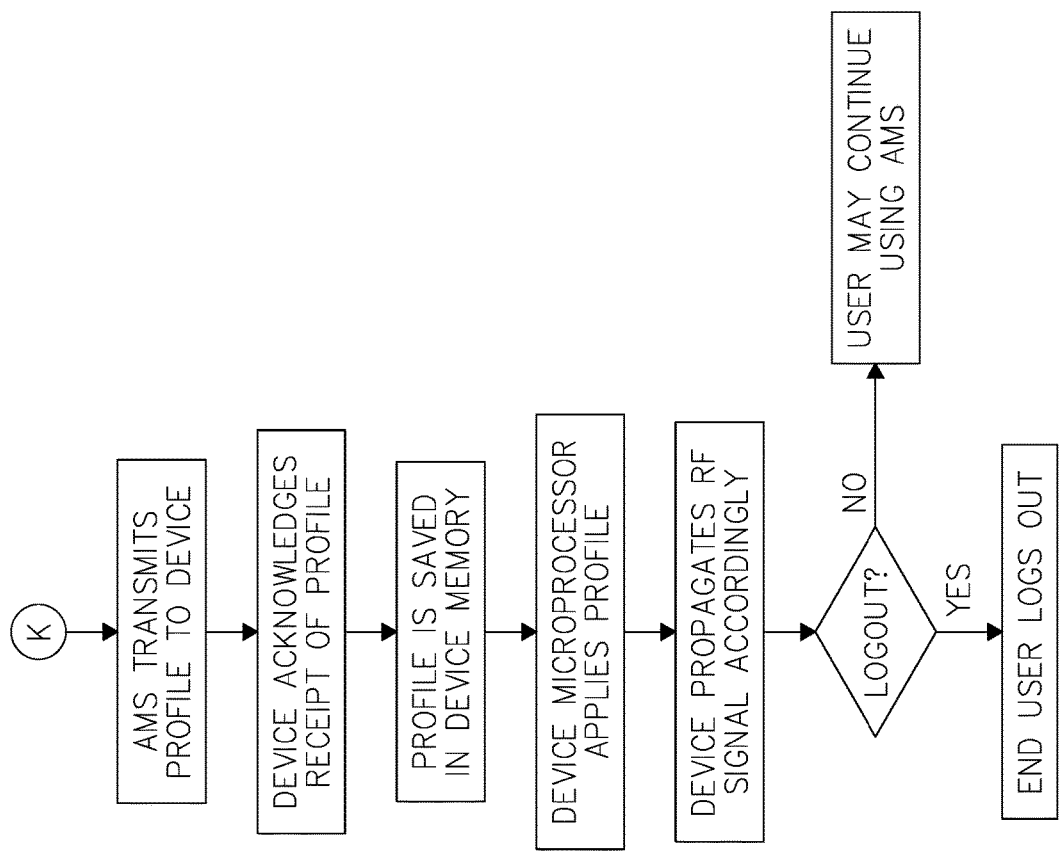
FIG. 32F In An Embodiment-Antenna Device Initiates Connection (6/6) Flow Chart For A Method Of Implementing A Profile For An Antenna FIG. 33 GPS-GNSS Orientation Sub-Method
Figure 33:
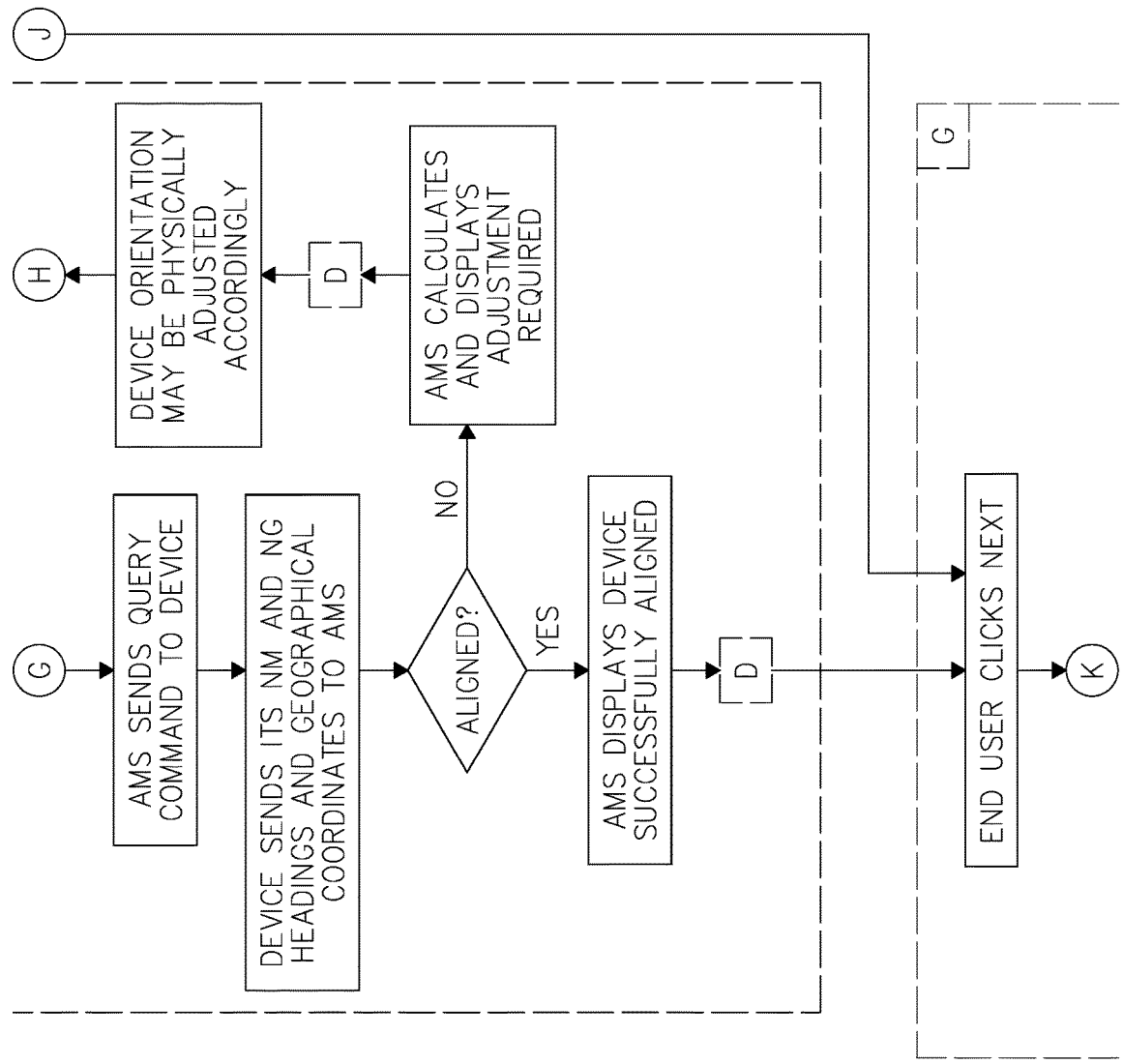

As illustrated in FIG. 28, and FIG. 34, in an embodiment, information regarding port 2803, polarization 2804 and band selection 2805 options of designated and activated quadrants of an Antenna 109 may be displayed to an end-user, who may configure these features with respect to any designated and activated quadrant of an Antenna 109 in an embodiment. By way of example, as illustrated in FIG. 29, the display indicates that an operator has assigned two ports to Quadrant C and two ports to Quadrant D. Both ports in each quadrant may operate in the vertical pole and all ports may operate as dual band.

An Antenna 109 may prevent an operator from misconfiguring it. In addition to allowing only selected quadrants to be configured, in an embodiment, a port may be assigned to a highlighted quadrant which cannot be assigned to another highlighted quadrant.

Downloading the Profile from AMS to an Antenna Device

Once an end-user has configured the ports, bands, and polarities to be associated with selected quadrants 3401, the end-user may review those selections to ensure that the profile is correct 3402. If the profile selections are not correct, the end user may click a Reconfigure All Button 3002 to clear the selections and make new selections; or, if the end-user is satisfied that the profile is correct, the end-user may click a Send To Antenna Button 3003, causing AMS to send the profile to the Antenna Device 109, 3404.

Selecting a reconfiguration option in an embodiment may cause previous configurations in selected quadrants to be deleted, allowing an operator to apply new configurations to selected quadrants. In an embodiment, AMS may allow for an unlimited number of reconfigurations in selected quadrants.

When an operator sends a profile to an Antenna 109, in an embodiment, AMS may cause the profile to be saved in non-volatile memory on a central server 102, 3405. AMS may then open a TCP-IP Socket 3406, whereupon the Antenna 109 may initiate an IPSec Tunnel 3407. AMS then may transmit the profile to the Antenna Device 109, 3408, whereupon the Antenna Device 109 acknowledges to AMS receipt of the profile 3501, AMS closes the TCP-IP Socket 3505, and in response, the Antenna Device 109 terminates the IPSec Tunnel 3506. A microprocessor in the Antenna Device 109 proceeds to apply the profile, and the Antenna Device 109 begins propagating an radiofrequency signal accordingly 3504.

An Antenna 109 requires no further interaction with AMS to operate. It will operate based upon a saved profile until such time as a new profile is received from AMS and said new profile replaces the existing profile in an Antenna 109.

What is claimed is:

1. An antenna device comprising:
   a plurality of radiating elements each comprising one or more conductive materials, said plurality of radiating elements being configured into one or more arrays, wherein the plurality of radiating elements are disposed on one or more printed circuit boards, said one or more printed circuit boards being perpendicularly attached, or attached in parallel, to one or more reflectors, wherein each of said one or more reflectors is joined to a central cylindrical core, and wherein a plurality of said one or more reflectors is joined to and about said central cylindrical core to define a plurality of segments of space into which radio frequency signals can be propagated, wherein one or more of said plurality of radiating elements is vertically polarized, horizontally polarized, or both, wherein each of said plurality of radiating elements has a receive path and a transmit path configured to be joined into a single transceiver path, said receive path and/or said transmit path being configured to be separated from, and joined to, said transceiver path at various locations along said transceiver path;
   one or more radio frequency switch matrices coupled by the receive path, the transmit path, or the transceiver path of one or more vertically polarized radiating elements of said plurality of radiating elements or one or more horizontally polarized radiating elements of said plurality of radiating elements, or both;

one or more multiplexers interposed between at least one of said plurality of radiating elements and one or more of said one or more radio frequency switch matrices by the receive path, the transmit path, or the transceiver path of said at least one of said plurality of radiating elements;

at least one envelope detector coupled to the transmit path or the transceiver path of each of said plurality radiating elements;

a plurality of radio frequency ports of one or more modems, wherein each of said plurality of radio frequency ports is coupled to one or more of said one or more radio frequency switch matrices by the receive path, the transmit path, or the transceiver path of said at least one of said plurality of radiating elements;

a signal and control processor with comprising firmware, an integrated module, a communication stack, an embedded memory, one or more processors, programmable logic, and one or more peripheral stages or devices, the signal and control processor being configured to (i) set up one or more components of the antenna device, (ii) control one or more components of the antenna device, (iii) read data from one or more components of the antenna device, (iv) read from, and transmit data to, a wide area network, (v) be coupled to said one or more radio frequency switch matrices by one or more control lines, and (vi) be coupled to said one or more envelope detectors by one or more sensor lines;

non-volatile semiconductor memory coupled to said signal and control processor by said one or more control lines and by one or more data lines, or both;

one or more magnetometers coupled to said signal and control processor by said one or more control lines and said one or more data lines;

one or more external data ports coupled by said one or more data lines, directly or indirectly, to one or more interfaces for data input and/or output, such that each of said one or more interfaces for data input and/or output is coupled, directly or indirectly, to said signal and control processor by said one or more data lines and to said signal and control processor, directly or indirectly, by said one or more control lines; and one or more power receptacles configured to receive current from an electrical power source, each of said one or more power receptacles being connected by one or more power lines to one or more voltage regulators, such that each of said one or more voltage regulators is configured to deliver power from at least one of the one or more power lines to one or more stages of the antenna device.

2. An antenna device comprising:

a plurality of radiating elements each comprising one or more conductive materials, said plurality of radiating elements being configured into one or more arrays, wherein the plurality of radiating elements is disposed on one or more printed circuit boards, said one or more printed circuit boards being perpendicularly attached, or attached in parallel, to one or more reflectors, wherein each of said one or more reflectors is joined to a central cylindrical core and a plurality of said one or more reflectors is joined to and about said central cylindrical core to define a plurality of segments of space into which radio frequency signals can be propagated, wherein one or more of said plurality of radiating elements is vertically polarized, horizontally polarized, or both, wherein each of said plurality of radiating elements has at least one receive path, and at least one transmit path, said at least one receive path and said at least one transmit path being configured to be joined into a single transceiver path, said at least one receive path and/or said at least one transmit path being configured to be separated from, and joined to, said transceiver path at various locations along said transceiver path;

one or more radio frequency switch matrices coupled by one or more of the at least one receive path, one or more of the at least one transmit path, or the transceiver path of one or more vertically polarized radiating elements of said plurality of radiating elements or one or more horizontally polarized radiating elements of said plurality of radiating elements, or both;

one or more multiplexers, at least one of the one or more multiplexers being interposed between one of said plurality of radiating elements and one of said one or more radio frequency switch matrices by the at least one receive path, the at least one transmit path, or the transceiver path of said one of said plurality of radiating elements;

at least one envelope detector coupled to the at least one transmit path or the transceiver path of each of said plurality radiating elements;

a plurality of radio frequency ports of one or more modems, wherein each of said plurality of radio frequency ports is coupled to said one or more radio frequency switch matrices by the at least one receive path, the at least one transmit path, or the transceiver path of at least one of said plurality of radiating elements;

a signal and control processor comprising firmware, an integrated module, a communication stack, an embedded memory, one or more processors, programmable logic, and one or more peripheral stages or devices, the signal and control processor being configured to (i) set up one or more components of the antenna device, (ii) control one or more components of the antenna device, (iii) read data from one or more components of the antenna device, as well as to (iv) read from, and transmit data to, a wide area network, (v) be coupled to said one or more radio frequency switch matrices by one or more control lines, and (vi) be coupled to said at least one envelope detector by one or more sensor lines;

non-volatile semiconductor memory coupled to said signal and control processor by said one or more control lines and by one or more data lines;

one or more GPS/GNSS receivers coupled to said signal processor by said one or more control lines and coupled to said signal and control processor by said one or more data lines;

one or more GPS/GNSS switches, each of the one or more GPS/GNSS switches being coupled to a corresponding GPS/GNSS receiver of the one or more GPS/GNSS receivers by one or more control lines and said one or more data lines;

a plurality of GPS/GNSS-dedicated antenna radio frequency connectors, each of the plurality of GPS/GNSS-dedicated antenna radio frequency connectors being coupled to one of the one or more GPS/GNSS switches by one or more control lines and to the one of the one or more GPS/GNSS switches by said one or more data lines, such that the each of the plurality of GPS/GNSS-dedicated antenna radio frequency connectors is coupled to one of at least two GPS/GNSS-dedicated antennae to which no other GPS/GNSS-dedicated antenna radio frequency connector is coupled;

one or more external data ports coupled by said one or more data lines, directly or indirectly, to one or more interfaces for data input and/or output, such that each of said one or more interfaces for data input and/or output is coupled, directly or indirectly, to said signal and control processor by said one or more data lines and to said signal and control processor, directly or indirectly, by said one or more control lines; and one or more power receptacles configured to receive current from an electrical power source, each of said one or more power receptacles being connected by one or more power lines to one or more voltage regulators, such that each of said one or more voltage regulators is configured to deliver power from at least one of the one or more power lines to one or more stages of the antenna device.

3. An antenna device comprising:

a plurality of radiating elements, each comprising one or more conductive materials, said plurality of radiating elements being configured into one or more arrays, wherein the plurality of radiating elements is disposed on one or more printed circuit boards, said one or more printed circuit boards being perpendicularly attached, or attached in parallel, to one or more reflectors, wherein each of said one or more reflectors is joined to a central cylindrical core, and wherein a plurality of said one or more reflectors may be joined to and about said central cylindrical core to define a plurality of segments of space into which radio frequency signals can be propagated, wherein one or more of said plurality of radiating elements is vertically polarized, horizontally polarized, or both, wherein each of said plurality of radiating elements has at least one receive path and at least one transmit path, said at least one receive path and said at least one transmit path being configured to be joined into a single transceiver path, said at least one receive path and/or said at least one transmit path being configured to be separated from, and joined to, said transceiver path at various locations along said transceiver path;

one or more polarization switches, each being coupled by a receive path, a transmit path, or a transceiver path of a vertically polarized radiating element of said plurality of radiating elements or by a receive path, a transmit path, or a transceiver path of a horizontally polarized radiating element of said plurality of radiating elements, wherein each of said one or more polarization switches is configured to select between one of two radiating elements of said plurality of radiating elements;

one or more radio frequency switch matrices, each being coupled to the at least one receive path, the at least one transmit path, or the transceiver path of one or more vertically polarized radiating elements of the plurality of radiating elements, or one or more horizontally polarized radiating elements, or both;

one or more multiplexers interposed between any one of said plurality of radiating elements and any one of said one or more radio frequency switch matrices by the at least one receive path, the at least one transmit path, or the transceiver path of said any one of said plurality of radiating elements;

at least one envelope detector coupled to the transmit path of said any one of said plurality of radiating elements;

a plurality of radio frequency ports of one or more modems, wherein each of said plurality of radio frequency ports is coupled to said one or more radio frequency switch matrices by the at least one receive path, the at least one transmit path, or the transceiver path of said plurality of radiating elements;

a signal and control processor comprising firmware, an integrated module, a communication stack, an embedded memory, one or more processors, programmable logic, and one or more peripheral stages or devices, the signal and control processor being configured to (i) set up, control, and read data from components of said antenna device, (ii) read from, and transmit data to, a wide area network, (iii) be coupled to said one or more polarization switches and to said one or more radio frequency switch matrices by one or more control lines, and (iv) be coupled to said one or more envelope detectors by one or more sensor lines;

non-volatile semiconductor memory coupled to said signal and control processor by said one or more control lines and one or more data lines;

one or more magnetometers coupled to said signal and control processor by said one or more control lines and said one or more data lines;

one or more external data ports coupled by said one or more data lines to one or more interfaces for data input and/or data output, such that the one or more interfaces for data input and/or data output are thereby connected, directly or indirectly, to said signal and control processor by said one or more control lines and said one or more data lines; and one or more power receptacles configured to receive current from an electrical power source, each of said one or more power receptacles being connected by one or more power lines to one or more voltage regulators, such that each of said one or more voltage regulators is configured to deliver power from at least one of the one or more power lines to one or more stages of the antenna device.

4. An antenna device comprising:

a plurality of radiating elements each comprising one or more conductive materials and being configured into a array, wherein the plurality of radiating elements is disposed on one or more printed circuit boards, said one or more printed circuit boards being perpendicularly attached to reflectors, said reflectors being positioned about, and joined to, a central cylindrical core to define a plurality of segments of space into which radio frequency signals can be propagated, wherein one or more of said plurality of radiating elements is vertically polarized, horizontally polarized, or both, wherein each of said plurality of radiating elements has a receive path, a transmit path, or a single transceiver path, said receive path and/or transmit path being configured to separate from, and/or join to, said transceiver path;

one or more polarization switches coupled by the receive path, the transmit path, or the transceiver path of a vertically polarized radiating element of said plurality of radiating elements or the receive path, the transmit path, or the transceiver path of a horizontally polarized radiating element of said plurality of radiating elements, wherein each of said one or more polarization switches is configured to select between one of two radiating elements of said plurality of radiating elements;

one or more radio frequency switch matrices coupled to the receive path, the transmit path, or the transceiver path of one or more of said one or more vertically polarized radiating elements or the receive path, the transmit path, or the transceiver path of one or more of said one or more horizontally polarized radiating elements, or both;

one or more GPS/GNSS receivers coupled to a signal and control processor by one or more control lines and one or more data lines;

one or more GPS/GNSS switches coupled by said one or more control lines and said one or more data lines to a GPS/GNSS receiver;

a plurality of GPS/GNSS-dedicated antenna radio frequency connectors coupled to the one or more GPS/GNSS switches by said one or more control lines and said one or more data lines and coupled to one of a pair of GPS/GNSS-dedicated antennae to which no other GPS/GNSS-dedicated antenna radio frequency connector is coupled;

one or more external data ports coupled by said one or more data lines, directly or indirectly, to one or more interfaces for data input and/or data output, such that said one or more interfaces for data input and/or data output is connected, directly or indirectly, to said signal and control processor by said one or more control lines and said one or more data lines; and one or more power receptacles configured to receive current from an electrical power source, each of said one or more power receptacles being connected by one or more power lines to one or more voltage regulators, such that each of said one or more voltage regulators is configured to deliver power from at least one of the one or more power lines to one or more stages of the antenna device.

5. An antenna device comprising:

a plurality of radiating elements comprising dipoles and configured into an array, wherein the plurality of radiating elements is disposed on one or more printed circuit boards, said one or more printed circuit boards being perpendicularly attached to reflectors, said reflectors being positioned about, and joined to, a central cylindrical core to define a plurality of segments of space into which radio frequency signals can be propagated, wherein one or more of said plurality of radiating elements is vertically polarized, horizontally polarized, or both, wherein each of said plurality of radiating elements has a receive path, a transmit path, or a single transceiver path, said receive path and/or transmit path being configured to separate from, and/or join to, said transceiver path;

one or more polarization switches coupled to the transmit path, the receive path, or the transceiver path of a vertically polarized radiating element of said plurality of radiating elements and to the transmit path, the receive path, or the transceiver path of a horizontally polarized radiating element of said plurality of radiating elements, wherein each of said one or more polarization switches is configured to select either the vertically polarized radiating element or the horizontally polarized radiating element;

one or more primary amplifiers, each comprising a first bidirectional amplifier supporting the receive path and the transmit path of a radiating element of said plurality of radiating elements, wherein each of said one or more primary amplifiers:
is configured to support multiband operation,
is coupled to a polarization switch of said one or more polarization switches by the receive path and the transmit path of the radiating element of said plurality of radiating elements,
comprises:
  a first diplexer configured to separate two different radio frequency bands into separate receive paths,
  first switches configured to shift between signal paths,
  one or more first variable-gain, low-noise amplifiers coupled to the receive path of the radiating element of said plurality of radiating elements, and
  one or more embedded active filters configured to suppress out-of-band noise, and
is configured to operate via one or more control lines;

one or more radio frequency switch matrices coupled by the receive path, the transmit path, or the transceiver path of the radiating element of said plurality of radiating elements to one or more of said one or more primary amplifiers;

one or more secondary amplifiers coupled to a radio frequency switch matrix of the one or more radio frequency switch matrices by the receive path, the transmit path, or the transceiver path of the radiating element of said plurality of radiating elements, wherein the one or more secondary amplifiers:
comprises a second bidirectional amplifier supporting the receive path and the transmit path of the radiating element of said plurality of radiating elements,
is configured to operate by said one or more control lines,
is coupled to the radio frequency switch matrix of the one or more radio frequency switch matrices via the receive path, the transmit path, or the transceiver path of the radiating element of said plurality of radiating elements, and
comprises:
  one or more second embedded active filters configured to suppress out-of-band noise,
  second switches configured to shift between signal paths,
  one or more second diplexers configured to separate two different radio frequency bands into separate receive paths,
  one or more second variable-gain, low-noise amplifiers coupled to the receive path of the radiating element of said plurality of radiating elements, and
  one or more power amplifiers coupled to the transmit path of a radiating element of said plurality of radiating elements;

one or more modems, each comprising one or more radio frequency ports coupled to said one or more secondary amplifiers by the receive path, the transmit path, or the transceiver path of the radiating element of said plurality of radiating elements;

one or more envelope detectors coupled to the transmit path of each of said plurality of radiating elements;

a signal and control processor comprising firmware, an integrated module, a communication stack, an embedded memory, one or more processors, programmable logic, and one or more peripheral stages or devices, the signal and control processor being (i) configured to set up, control, and read data from components of said antenna device, (ii) configured to read from, and transmit data to, a wide area network, (iii) coupled to a polarization switch of said one or more polarization switches by said one or more control lines, (iv) coupled to a primary amplifier of said one or more primary amplifiers by said one or more control lines, (v) coupled to a secondary amplifier of said one or more secondary amplifiers by said one or more control lines, (vi) coupled to a radio frequency switch matrix of said one or more radio frequency switch matrices by said one or more control lines, and (vii) coupled to said one or more envelope detectors by one or more sensor lines;

non-volatile random access memory (NVRAM) that is either coupled to said signal and control processor by said one or more control lines and one or more data lines, or embedded in circuitry of said signal and control processor;

flash memory that is either coupled to said signal and control processor by said one or more control lines and said one or more data lines, or embedded in the circuitry of said signal and control processor;

electrically erasable programmable read-only memory (EEPROM) that is either coupled to said signal and control processor by said one or more control lines and said one or more data lines, or embedded in the circuitry of said signal and control processor;

one or more magnetometers coupled to said signal and control processor by said one or more control lines and said one or more data lines;

one or more accelerometers coupled to said signal and control processor by said one or more control lines and said one or more data lines;

one or more digital temperature sensors coupled to said signal and control processor by said one or more control lines and said one or more data lines;

one or more external data ports coupled by said one or more data lines, directly or indirectly, to a local area network (LAN) ethernet data interface and a universal asynchronous receiver and transmitter (UART) data interface, each of the one or more external data ports being (i) configured to receive data input and transmit data output via said one or more data lines and (ii) being coupled to said signal and control processor by said one or more control lines and said one or more data lines;

a power over ethernet (POE) circuit coupled to said LAN ethernet data interface via said one or more data lines, the POE circuit being configured to enable (i) data to be received from, and transmitted to, a jack via data and power transmission lines and (ii) electrical power to be received via an ethernet cable; and one or more voltage regulators coupled to said POE circuit by a power transmission line, each of said one or more voltage regulators being configured to distribute power to all stages of said antenna device via one or more power transmission lines.

6. An antenna device comprising:

a plurality of radiating elements comprising dipoles including one or more conductive materials, said plurality of radiating elements being configured into an array and disposed on one or more printed circuit boards, said one or more printed circuit boards being perpendicularly attached to reflectors, said reflectors being positioned about, and joined to, a central cylindrical core to define a plurality of segments of space into which radio frequency signals can be propagated, wherein one or more of said plurality of radiating elements is vertically polarized, horizontally polarized, or both, wherein each of said plurality of radiating elements has a receive path, a transmit path, or a single transceiver path, said receive path and/or said transmit path being capable of separating from, and joining to, said transceiver path;

one or more polarization switches coupled to the transmit path, the receive path, or the transceiver path of a vertically polarized radiating element of said plurality of radiating elements and to the transmit path, the receive path, or the transceiver path of a horizontally polarized radiating element of said plurality of radiating elements, wherein each of said one or more polarization switches is configured to select either the vertically polarized radiating element or the horizontally polarized radiating element;

one or more primary amplifiers, each comprising a first bidirectional amplifier supporting the receive path and the transmit path of a radiating element of said plurality of radiating elements, wherein each of said one or more primary amplifiers:

is configured to support multiband operation, is coupled to a polarization switch of said one or more polarization switches by the receive path and the transmit path of the radiating element of said plurality of radiating elements, comprises:

a first diplexer configured to separate two different radio frequency bands into separate receive paths, first switches configured to shift between signal paths, one or more first variable-gain, low-noise amplifiers, and one or more first embedded active filters configured to suppress out-of-band noise, and is configured to operate via one or more control lines;

one or more radio frequency switch matrices coupled by the receive path, the transmit path, or the transceiver path of the radiating element of said plurality of radiating elements to one or more of said one or more primary amplifiers;

one or more secondary amplifiers coupled to a radio frequency switch matrix of the one or more radio frequency switch matrices by the receive path, the transmit path, or the transceiver path of the radiating element of said plurality of radiating elements, wherein the one or more secondary amplifiers:

comprises a second bidirectional amplifier supporting the receive path and the transmit path of the receive path and the transmit path of the radiating element of said plurality of radiating elements, is configured to operate by said one or more control lines, is coupled to the radio frequency switch matrix of the one or more radio frequency switch matrices via the receive path, the transmit path, or the transceiver path of the radiating element of said plurality of radiating elements, and comprises:

one or more second embedded active filters configured to suppress out-of-band noise, second switches configured to shift between signal paths, one or more second diplexers configured to separate two different radio frequency bands into separate receive paths, and one or more second variable-gain, low-noise amplifiers coupled to the receive path of the radiating element of said plurality of radiating elements, and one or more power amplifiers coupled to the transmit path of a radiating element of said plurality of radiating elements;

one or more modems, each comprising one or more radio frequency ports coupled to said one or more secondary amplifiers by the receive path, the transmit path, or the transceiver path of the radiating element of said plurality of radiating elements;

one or more envelope detectors coupled to the transmit path of each of said plurality of radiating elements;

a signal and control processor comprising firmware, an integrated module, a communication stack, an embedded memory, one or more processors, programmable logic, and one or more peripheral stages or devices, the signal and control processor being (i) configured to set up, control, and read data from components of said antenna device, (ii) configured to read from, and transmit data to, a wide area network, (iii) coupled to a polarization switch of said one or more polarization switches by said one or more control lines, (iv) coupled to a primary amplifier of said one or more primary amplifiers by said one or more control lines, (v) coupled to a secondary amplifier of said one or more secondary amplifiers by said one or more control lines, (vi) coupled to a radio frequency switch matrix of said one or more radio frequency switch matrices by said one or more control lines, and (vii) coupled to said one or more envelope detectors by one or more sensor lines;

non-volatile random access memory (NVRAM) that is either coupled to said signal and control processor by said one or more control lines and one or more data lines, or embedded in circuitry of said signal and control processor;

flash memory that is either coupled to said signal and control processor by said one or more control lines and said one or more data lines, or embedded in the circuitry of said signal and control processor;

electrically erasable programmable read-only memory (EEPROM) that is either coupled to said signal and control processor by said one or more control lines and said one or more data lines, or embedded in the circuitry of said signal and control processor;

one or more GPS/GNSS receivers coupled to said signal processor by said one or more control lines and said one or more data lines;

one or more GPS/GNSS switches coupled by said one or more control lines and said one or more data lines to said one or more GPS/GNSS receivers;

a plurality of GPS/GNSS-dedicated antenna radio frequency connectors coupled to the one or more GPS/GNSS switches by said one or more control lines and said one or more data lines and coupled to one of a pair of GPS/GNSS-dedicated antennae to which no other GPS/GNSS-dedicated antenna radio frequency connector is coupled;

one or more accelerometers coupled to said signal and control processor by said one or more control lines and said one or more data lines;

one or more digital temperature sensors coupled to said signal and control processor by said one or more control lines and said one or more data lines;

one or more external data ports coupled by said one or more data lines, directly or indirectly, to a local area network (LAN) ethernet data interface and a universal asynchronous receiver and transmitter (UART) data interface, each configured to receive data input and transmit data output via one or more data lines, each of the one or more external data ports being coupled to said signal and control processor by said one or more control lines and by said one or more data lines;

a power over ethernet (POE) circuit coupled to said LAN ethernet data interface via said one or more data lines, the POE circuit being configured to permit data to be received and transmitted, and electrical power to be received, via an ethernet cable; and one or more voltage regulators coupled to said POE circuit by a power transmission line, each of said one or more voltage regulators being configured to distribute power to all stages of said antenna device via one or more power transmission lines.

7. An antenna system comprising:

at least one proprietary cloud comprising one or more computer servers running antenna management software, the at least one proprietary cloud being in electronic communication with a Wide Area Network;

one or more computing devices configured to (i) receive data input from an operator, (ii) display data output to the operator, (iii) enable the operator to access the at least one proprietary cloud remotely, and (iv) permit operational data to be saved to, and retrieved from, the at least one proprietary cloud; and an antenna device comprising:

a plurality of radiating elements comprising one or more conductive materials, said plurality of radiating elements being configured into one or more arrays, wherein said plurality of radiating elements disposed on one or more printed circuit boards, said one or more printed circuit boards being perpendicularly attached, or attached in parallel, to one or more reflectors, wherein each of said one or more reflectors is joined to a central cylindrical core, wherein a plurality of said one or more reflectors is joined to and about said central cylindrical core to define a plurality of segments of space into which radio frequency signals can be propagated, wherein one or more of said plurality of radiating elements is vertically polarized, horizontally polarized, or both, wherein each of said plurality of radiating elements has at least one receive path, at least one transmit path, or at least one of both, said at least one receive path and/or said at least one transmit path being joined into a single transceiver path, said at least one receive path and/or said at least one transmit path being configured to separate from, and join to, said transceiver path;

one or more radio frequency switch matrices, each being coupled by the at least one receive path, the at least one transmit path, or the transceiver path of one or more vertically polarized radiating elements of said plurality of radiating elements or one or more horizontally polarized radiating elements of said plurality of radiating elements, or both;

one or more multiplexers interposed between at least one of said plurality of radiating elements and one or more of said one or more radio frequency switch matrices by the at least one receive path, the at least one transmit path, or the transceiver path of said at least one of said plurality of radiating elements;

at least one envelope detector coupled to the at least one transmit path or the at least one transceiver path of each of said plurality radiating elements;

a plurality of radio frequency ports of one or more modems, wherein each of said plurality of radio frequency ports is coupled to one or more of said one or more radio frequency switch matrices by the at least one receive path, the at least one transmit path, or the transceiver path of said at least one of said plurality of radiating elements;

a signal and control processor comprising firmware, an integrated module, a communication stack, an embedded memory, one or more processors, programmable logic, and one or more peripheral stages or devices, the signal and control processor being configured to (i) set up one or more components of the antenna device, (ii) control one or more components of the antenna device, (iii) read data from one or more components of the antenna device, (iv) read from, and transmit data to, a wide area network, (v) be coupled to said one or more radio frequency switch matrices by one or more control lines, and (vi) be coupled to said at least one envelope detectors by one or more sensor lines;

non-volatile semiconductor memory coupled to said signal and control processor by said one or more control lines or one or more data lines;

one or more magnetometers coupled to said signal and control processor by said one or more control lines and said one or more data lines;

one or more external data ports coupled by said one or more data lines, directly or indirectly, to one or more interfaces for data input and/or output, such that each of said one or more interfaces for data input and/or output is coupled, directly or indirectly, to said signal and control processor by said one or more data lines and to said signal and control processor, directly or indirectly, by said one or more control lines; and one or more power receptacles configured to receive current from an electrical power source, each of said one or more power receptacles being connected by one or more power lines to one or more voltage regulators, such that each of said one or more voltage regulators is configured to deliver power from at least one of the one or more power lines to one or more stages of the antenna device.

8. A method for orienting and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more magnetometers and a plurality of separate, identical reflective panels, each of the reflective panels comprising one or more directional radiating elements, the method comprising the steps of:

logging onto antenna management software (AMS) running on a server;

recording an IP Address, a Port Number, and a Street Address of said remotely located antenna device;

navigating to a list of devices associated with an account associated with an end-user to command the AMS to open a secure connection between said server and said remotely located antenna device;

establishing a secure connection between the server and the remotely located antenna device, wherein said secure connection has been initiated by the server;

authenticating, by said server, the remotely located antenna device;

determining that orientation of the remotely located antenna device is required;

causing the AMS running on the server to send a query to the remotely located antenna device for a geomagnetic heading of the remotely located antenna device;

sending the geomagnetic heading of the remotely located antenna device to the server;

determining if the remotely located antenna device is aligned to a pre-determined geographic heading;

outputting instructions for re-orienting the remotely located antenna device to said pre-determined geographic heading by the AMS running on said server if the remotely located antenna device is not aligned to said pre-determined geographic heading;

causing the remotely located antenna device to physically rotate in accordance with instructions from the AMS to properly align the remotely located antenna device to said pre-determined geographic heading;

sending a query to the remotely located antenna device for a subsequent geomagnetic heading of the remotely located antenna device;

sending the subsequent geomagnetic heading of the remotely located antenna device to the server;

determining, based at least in part on the subsequent geomagnetic heading of the remotely located antenna device, that the remotely located antenna device is aligned to said pre-determined geographic heading;

receiving cardinal directions for a radio frequency geographic coverage area;

receiving an indication of ports associated with one or more activated segments of space;

configuring polarization settings;

configuring band settings;

storing an antenna profile in memory of said server;

receiving and implementing one or more commands, from the server to said remotely located antenna device, to acknowledge receipt of said antenna profile, to save said antenna profile in antenna device memory, and to apply said antenna profile to the remotely located antenna device so as to direct the propagation of radiofrequency signals in accordance with said antenna profile;

transmitting, from said remotely located antenna device to said server, an acknowledgement of receipt of said antenna profile;

saving said antenna profile in said antenna device memory; and applying said antenna profile to said remotely located antenna device.

9. The method of claim 8, further comprising the steps of:

determining whether a particular end-user has an existing account to which a new remotely located antenna device can be associated;

in response to determining no existing account is associated with the particular end-user, creating a new account for the particular end-user; and registering said new remotely located antenna device by storing, in a server database, identifying data unique to said new remotely located antenna device.

10. The method of claim 8, further comprising the steps of:

receiving and implementing a query command, from said server to said remotely located antenna device, to send to said server requested identifying data unique to said remotely located antenna device;

transmitting, from said remotely located antenna device to said server, said requested identifying data; and authenticating said remotely located antenna device by matching said requested identifying data to stored identifying data in a database of said server.

11. A method for orienting and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more magnetometers and a plurality of separate, identical reflective panels, each with one or more directional radiating elements, the method comprising the steps of:

logging onto antenna management software (AMS) running on a server;

recording an IP Address, a Port Number and a Street Address of the remotely located antenna device;

navigating to a list of devices associated with an account associated with an end-user to command the AMS to open a secure connection between said server and said remotely located antenna device;

establishing a secure connection between the server and the remotely located antenna device, wherein said secure connection has been initiated by the server;

authenticating, by said server, the remotely located antenna device;

determining that a tilt reading is required;

determining that orientation of the remotely located antenna device is required;

causing the AMS running on the server to send a query to the remotely located antenna device for a geomagnetic heading of the remotely located antenna device;

sending the geomagnetic heading of the remotely located antenna device to the server;

determining if the remotely located antenna device is aligned to a pre-determined geographic heading;

outputting instructions for re-orienting the remotely located antenna device to said pre-determined geographic heading by the AMS running on said server if the remotely located antenna device is not aligned to said pre-determined geographic heading;

causing the remotely located antenna device to physically rotate in accordance with instructions from the AMS to properly align the remotely located antenna device to said pre-determined geographic heading;

sending a query to the remotely located antenna device for the geomagnetic heading of the remotely located antenna device;

sending the subsequent geomagnetic heading of the remotely located antenna device to the server;

determining, based at least in part on the subsequent geomagnetic heading of the remotely located antenna device, that the remotely located antenna device is aligned to said pre-determined geographic heading;

receiving cardinal directions for a radio frequency geographic coverage area;

receiving an indication of ports associated with one or more activated segments of space;

configuring polarization settings;

configuring band settings;

storing an antenna profile in memory of said server;

receiving and implementing one or more commands from the server to said remotely located antenna device to acknowledge receipt of said antenna profile, to save said antenna profile in antenna device memory, and to apply said antenna profile to the remotely located antenna device so as to direct the propagation of radiofrequency signals in accordance with said antenna profile;

transmitting from said remotely located antenna device to said server an acknowledgement of receipt of said antenna profile;

saving said antenna profile in antenna device memory; and applying said antenna profile to said remotely located antenna device.

12. The method of claim 11, further comprising the steps of:

determining whether a particular end-user has an existing account to which a new remotely located antenna device can be associated;

in response to determining no existing account is associated with the particular end-user, creating a new account for the particular end-user; and registering said new remotely located antenna device by storing, in a server database, identifying data unique to said new remotely located antenna device.

13. The method of claim 11, further comprising the steps of:

receiving and implementing a query command, from said server to said remotely located antenna device, to send to said server requested identifying data unique to said remotely located antenna device;

transmitting, from said remotely located antenna device to said server, said requested identifying data; and authenticating said remotely located antenna device by matching said requested identifying data to stored identifying data in a database of said server.

14. A method for orienting and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more GPS/GNSS components and a plurality of separate, identical reflective panels, each of the reflective panels comprising one or more directional radiating elements, the method comprising the steps of:

logging onto antenna management software (AMS) running on a server;

recording an IP Address, a Port Number and a Street Address of said remotely located antenna device;

navigating to a list of devices associated with an account associated with an end-user to command the AMS to open a secure connection between said server and said remotely located antenna device;

establishing a secure connection between the server and the remotely located antenna device, wherein said secure connection has been initiated by the server;

authenticating, by said server, the remotely located antenna device;

determining that orientation of the remotely located antenna device is required;

causing the AMS running on the server to send a query to the remotely located antenna device for a current heading of the remotely located antenna device;

sending a geomagnetic heading of the remotely located antenna device and a geographic heading of the remotely located antenna device to the server;

determining if the remotely located antenna device is aligned to a pre-determined geographic heading using the geomagnetic heading and/or the geographic heading;

outputting instructions for re-orienting the remotely located antenna device to said pre-determined geographic heading by the AMS running on said server if the remotely located antenna device is not aligned to said pre-determined geographic heading;

causing the remotely located antenna device to physically rotate in accordance with instructions from the AMS to properly align the remotely located antenna device to said pre-determined geographic heading;

sending a query to the remotely located antenna device for a subsequent geomagnetic heading of the remotely located antenna device;

sending the subsequent geomagnetic heading of the remotely located antenna device to the server;

determining, based at least in part on the subsequent geomagnetic heading of the remotely located antenna device, that the remotely located antenna device is aligned to said pre-determined geographic heading;

receiving cardinal directions for a radio frequency geographic coverage area;

receiving an indication of ports associated with one or more activated segments of space;

configuring polarization settings;

configuring band settings;

storing an antenna profile in memory of said server;

receiving and implementing one or more commands, from the server to said remotely located antenna device, to acknowledge receipt of said antenna profile, to save said antenna profile in antenna device memory, and to apply said antenna profile to the remotely located antenna device so as to direct the propagation of radiofrequency signals in accordance with said antenna profile;

transmitting, from said remotely located antenna device to said server, an acknowledgement of receipt of said antenna profile;

saving said antenna profile in said antenna device memory; and applying said antenna profile to said remotely located antenna device.

15. The method of claim 14, further comprising the steps of:

determining whether a particular end-user has an existing account to which a new remotely located antenna device can be associated;

in response to determining no existing account is associated with the particular end-user, creating a new account for the particular end-user; and registering said new remotely located antenna device by storing, in a server database, identifying data unique to said new remotely located antenna device.

16. The method of claim 14, further comprising the steps of:

receiving and implementing a query command, from said server to said remotely located antenna device, to send to said server requested identifying data unique to said remotely located antenna device;

transmitting, from said remotely located antenna device to said server, said requested identifying data; and authenticating said remotely located antenna device by matching said requested identifying data to stored identifying data in a database of said server.

17. A method for orienting and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more GPS/GNSS components and a plurality of separate, identical reflective panels, each of the reflective panels comprising one or more directional radiating elements, the method comprising the steps of:

logging into antenna management software (AMS) running on a server;

recording an IP Address, a Port Number and a Street Address of said remotely located antenna device;

navigating to a list of devices associated with an account associated with an end-user to command the AMS to open a secure connection between said server and said remotely located antenna device;

establishing a secure connection between the server and the remotely located antenna device, wherein said secure connection has been initiated by the server;

authenticating, by said server, the remotely located antenna device;

determining that a tilt reading is required;

determining that orientation of the remotely located antenna device is required;

causing the AMS running on the server to send a query to the remotely located antenna device for a geomagnetic heading of the remotely located antenna device;

sending the geomagnetic heading of the remotely located antenna device and a geographic heading of the remotely located antenna device to the server;

determining if the remotely located antenna device is aligned to a pre-determined geographic heading;

outputting instructions for re-orienting the remotely located antenna device to said pre-determined geographic heading by the AMS running on said server if the remotely located antenna device is not aligned to said pre-determined geographic heading;

causing the remotely located antenna device to physically rotate in accordance with instructions from the AMS to properly align the remotely located antenna device to said pre-determined geographic heading;

sending a query to the remotely located antenna device for a subsequent geomagnetic heading of the remotely located antenna device;

sending the subsequent geomagnetic heading of the remotely located antenna device to the server;

determining, based at least in part on the subsequent geomagnetic heading of the remotely located antenna device, that the remotely located antenna device is aligned to said pre-determined geographic heading;

receiving an indication of ports associated with one or more activated segments of space;

configuring polarization settings;

configuring band settings;

storing an antenna profile in memory of said server;

receiving and implementing one or more commands, from the server to said remotely located antenna device, to acknowledge receipt of said antenna profile, to save said antenna profile in antenna device memory, and to apply said antenna profile to the remotely located antenna device so as to direct the propagation of radiofrequency signals in accordance with said antenna profile;

transmitting, from said remotely located antenna device to said server, an acknowledgement of receipt of said antenna profile;

saving said antenna profile in said antenna device memory; and applying said antenna profile to said remotely located antenna device.

18. The method of claim 17, further comprising the steps of:
   determining whether a particular end-user has an existing account to which a new remotely located antenna device can be associated;
   in response to determining no existing account is associated with the particular end-user, creating a new account for the particular end-user; and
   registering said new remotely located antenna device by storing, in a server database, identifying data unique to said new remotely located antenna device.

19. The method of claim 17, further comprising the steps of:
   receiving and implementing a query command, from said server to said remotely located antenna device, to send to said server requested identifying data unique to said remotely located antenna device;
   transmitting, from said remotely located antenna device to said server, said requested identifying data; and
   authenticating said remotely located antenna device by matching said requested identifying data to stored identifying data in a database of said server.

20. A method for orienting and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more magnetometers and a plurality of separate, identical reflective panels, each of the reflective panels comprising one or more directional radiating elements, the method comprising the steps of:
   powering up the remotely located antenna device;
   establishing a perpetual secure connection between a server and the remotely located antenna device, wherein said secure connection has been initiated by the remotely located antenna device;
   authenticating, by said server, the remotely located antenna device;
   logging onto antenna management software (AMS) running on said server;
   recording an IP Address, a Port Number and a Street Address of the remotely located antenna device;
   determining that orientation of the remotely located antenna device is required;
   causing the AMS running on the server to send a query to the remotely located antenna device for a geomagnetic heading of the remotely located antenna device;
   sending the geomagnetic heading of the remotely located antenna device to the server;
   determining if the remotely located antenna device is aligned to a pre-determined geographic heading;
   outputting instructions for re-orienting the remotely located antenna device to said pre-determined geographic heading by the AMS running on said server if the remotely located antenna device is not aligned to said pre-determined geographic heading;
   causing the remotely located antenna device to physically rotate in accordance with instructions from the AMS to properly align the remotely located antenna device to said pre-determined geographic heading;
   sending a query to the remotely located antenna device for a subsequent geomagnetic heading of the remotely located antenna device;
   sending the subsequent geomagnetic heading of the remotely located antenna device to the server;
   determining, based at least in part on the subsequent geomagnetic heading of the remotely located antenna device, that the remotely located antenna device is aligned to said pre-determined geographic heading;
   receiving cardinal directions for a radio frequency geographic coverage area;
   receiving an indication of ports associated with one or more activated segments of space;
   configuring polarization settings;
   configuring band settings;
   storing an antenna profile in memory of said server;
   receiving and implementing one or more commands, from the server to said remotely located antenna device, to acknowledge receipt of said antenna profile, to save said antenna profile in antenna device memory, and to apply said antenna profile to the remotely located antenna device so as to direct the propagation of radiofrequency signals in accordance with said antenna profile;
   transmitting, from said remotely located antenna device to said server, an acknowledgement of receipt of said antenna profile;
   saving said antenna profile in said antenna device memory; and
   applying said antenna profile to said remotely located antenna device.

21. The method of claim 20, further comprising the steps of:
   determining whether a particular end-user has an existing account to which a new remotely located antenna device can be associated;
   in response to determining no existing account is associated with the particular end-user, creating a new account for the particular end-user; and
   registering said new remotely located antenna device by storing, in a server database, identifying data unique to said new remotely located antenna device.

22. The method of claim 20, further comprising the steps of:
   receiving and implementing a query command, from said server to said remotely located antenna device, to send to said server requested identifying data unique to said remotely located antenna device;
   transmitting, from said remotely located antenna device to said server, said requested identifying data; and
   authenticating said remotely located antenna device by matching said requested identifying data to stored identifying data in a database of said server.

23. A method for orienting and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more magnetometers and a plurality of separate, identical reflective panels, each of the reflective panels comprising one or more directional radiating elements, the method comprising the steps of:
   powering up the remotely located antenna device;
   establishing a perpetual secure connection between a server and the remotely located antenna device, wherein said secure connection has been initiated by the remotely located antenna device;
   authenticating, by said server, the remotely located antenna device;
   logging onto antenna management software (AMS) running on said server;
   recording an IP Address, a Port Number and a Street Address of the remotely located antenna device;

determining that a tilt reading is required;
determining that orientation of the remotely located antenna device is required;
causing the AMS running on the server to send a query to the remotely located antenna device for a geomagnetic heading of the remotely located antenna device;
sending the geomagnetic heading of the remotely located antenna device to the server;
determining if the remotely located antenna device is aligned to a pre-determined geographic heading;
outputting instructions for re-orienting the remotely located antenna device to said pre-determined geographic heading by the AMS running on said server if the remotely located antenna device is not aligned to said pre-determined geographic heading;
causing the remotely located antenna device to physically rotate in accordance with instructions from the AMS to properly align the remotely located antenna device to said pre-determined geographic heading;
sending a query to the remotely located antenna device for a subsequent geomagnetic heading of the remotely located antenna device;
sending the subsequent geomagnetic heading of the remotely located antenna device to the server;
determining, based at least in part on the subsequent geomagnetic heading of the remotely located antenna device, that the remotely located antenna device is aligned to said pre-determined geographic heading;
receiving cardinal directions for a radio frequency geographic coverage area;
receiving an indication of ports associated with the selected one or more activated segments of space;
configuring polarization settings;
configuring band settings;
storing an antenna profile in memory of said server;
receiving and implementing one or more commands, from the server to said remotely located antenna device, to acknowledge receipt of said antenna profile, to save said antenna profile in antenna device memory, and to apply said antenna profile to the remotely located antenna device so as to direct the propagation of radiofrequency signals in accordance with said antenna profile;
transmitting, from said remotely located antenna device to said server, an acknowledgement of receipt of said antenna profile;
saving said antenna profile in said antenna device memory; and
applying said antenna profile to said remotely located antenna device.

24. The method of claim 23, further comprising the steps of:
determining whether a particular end-user has an existing account to which a new remotely located antenna device can be associated;
in response to determining no existing account is associated with the particular end-user, creating a new account for the particular end-user; and
registering said new remotely located antenna device by storing, in a server database, identifying data unique to said new remotely located antenna device.

25. The method of claim 23, further comprising the steps of:
receiving and implementing a query command, from said server to said remotely located antenna device, to send to said server requested identifying data unique to said remotely located antenna device;
transmitting, from said remotely located antenna device to said server, said requested identifying data; and
authenticating said remotely located antenna device by matching said requested identifying data to stored identifying data in a database of said server.

26. A method for orienting, and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more GPS/GNSS components and a plurality of separate, identical reflective panels, each of the reflective panels comprising one or more directional radiating elements, the method comprising the steps of:
powering up the remotely located antenna device;
establishing a secure connection between a server and the remotely located antenna device, wherein said secure connection has been initiated by the remotely located antenna device;
authenticating, by said server, the remotely located antenna device;
logging onto antenna management software (AMS) running on said server;
recording an IP Address, a Port Number and a Street Address of the remotely located antenna device;
navigating to a list of devices associated with an account associated with an end-user to command the AMS to open a secure connection between said server and said remotely located antenna device;
determining that orientation of the remotely located antenna device is required;
causing the AMS running on the server to send a query to the remotely located antenna device for a current heading of the remotely located antenna device;
sending a geomagnetic heading of the remotely located antenna device and a geographic heading of the remotely located antenna device to the server;
determining if the remotely located antenna device is aligned to a pre-determined geographic heading using the geomagnetic heading and/or the geographic heading;
outputting instructions for re-orienting the remotely located antenna device to said pre-determined geographic heading by the AMS running on said server if the remotely located antenna device is not aligned to said pre-determined geographic heading;
causing the remotely located antenna device to physically rotate in accordance with instructions from the AMS to properly align the remotely located antenna device to said pre-determined geographic heading;
sending a query to the remotely located antenna device for a subsequent heading of the remotely located antenna device;
sending a subsequent geomagnetic heading of the remotely located antenna device and/or a subsequent geographic heading of the remotely located antenna device to the server;
determining, based at least in part on the subsequent geomagnetic heading of the remotely located antenna device and/or the subsequent geographic heading of the remotely located antenna device, that the remotely located antenna device is aligned to said pre-determined geographic heading;
receiving cardinal directions for a radio frequency geographic coverage area;

receiving an indication of ports associated with one or more activated segments of space;
configuring polarization settings;
configuring band settings;
storing an antenna profile in memory of said server;
receiving and implementing one or more commands, from the server to said remotely located antenna device, to acknowledge receipt of said antenna profile, to save said antenna profile in antenna device memory, and to apply said antenna profile to the remotely located antenna device so as to direct the propagation of radiofrequency signals in accordance with said antenna profile;
transmitting, from said remotely located antenna device to said server, an acknowledgement of receipt of said antenna profile;
saving said antenna profile in said antenna device memory; and
applying said antenna profile to said remotely located antenna device.

27. The method of claim 26, further comprising the steps of:
determining whether a particular end-user has an existing account to which a new remotely located antenna device can be associated;
in response to determining no existing account is associated with the particular end-user, creating a new account for the particular end-user; and
registering said new remotely located antenna device by storing, in a server database, identifying data unique to said new remotely located antenna device.

28. The method of claim 26, further comprising the steps of:
receiving and implementing a query command, from said server to said remotely located antenna device, to send to said server requested identifying data unique to said remotely located antenna device;
transmitting, from said remotely located antenna device to said server, said requested identifying data; and
authenticating said remotely located antenna device by matching said requested identifying data to stored identifying data in a database of said server.

29. A method for orienting, and directing a propagation of radio frequency signals of an addressable, reconfigurable, segmented, remotely located antenna device capable of multiple-input and multiple-output and beam-forming in conjunction with an access point, Wi-Fi router, or modem, said antenna device having one or more GPS/GNSS components and a plurality of separate, identical reflective panels, each of the reflective panels comprising one or more directional radiating elements, the method comprising the steps of:
powering up the remotely located antenna device;
establishing a perpetual secure connection between a server and the remotely located antenna device, wherein said secure connection has been initiated by the remotely located antenna device;
authenticating, by said server, the remotely located antenna device;
logging onto antenna management software (AMS) running on said server;
recording an IP Address, a Port Number and a Street Address of a remotely located antenna;
determining that a tilt reading is required;
determining that orientation of the remotely located antenna device is required;
causing the AMS running on the server to send a query to the remotely located antenna device for a geomagnetic heading of the remotely located antenna device;
sending the geomagnetic heading of the remotely located antenna device and a geographic heading of the remotely located antenna device to the server;
determining if the remotely located antenna device is aligned to a pre-determined geographic heading;
outputting instructions for re-orienting the remotely located antenna device to said pre-determined geographic heading by the AMS running on said server if the remotely located antenna device is not aligned to said pre-determined geographic heading;
causing the remotely located antenna device to physically rotate in accordance with instructions from the AMS to properly align the remotely located antenna device to said pre-determined geographic heading;
sending a query to the remotely located antenna device for a subsequent geomagnetic heading of the remotely located antenna device;
sending the subsequent geomagnetic heading of the remotely located antenna device to the server;
determining, based at least in part on the subsequent geomagnetic heading of the remotely located antenna device, that the remotely located antenna device is aligned to said pre-determined geographic heading;
receiving cardinal directions for a radio frequency geographic coverage area;
receiving an indication of ports associated with one or more activated segments of space;
configuring polarization settings;
configuring band settings;
storing an antenna profile in memory of said server;
receiving and implementing one or more commands, from the server to said remotely located antenna device, to acknowledge receipt of said antenna profile, to save said antenna profile in antenna device memory, and to apply said antenna profile to the remotely located antenna device so as to direct the propagation of radiofrequency signals in accordance with said antenna profile;
transmitting, from said remotely located antenna device to said server, an acknowledgement of receipt of said antenna profile;
saving said antenna profile in said antenna device memory; and
applying said antenna profile to said remotely located antenna device.

30. The method of claim 29, further comprising the steps of:
determining whether a particular end-user has an existing account to which a new remotely located antenna device can be associated;
in response to determining no existing account is associated with the particular end-user, creating a new account for the particular end-user; and
registering said new remotely located antenna device by storing, in a server database, identifying data unique to said new remotely located antenna device.

31. The method of claim 29, further comprising the steps of:
receiving and implementing a query command, from said server to said remotely located antenna device, to send to said server requested identifying data unique to said remotely located antenna device;

transmitting, from said remotely located antenna device to said server, said requested identifying data; and authenticating said remotely located antenna device by matching said requested identifying data to stored identifying data in a database of said server.

* * * * *